United States Patent
Liu et al.

(10) Patent No.: US 11,560,393 B2
(45) Date of Patent: *Jan. 24, 2023

(54) SOLID FORMS OF SUBSTITUTED BENZOXABOROLE AND COMPOSITIONS THEREOF

(71) Applicant: 5Metis, Inc., Durham, NC (US)

(72) Inventors: Chun Yu Liu, Durham, NC (US); Marissa Caroline Aubrey, Durham, NC (US); Yong-Kang Zhang, San Jose, CA (US); Michael Samuels, Durham, NC (US)

(73) Assignee: 5Metis, Inc., Durham, NC (US)

( * ) Notice: Subject to any disclaimer, the term of this patent is extended or adjusted under 35 U.S.C. 154(b) by 183 days.

This patent is subject to a terminal disclaimer.

(21) Appl. No.: 17/150,809

(22) Filed: Jan. 15, 2021

(65) Prior Publication Data
US 2021/0221827 A1    Jul. 22, 2021

Related U.S. Application Data

(62) Division of application No. 16/544,618, filed on Aug. 19, 2019, now Pat. No. 11,236,115.

(60) Provisional application No. 62/719,632, filed on Aug. 18, 2018.

(51) Int. Cl.
| | | |
|---|---|---|
| *A01N 55/08* | (2006.01) | |
| *C07F 5/02* | (2006.01) | |
| *A01N 25/08* | (2006.01) | |
| *A01N 25/14* | (2006.01) | |

(52) U.S. Cl.
CPC .............. *C07F 5/025* (2013.01); *A01N 55/08* (2013.01); *A01N 25/08* (2013.01); *A01N 25/14* (2013.01); *C07B 2200/13* (2013.01)

(58) Field of Classification Search
None
See application file for complete search history.

(56) References Cited

U.S. PATENT DOCUMENTS

| | | |
|---|---|---|
| 3,708,573 A | 1/1973 | Yoshinaga et al. |
| 4,672,065 A | 6/1987 | Spatz |
| 4,936,901 A | 6/1990 | Surgant, Sr. |
| 5,880,188 A * | 3/1999 | Austin .................. C08K 5/0058 558/290 |
| 7,582,621 B2 | 9/2009 | Baker et al. |
| 7,767,657 B2 | 8/2010 | Baker et al. |
| 8,669,207 B1 | 3/2014 | Jacobson et al. |
| 9,138,001 B2 | 9/2015 | Maclean et al. |
| 9,138,002 B2 | 9/2015 | Jacobson et al. |
| 9,426,996 B2 | 8/2016 | Maclean et al. |
| 9,585,396 B2 | 3/2017 | Malefyt et al. |
| 9,617,285 B2 | 4/2017 | Akama |
| 9,737,075 B2 | 8/2017 | Benkovic et al. |
| 10,070,649 B2 | 9/2018 | Malefyt et al. |
| 11,236,115 B2 | 2/2022 | Liu et al. |
| 2006/0234981 A1 | 10/2006 | Baker |
| 2007/0155699 A1 | 7/2007 | Baker et al. |
| 2007/0286822 A1 | 12/2007 | Sanders et al. |
| 2012/0115813 A1 | 5/2012 | Hernandez et al. |
| 2012/0214765 A1 | 8/2012 | Akama |
| 2014/0221312 A1 | 8/2014 | Maclean et al. |
| 2014/0259230 A1 | 9/2014 | Bobbio et al. |
| 2015/0133402 A1 | 5/2015 | Baker et al. |
| 2015/0223466 A1 | 8/2015 | Malefyt |
| 2016/0324160 A1 | 11/2016 | Benkovic |
| 2016/0374344 A9 | 12/2016 | Malefyt et al. |
| 2017/0000133 A1 | 1/2017 | Rajan et al. |
| 2017/0037258 A1 | 2/2017 | Benkovic |
| 2017/0164615 A1 | 6/2017 | Malefyt et al. |
| 2017/0164616 A1 | 6/2017 | Gane et al. |
| 2018/0009831 A1 | 1/2018 | Kovi et al. |
| 2019/0159457 A1 | 5/2019 | Liu et al. |
| 2020/0055878 A1 | 2/2020 | Liu et al. |
| 2020/0113184 A1 | 4/2020 | MacLean et al. |
| 2021/0059254 A1 | 3/2021 | Jacobson et al. |

FOREIGN PATENT DOCUMENTS

| | | |
|---|---|---|
| AU | 27071/95 B1 | 10/1997 |
| CN | 105101791 A | 11/2015 |
| CN | 105712969 A | 6/2016 |
| CN | 111233908 A | 6/2020 |
| EP | 0493671 B1 | 3/1995 |

(Continued)

OTHER PUBLICATIONS

U.S. Appl. No. 16/544,618, Notice of Allowance, dated Sep. 21, 2021, 7 pages.

EP 19852023.1, Extended European Search Report, dated Apr. 12, 2022, 8 pages.

Zhdankin et al., "Synthesis and Structure of Benzoboroxoles: Novel Organoboron Heterocycles," Tetrahedron Letters, vol. 40, 1999, pp. 6705-6708.

(Continued)

*Primary Examiner* — Craig D Ricci

(74) *Attorney, Agent, or Firm* — Kilpatrick Townsend & Stockton LLP

(57) ABSTRACT

The present invention relates to solid forms of a substituted benzoxaborole compound, specifically crystalline forms of a compound of formula I,

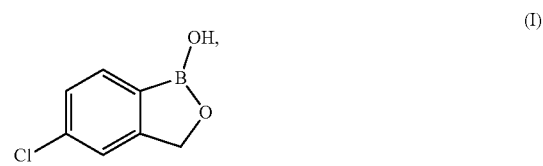

compositions comprising crystalline forms of the compound of formula (I), and methods of their use.

12 Claims, 33 Drawing Sheets

(56) References Cited

FOREIGN PATENT DOCUMENTS

| | | |
|---|---|---|
| EP | 2810946 B1 | 4/2016 |
| EP | 2950644 B1 | 7/2017 |
| KR | 10-2014-0093598 A | 7/2014 |
| WO | 1995/033754 A1 | 12/1995 |
| WO | 1996/032270 A1 | 10/1996 |
| WO | 1997/033890 | 9/1997 |
| WO | 1998/044140 A1 | 10/1998 |
| WO | 2000/026345 A1 | 5/2000 |
| WO | 2000/026356 A1 | 5/2000 |
| WO | 2002/034946 A2 | 5/2002 |
| WO | 2003/013224 A2 | 2/2003 |
| WO | 2003/100163 A1 | 12/2003 |
| WO | 2004/011601 A2 | 2/2004 |
| WO | 2004/039986 A1 | 5/2004 |
| WO | 2004/053062 A2 | 6/2004 |
| WO | 2004/072235 A2 | 8/2004 |
| WO | 2004/074492 A1 | 9/2004 |
| WO | 2005/054480 A2 | 6/2005 |
| WO | 2005/059103 A2 | 6/2005 |
| WO | 2005/061720 A2 | 7/2005 |
| WO | 2005/103266 A1 | 11/2005 |
| WO | 2005/103301 A2 | 11/2005 |
| WO | 2006/089067 A2 | 8/2006 |
| WO | 2006/108674 A2 | 10/2006 |
| WO | 2006/108675 A2 | 10/2006 |
| WO | 2006/128569 A2 | 12/2006 |
| WO | 2006/128570 A1 | 12/2006 |
| WO | 2006/128571 A2 | 12/2006 |
| WO | 2006/128573 A2 | 12/2006 |
| WO | 2007/017186 A1 | 2/2007 |
| WO | 2007/024782 A2 | 3/2007 |
| WO | 2007/027777 A2 | 3/2007 |
| WO | 2007/078340 A2 | 7/2007 |
| WO | 2007/091277 A2 | 8/2007 |
| WO | 2007/095638 A2 | 8/2007 |
| WO | 2007/131072 A2 | 11/2007 |
| WO | 2007/140256 A1 | 12/2007 |
| WO | 2007/142840 A2 | 12/2007 |
| WO | 2008/022872 A1 | 2/2008 |
| WO | 2008/070257 A2 | 6/2008 |
| WO | 2008/112019 A2 | 9/2008 |
| WO | 2009/064652 A1 | 5/2009 |
| WO | 2009/100188 A2 | 8/2009 |
| WO | 2009/102873 A1 | 8/2009 |
| WO | 2009/111263 A1 | 9/2009 |
| WO | 2009/111676 A2 | 9/2009 |
| WO | 2009-124920 A2 | 10/2009 |
| WO | 2010/024976 A1 | 3/2010 |
| WO | 2010/037016 A1 | 4/2010 |
| WO | 2010/077816 A1 | 7/2010 |
| WO | 2010/110400 A1 | 9/2010 |
| WO | 2010/117735 A1 | 10/2010 |
| WO | 2010/117737 A1 | 10/2010 |
| WO | 2011/022469 A2 | 2/2011 |
| WO | 2011/034704 A1 | 3/2011 |
| WO | 2011/060199 A1 | 5/2011 |
| WO | 2011/062904 A1 | 5/2011 |
| WO | 2011/066360 A1 | 6/2011 |
| WO | 2011/066384 A1 | 6/2011 |
| WO | 2011/075593 A1 | 6/2011 |
| WO | 2011/075595 A1 | 6/2011 |
| WO | 2013/050591 A2 | 4/2013 |
| WO | 2014-120715 A1 | 8/2014 |
| WO | 2014/120715 A2 | 8/2014 |
| WO | 2014/173880 A1 | 10/2014 |
| WO | 2014/197634 A2 | 12/2014 |
| WO | 2015/097276 A1 | 7/2015 |
| WO | 2015/171186 A1 | 11/2015 |
| WO | 2015/175157 A1 | 11/2015 |
| WO | 2016/079536 A1 | 5/2016 |
| WO | 2016-113303 A1 | 7/2016 |
| WO | 2016/113313 A1 | 7/2016 |
| WO | 2016/128949 | 8/2016 |
| WO | 2016/130658 A1 | 8/2016 |
| WO | 2016/164589 | 10/2016 |
| WO | 2017/024022 A1 | 2/2017 |
| WO | 2017/183043 A1 | 10/2017 |
| WO | 2019-108982 A1 | 6/2019 |
| WO | 2019/152641 A1 | 8/2019 |
| WO | 2020/123881 A1 | 6/2020 |
| WO | 2021/021932 A1 | 2/2021 |

OTHER PUBLICATIONS

Baker, Stephen J., et al., "Discovery of a New Boron-Containing Antifungal Agent, 5-Fluoro-1,3-dihydro-1-hydroxyl-2,1-benzoxaborole (AN2690), for the Potential Treatment of Onychornycosis," Journal of Medicinal Chemistry, vol. 49, No. 15, pp. 4447-4450 (2006).

Hui, Xiaoying, et al., "In Vitro Penetration of a Novel Oxaborole Antifungal (AN2690) into the Human Nail Plate," Journal of Pharmaceutical Sciences, vol. 96, No. 10, pp. 2621-2631 (Oct. 2007).

Li, Xianfeng, et al., "Synthesis and SAR of acyclic HCV NS3 protease inhibitors with novel P4-benzoxaborole moieties," Bioorganic & Medicinal Chemistry Letters, 21 (2011) 2048-2054.

Manabe, Kei, et al., "A Repetitive One-Step Method for Oligoarene Synthesis Using Catalyst-Controlled Chemoselective Cross-Coupling," Org. Lett., vol. 13, No. 9, pp. 2436-2439 (2011).

Sene, Saad, et al., "A combined experimental-computational study of benzoxaborole crystal structures," CrystEngComm, 2014, 16, 4999-5011.

The Pesticide Manual, Fifteenth Edition, British Corp Protection Council, 2009.

International Search Report from corresponding PCT/US2019/047073, dated Dec. 18, 2019.

Label Review Manual; U.S. Environmental Protection Agency, Office of Pesticide Programs, U.S. Government Printing Office: Washington, DC, 1998.

Baur et al.,"Polydisperse ethoxylated fatty alcohol surfactants as accelerators of cuticular penetration. 1. Effects of ethoxy chain length and the size of the penetrants" Pesticide Science 51(2), 131-152, Oct. 1997.

Haynes et al. Arylboronic Acids. VIII Reactions of Boronophthalide. R.R. Haynes and H.R. Snyder. Received Apr. 7, 1964; Nov. 1964; p. 3229-3233.

International Search Report and Written Opinion issued in corresponding International Application No. PCT/US2020/044071, dated Nov. 10, 2020.

Berge et al., Pharmaceutical Salts, Journal of Pharmaceutical Science 66:1-19 (1977).

Hosseinzadeh, R. et al., "A new selective fluorene-based fluorescent internal charge transfer (ICT) sensor for sugar alcohols in aqueous solution", Analytical and bioanalytical chemistry, 2016, vol. 408, No. 7, pp. 1901-1908.

PUBCHEM 403788 Deposited Mar. 26, 2005, pp. 1-17, p. 2.

Rock et al., "An Antifungal Agent Inhibits an Aminoacyl-tRNA Synthetase by Trapping tRNA in the Editing Site," Science 316, 1759 (2007).

Usutani, H. et al., "Development and scale-up of a flow chemistry lithiation-borylation route to a key boronic acid starting material", Organic process research & development, 2017, vol. 21, No. 4, pp. 669-673.

IN 202137010579, "First Examination Report," dated Aug. 29, 2022, 7 pages.

* cited by examiner

Overlay of milled and formulated material (top) and crystalline form A reference (bottom)

XRPD sample of starting material

XRPD sample of milled and formulated material

Overlay of milled and formulated material (top) and crystalline form A reference (bottom)

XRPD sample of milled and formulated material

Overlay of milled and formulated material (top) and crystalline form A reference (bottom)

XRPD sample of starting material

XRPD sample of milled and formulated material

Overlay of milled and formulated material (top) and crystalline form A reference (bottom)

XRPD sample of milled and formulated material

Overlay of milled and formulated material (top) and
crystalline form A reference (bottom)

SOLID FORMS OF SUBSTITUTED BENZOXABOROLE AND COMPOSITIONS THEREOF

CROSS-REFERENCE TO RELATED APPLICATIONS

The present application is a divisional of U.S. patent application Ser. No. 16/544,618, filed Aug. 19, 2019, which claims the benefit of U.S. Provisional Application Ser. No. 62/719,632, filed Aug. 18, 2018, each of which is herein incorporated by reference in its entirety.

TECHNICAL FIELD

The present disclosure relates to solid forms of a substituted benzoxaborole compound, specifically a crystalline form of a compound of formula (I),

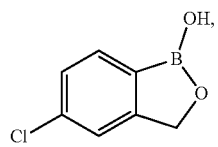

(I)

compositions comprising a crystalline form of the compound of formula (I), and methods of its use.

BACKGROUND

Boron is a unique, and often misconstrued, element of the periodic table due to its powerfully effective and unpredictable biological properties. Initial innovation in the field of boron chemistry was impaired due to the incapacity to prepare pure boron, especially in its crystalline form. Only recently has boron been explored by skilled organometallic chemists for novel and useful applications across the human/animal health and agriculture spectrum. For example, boron-containing molecules such as oxaboroles and benzoxaboroles demonstrate use as antimicrobials (see WO 2016/128949, U.S. Pat. No. 9,617,285, and WO 2016/164589). However, the duplicitous nature of boron-containing compounds places their activities on a broad continuum ranging from highly toxic to exceptionally benign.

While the use of boron, in the form of boric acid, is well known for its application in agriculture, the construction and characterization of more complex molecules containing boron that are both safe and effective has been less explored. Within the field of plant health, fungal, bacterial, insect, and nematode plant pathogens lead to a wide range of diseases, disorders, and other issues including but not limited to rusts, spots, downy mildews, blasts, blotches, stripes, rots, smuts, pathogenic nematodes, *erwinia*, insects, and many others that affect all crops, resulting in massive losses. The need for novel chemistries to combat these diverse pathogens is great.

While the use of benzoxaborole compounds in agriculture has been demonstrated to be beneficial, alternative or improved formulations, as well as their methods of use are required to overcome the limitations of current approaches.

Moreover, boron's ability to covalently bond with other molecules makes it both attractive and difficult to work with. The charge and geometry of the benzoxaborole is in a dynamic equilibrium between the neutral trigonal planar state and the ionic tetrahedral state (illustrated in Scheme 1), that can vary drastically depending on the specific environment the benzoxaborole is located in.

Scheme 1

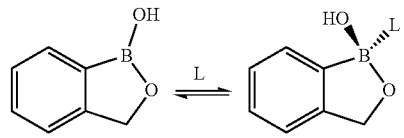

In addition, the Lewis acidic empty p-orbital on the boron atom of the benzoxaborole makes the formulation of benzoxaborole active ingredients unpredictable and difficult compared to traditional organic molecules. This Lewis acidic center readily interacts with formulation components (solvents, surfactants, and adjuvants) in unexpected ways. The state of the benzoxaborole or the interaction of formulation components with the benzoxaborole may also have drastic effects on biological efficacy. Therefore, the formulation of benzoxaborole active ingredients requires novel approaches and considerations not previously considered in the formulation of traditional, non-boron containing formulations, whether agricultural or otherwise. Further, the formulation of those compounds may be laborious due to issues such as pKa, pH, and solubility. These combined characteristics make the formulation of benzoxaborole compounds both an unpredictable and challenging endeavor.

A solid form of the benzoxaborole active ingredient adds an additional layer of complexity to the formulation of benzoxaborole active ingredients. A solid form selected for formulation development can be critical where multiple solid forms exist. Solid forms share an identical chemical formula, but differ in their three-dimensional structure. Additionally, their respective physio-chemical properties including crystal shape, hardness, color, melting point, hydroscopicity, density, solubility, dissolution, dissolution rate, suspensibility, thermodynamic stability, mechanical stability, physical and chemical stability, melting behavior, dissolution rate, and biological availability can vary drastically.

Such variations in the physio-chemical properties can have a drastic effect on the development of the active ingredient and/or formulation of the active ingredient; by choosing the correct solid form, better processing conditions, improved dissolution profile, increased stability, and increased shelf life, for example, can be achieved. For example, for some formulation types such as suspension concentrates, the selection of the correct solid form is key; the recrystallization of a less stable form can affect the properties of the formulated product, resulting in a product that is not useable. Additionally, variations in the solid form may also allow for lower effective rates of use (i.e. it is possible to lower the fungicidally effective amount) by improving bioavailability. Alternatively, use of the other solid forms may lead to the inability to create efficacious formulations.

Further, the production of modern agrochemicals must meet strict requirements. For example, products must meet strict specifications defining the impurity profile of the active ingredient and variance between different batches of the same active ingredient to ensure consistency. It is therefore important to produce the same solid form of the active ingredient in each batch.

These factors, alone or in varying combinations, may affect the biological efficacy of the benzoxaborole. Accordingly, a solid form chosen for further development should have properties, which make it more advantageous relative to another solid form (crystalline form or an amorphous form) of the same compound. As described above, the physical, chemical, and biological properties of a solid form can have a significant effect on the development of production methods and formulations. Unfortunately, predicting whether the solid state of a compound may be present as more than one solid form, or the number of forms, is not possible, nor is it possible to predict the properties of any of these forms (e.g. crystalline form or amorphous form). To ensure the selection of an advantageous form, active ingredient must be screened to determine the number of solid forms available and the solid forms must be then tested as one cannot predict which solid form will confer advantageous properties.

The selection of a specific solid form may allow for the use of specific formulation types, a broader range of formulation types, more stable formations, or more economical preparations of different formulation types relative to other crystalline forms or amorphous forms of the same compound. This can be advantageous for several reasons. For example, a suspension concentrate (SC) formulation may be preferred over an emulsion concentrate (EC) formulation because the lack of organic solvent in SC formulations often leads to a less phytotoxic formulation relative to EC formulations. However, if an unstable solid form is used in an SC formulation, unwanted crystal growth or recrystallization can occur during storage or during application. Such crystal growth is detrimental as it leads to, among others, the thickening and potential solidification of the formulation, leading to blockages in application equipment (e.g., in spray nozzles or in agricultural application machinery) as well as uneven application. Additionally, for example, while the amorphous form may be the most soluble solid form, it can recrystallize as another solid form and destroy the formulated product, rendering the product unusable. Solid forms that are hydrates and solvates can lose their solvent or water during the milling process, or solvates/hydrates can be formed during the milling process, either of which may lead to unstable formulations. Additionally, the solubility of a specific solid form may affect what formulation type is selected for commercialization. The discovery, identification, and use of stable solid forms suitable for the specific intended application can overcomes these issues.

Accordingly, a skilled person will appreciate the advantages of discovering and employing a solid form which solves the problems described above. However, it is not possible to predict by molecular structure alone what the crystalline behavior of a compound will be—it can only be determined empirically. Moreover, one of skill in the art will understand that the solid form that is most advantageous for use is unpredictable.

Solid active ingredients may be screened for their structures by conventional methods known in the art. For example, one characterization includes the use of X-ray powder diffraction (XRPD). Other techniques, which may be used, include differential scanning calorimetry (DSC), thermogravimetric analysis (TGA), Raman or infrared spectroscopy (IR), NMR, and high-pressure liquid chromatography (HPLC). Single crystal X-ray diffraction is also useful.

As described above, the variation in properties of the various solid forms of an active ingredient (such as a benzoxaborole) may have a drastic effect on the bioavailability, stability, and manufacturability an agrochemical. Therefore, it is important to recognize the novelty and use of different solid forms of an active ingredient. It is desired to identify and employ physically stable forms of the active ingredient that are suitable for agrochemical use.

BRIEF SUMMARY OF THE DISCLOSURE

In one embodiment, the present disclosure relates to a crystalline form of a compound of formula I:

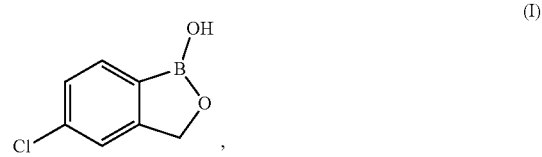 [SMILES: OB1OCc2cc(Cl)ccc21]

5-chlorobenzo[c][1,2]oxaborol-1(3H)-ol, or a pharmaceutically acceptable salt. In one aspect, the crystalline comprises a Crystalline Form A. In another aspect, the crystalline form consist essentially of Crystalline Form A. In another aspect, the Crystalline Form A is substantially free from impurities.

In another aspect, the present disclosure relates to a compound Crystalline Form A of 5-chlorobenzo[c][1,2]oxaborol-1(3H)-ol. In another aspect, the present disclosure relates to a compound Crystalline Form A of 5-chlorobenzo[c][1,2]oxaborol-1(3H)-ol characterized by an X-ray diffraction pattern (XRPD) comprising one or more 2θ angle value selected from: about 16°±1.0, about 23°±1.0, about 25°±1.0, and about 27°±1.0. In one aspect, the Crystalline Form A is characterized by two or more of the listed 2θ angle values. In another aspect, the Crystalline Form A is characterized by three or more of the listed 2θ angle values. In another aspect, The Crystalline Form A is characterized by all four of the listed 2θ angle values.

Another aspect described herein is a compound Crystalline Form A of 5-chlorobenzo[c][1,2]oxaborol-1(3H)-ol having a powder X-ray diffraction pattern substantially the same as FIG. 25. Another aspect described herein the Crystalline Form A has cell parameters of: a=3.8658(6) Å, b=6.3053(10) Å, c=15.082(2) Å, α=98.676(5°), β=91.240(5°), γ=99.207(5°), V=358.34(10) Å3.

Another aspect described herein is a compound Crystalline Form A of 5-chlorobenzo[c][1,2]oxaborol-1(3H)-ol characterized by an onset temperature of 142.7° C.

Another aspect described herein is a compound Crystalline Form A of 5-chlorobenzo[c][1,2]oxaborol-1(3H)-ol characterized by weight loss of 0.5% up to 100° C.

In another aspect, the compounds described herein further comprises wherein the crystalline form is coated by an adjuvant, a wetting agent, a dispersing agent, an agriculturally acceptable polymer, an inert solid or any combination thereof. In another aspect, the compounds described herein characterized by a particle size $D_{50}$ of between (i) about 3.00 μm to about 10.50 μm, (ii) about 3.00 μm to about 7.50 μm, (iii) about 3.00 μm to about 6.50 μm, (iv) about 4.00 μm to about 6.50 μm, or (v) about 4.50 μm to about 6.00 μm. In another aspect, the compounds described herein characterized by a particle size $D_{90}$ of between (i) about 1.00 μm and about 10.00 μm, between (ii) about 7.00 μm to about 30.00 μm, (iii) about 14.00 μm to about 30.00 μm, (iv) about 15.00 μm to about 30.00 μm, (v) about 15.00 μm to about 22.00 μm, or (vi) about 15.00 μm to about 18.00 μm.

Another aspect described herein is an agrochemical composition comprising the compounds described herein and at least one agriculturally acceptable carrier. In one aspect, the agrochemical composition further comprises at least one other active ingredient. In another aspect, the agrochemical composition is an emulsifiable concentrate, a dust, a suspension concentrate, a wettable powder, granule, or a seed treatment. In a further another aspect, the emulsifiable concentrate comprises up to about 95% compound; up to about 30% surface-active agent; and up to about 80% liquid carrier. In further aspect, the dust comprises up to about 10% compound; and up to about 99.9% solid carrier. In a further aspect, the suspension concentrate comprises up to about 75% compound; up to about 94% water; and up to about 10% dispersing and wetting agent. In yet another aspect, the wettable powder comprises: up to about 90% compound; up to about 20% surface-active agent; and up to about 95% solid carrier. In another aspect, the granule comprises: up to about 30% compound; and up to about 99.9% solid carrier.

In another aspect agrochemical composition described herein comprises an effective amount of compound for preventing or controlling microbial infections on plants or plant propagation material. In one aspect, the agrochemical composition further comprises at least one additional active ingredient. In a further aspect, the mixture is a synergistic mixture. In yet another aspect, the microbial infection is a fungal infection. In one aspect, the at least one additional active ingredient is selected from the group consisting of: a fungicide, nematicide, insecticide, antimicrobial, or any combination thereof.

Another aspect described herein is a method of preparing an agrochemical formulation comprising dissolving an antimicrobially effective amount, when used either alone or as a mixture with at least one additional active ingredient, of any of the compounds described herein. Another aspect described herein is a method of controlling microbial infection on plants or plant propagation material comprising treating the plant or the plant propagation material with a antimicrobially effective amount of any of the compound described herein. In a further aspect, the methods described herein comprise a single treatment or multiple treatments.

Another aspect described herein is a method of preparing an agrochemical formulation comprising dissolving an antimicrobially effective amount of any of the compounds described herein in at least one liquid carrier. In a further aspect, the methods described herein further comprise at least one additional active ingredient to form a mixture. In a further aspect, the mixture is a synergistic mixture. In another aspect, the formulation is used to treat a microbial infection. In yet another aspect, the microbial infection is a fungal infection. In another aspect described herein, the at least one additional active ingredient is selected from the group consisting of: fungicide, nematicide, insecticide, antimicrobial, or any combination thereof.

Another aspect described herein is a method of preventing or controlling microbial infection on plants or plant propagation material comprising treating the plant or the plant propagation material with an antimicrobially effective amount of any of the compounds described herein.

Another aspect described herein is a method for preparation of any of the compounds described herein comprising the steps of anti-solvent addition, reverse anti-solvent addition, slow evaporation, slow cooling, slurry at room temperature, slurry at elevated temperature, slurry cycling, vapor-solid diffusion, vapor-solution diffusion, or polymer induced crystallization. In another aspect, the slow cooling is performed in a mixture of isopropyl acetate and ethyl acetate. In yet another aspect, the anti-solvent addition is performed in 1,4-dioxane and water.

In another aspect described herein is a compound of formula II:

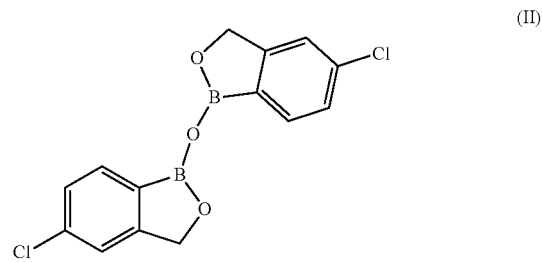 [SMILES: Clc1ccc2c(c1)COB2OB1OCc2cc(Cl)ccc21]

1,1'-oxybis(5-chloro-1,3-dihydrobenzo[c][1,2]oxaborole).

BRIEF DESCRIPTION OF THE DRAWINGS

The present disclosure will now be described by way of the following non-limiting figures, wherein.

DETAILED DESCRIPTION

Figure 1A:
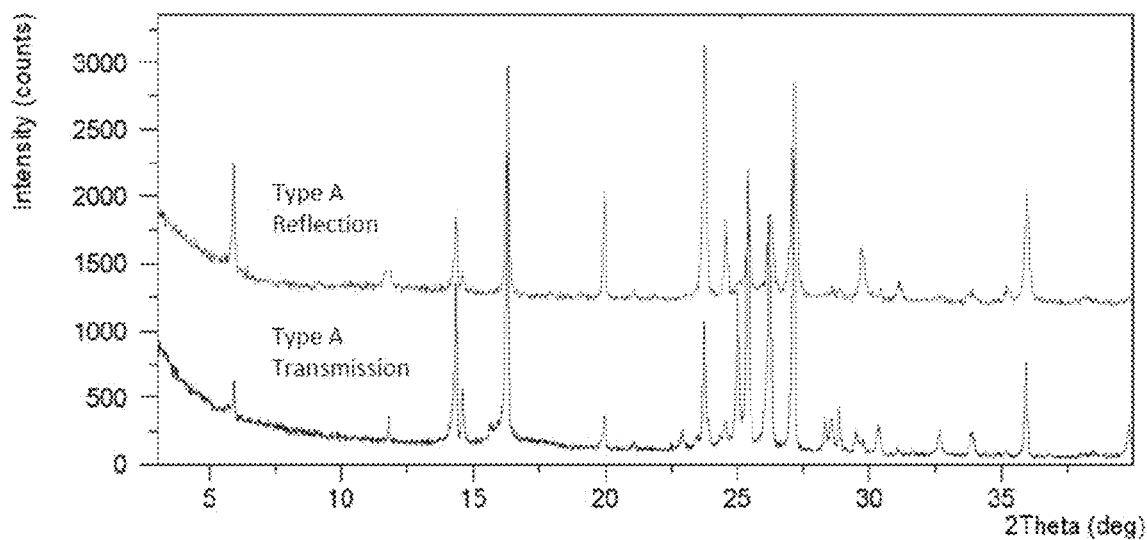
FIG. 1A shows XPRD patterns of starting material.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The phrase "True Fungi" is used herein for all of the organisms discussed herein except for the Oomycota (such as *Pythium, Phytophthora* and Plasmopara). The term "fungi" or "fungus" is used to include all of the organisms discussed herein, including the Oomycota.

In general, "pesticidal" means the ability of a substance to increase mortality or inhibit the growth rate of plant and/or animal pests. The term is used herein, to describe the property of a substance/active ingredient to exhibit activity against microbes, insects, arachnids, parasites, and/or other pests. A substance that is pesticidal is a "pesticide".

The terms "pathogen" and "pest" are used interchangeably herein to broadly include any organism that may be harmful to the entity to which a contemplated compound or composition containing such a compound is administered. A "pathogen" or "pest" is intended to include a microbe, an insect, an arachnid, or a parasite, or other organism that may cause infection or disease directly or as a vector, as well as any combinations thereof. Plant pests are commonly nematodes, insects, arachnids, bacteria, viruses, or fungi, or combinations thereof. Insect and arachnid pests of plants often eat one or more portions of a plant, plant parts, plant propagation materials, and/or harvested fruits or vegetables.

The term "health of a plant" or "plant health" is defined as a condition of the plant and/or its products. As a result of the improved health, yield, plant vigor, quality and tolerance to abiotic or biotic stress may be increased.

The term "fungicide" and "fungicidal" as used herein, refers to the ability of a substance or composition to increase mortality of, control, inhibit, or ameliorate the growth rate of fungi.

The term "microbe" is intended to include any microscopic organism that is harmful to the entity to which a contemplated compound or composition containing such is administered. The term "microbe" is intended to include fungi, bacteria, and viruses, as well as any combinations thereof.

The term "antimicrobial" and "antimicrobially" as used herein, refers to the ability of a substance or composition to increase mortality of, control, inhibit, or ameliorate the growth rate of microbes, particularly fungi.

The term "effective amount", as used herein means the quantity of such a compound, composition, active ingredient, or a combination of such compounds, compositions, or active ingredients to provide the desired local or systemic effect. For example, the amount that is capable of killing, controlling, infecting fungi, retarding the growth or reproduction of microbes (particularly fungi), reducing a microbe (e.g. a fungal) population, and reducing damage to plants caused by microbes (e.g. fungi) is a fungicidally effective amount.

The terms "agriculturally acceptable carrier", "agriculturally acceptable vehicle", and "agriculturally acceptable diluent" are used interchangeably and refer to any medium that provides the appropriate delivery of a compound or active agent(s) as defined herein, does not negatively interfere with the effectiveness of the biological activity of the active agent, and that is sufficiently non-toxic to the host. Agriculturally acceptable carriers can be a solid or a liquid, or any carriers known in the art that are suitable for agricultural applications including solvents that dissolve or suspend the active ingredient, carriers added to a pesticide product to aid in the delivery of the active ingredient, or adjuvants to allow the pesticide to stick to or spread out on the application surface (i.e., leaves). Other adjuvants aid in the mixing of some formulations when they are diluted for application. Additional information concerning carriers can be found in Label Review Manual; U.S. Environmental Protection Agency, Office of Pesticide Programs, U.S. Government Printing Office: Washington, D.C., 1998, which is incorporated herein by reference.

The term "agriculturally acceptable excipient" is conventionally known to mean agriculturally acceptable carriers used in formulating compositions effective for the desired use.

The term "carrier" is used herein to denote a natural or synthetic, organic, or inorganic material that constitutes a portion of a diluent medium in which the active ingredient (e.g. a benzoxaborole) is dispersed or dissolved. This carrier is inert and agriculturally acceptable, in particular to the plant being treated. The phrase "agriculturally acceptable" is utilized herein to be analogous to "pharmaceutically acceptable" as used in pharmaceutical products to describe diluent media. A carrier can be solid (clays, natural or synthetic silicates, silica, resins, waxes, solid fertilizers, and the like) or liquid (water, alcohols, ketones, petroleum fractions, aromatic or paraffinic hydrocarbons, chlorinated hydrocarbons, liquefied gases, and the like). In the presently disclosed formulations, carriers may be solid or liquid. In a preferred embodiment, the carrier is a liquid and the liquid is water.

The terms "formulation" and "agrochemical composition" are used interchangeably and refer to a solid or liquid mixture containing a benzoxaborole derivative and agriculturally acceptable carriers, adjuvants, wetting agents, dispersants, surfactants, and the like. Formulation refers both to concentrated formulations and diluted or applied formulations depending on the desired administration/application. Formulations comprise both the concentrated as well as applied formulations. Examples of formulations include: wettable powders (WP), water dispersable granules (WG or WDG), soluble concentrates (SL), suspension concentrates (SC), emulsifiable/emulsion-concentrates (EC), concentrated aqueous emulsions (EW), microemulsions (ME), suspoemulsion (SE), oil dispersions (OD), microencapuslted particles (CS), soil applied granule on inters or fertilizer carriers (GR), emulsions, suspensions, pre-mixes, tank-mixes, and dosage formulations, etc.

The term "plant propagation material", as used herein, means seeds of all kinds including fruits, tubers, bulbs, grains, cuttings, and cut shoots.

The term "cultivars and plant varieties", as used herein, means plants obtained by conventional propagation and breeding methods which can be assisted or supplemented by one or more biotechnological methods such as the use of double haploids, protoplast fusion, random and directed mutagenesis, molecular or genetic markers, or the use of bioengineering and genetic engineering.

The term "plant parts", as used herein, means all above ground and below ground parts and organs of plants such as shoot, leaf, blossom, root, leaves, needles, stems, branches, blossoms, fruiting bodies, fruits and seed, roots, corms, seeds, and rhizomes. Crops, vegetative, and generative propagating materials such as cuttings, corms, rhizomes, runners, and seeds also belong to plant parts.

The term, "plant-strengthening or resistance-inducing substances", as used herein, means the substances or combinations of substances capable of stimulating the defense system of plants in the manner that, when subsequently inoculated with unwanted phytopathogenic fungi, microorganisms, and viruses, the treated plants display a substantial degree of resistance to these phytopathogenic fungi, microorganisms, and viruses.

In the context of the present disclosure, the term "solid form" of a chemical compound, active ingredient, or composition thereof encompasses amorphous forms and crystalline forms. A crystalline form of a compound contains the constituent molecules arranged in orderly repeating patterns extending in all three spatial dimensions. In contrast, an amorphous solid form has no long-range order in the position of molecules.

The present disclosure has several benefits and advantages. The present disclosure relates to an advantageous crystalline form of a compound of formula (I):

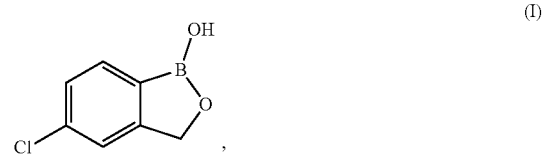 [SMILES: OB1OCc2cc(Cl)ccc21]

US 2016/0324160 discloses that certain benzoxaborole compounds and compositions thereof have antimicrobial activity, specifically anti-fungal activity. In particular, the compound of formula (I) is disclosed:

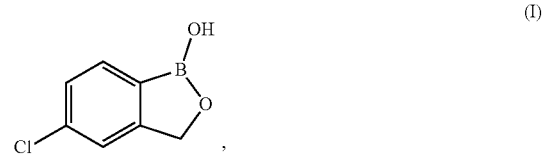 [SMILES: OB1OCc2cc(Cl)ccc21]

Further, mixtures of (I) with other fungicides are disclosed in US 2016/0324160.

New solid forms of (I), compositions thereof, and methods for the preparation of (I) and its compositions and use have now been discovered.

Accordingly, the present disclosure relates to a crystalline form of a compound of formula (I):

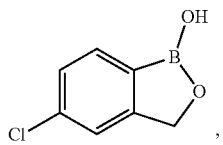
(I)

which may be referred to as 5-chlorobenzo[c][1,2]oxaborol-1(3H)-ol, wherein the crystalline form is crystalline form A.

The crystalline form A may be characterized by the unit cell parameters of its single crystal as shown in Table A. This solid form, referred to herein as "crystalline form A" or "the crystalline form" or "Type A" was obtained by methods described in Examples 1-3.

TABLE A

| Crystal System | Triclinic |
|---|---|
| Space Group | P$\bar{1}$ |
| Unit Cell Dimensions | a = 3.8658(6) Å, b = 6.3053(10) Å, c = 15.082(2) Å, α = 98.676(5)°, β = 91.240(5)°, γ = 99.207(5)° |
| Volume (Å$^3$) | 358.34(10) Å$^3$ |
| Z, Calculated density | 2, 1.561 g/cm$^3$ |

In TABLE A, a, b, c=length of the edges of the unit cell and α, β, γ=angles of the unit cell.

Thus, in one embodiment of the present disclosure, the crystalline form of the disclosure has the following lattice parameters: a=3.8658(6) Å, b=6.3053(10) Å, c=15.082(2) Å, α=98.676(5)°, β=91.240(5)°, γ=99.207(5)°, and volume=358.34(10) Å$^3$.

The crystalline form A may also be characterized by an X-ray powder diffraction pattern expressed in terms of 2θ angles or d spacings. Thus, in another embodiment of the disclosure, the crystalline form A has an X-ray powder diffraction pattern comprising 2θ angles at values of about 16°, 23°, 25°, and 27°. A full list of 2θ angles and d spacings are in Example 6. The values are generated using the instrument parameters detailed in Example 1.

An additional solid form was also identified in the screening experiments. This solid form has the characteristics of an amorphous material.

Crystalline form A was formed under several screening conditions, demonstrating that it was a robust solid form across a wide array of solvents and conditions. Accordingly, crystalline form A, the crystalline form of the disclosure, was selected for further development, since crystalline forms are considered advantageous for the reasons outlined above.

In some embodiments, the crystalline form of the disclosure, crystalline form A, may be coated by an adjuvant, a wetting agent, a dispersing agent (also referred to herein as a dispersant), or absorbed to an agriculturally acceptable polymer, or an inert solid or any combination thereof. The crystalline form of such a composition is able to be identified by the same methods as the uncoated form crystalline form using methods herein described.

The crystalline form of the disclosure may be applied in its unchanged form, but is more preferably incorporated into an agrochemical composition. In a further aspect, the disclosure provides an agrochemical composition comprising the crystalline form of the disclosure as defined above and at least one agriculturally acceptable carrier. It is contemplated, due to the compound's biological activity, that the crystalline form of the disclosure may also be incorporated into pharmaceutical compositions.

Accordingly, the disclosure disclosed herein also includes an agrochemical composition comprising: a crystalline form of the compound of formula (I):

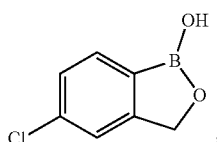
(I)

wherein the crystalline form is crystalline form A, and at least one agriculturally acceptable carrier. The agrochemical composition may be, for example, an emulsifiable concentrate (EC), a dust, a suspension concentrate (SC), a wettable powder (WP), a granule, a water dispersible granule (WDG), or a seed treatment.

In some embodiments, the agrochemical composition in an emulsifiable concentrate, wherein the emulsifiable concentrate comprises, for example: 1-50% dissolved crystalline form A, 1 to 30% surface-active agent; and 20 to 98% liquid carrier. In other embodiments, the emulsifiable concentrate is 5-50% dissolved crystalline form A, 5-10% surface-active agent, and 40-90% liquid carrier.

In other embodiments, the agrochemical composition is a dust, wherein the dust comprises, for example: 0.1% to 10% crystalline form A and 99.9 to 90% solid carrier.

In another embodiment, the agrochemical composition is a suspension concentrate, wherein the suspension concentrate comprises, for example crystalline form A, dispersing agent, wetting agent, rheology modifier, anti-freeze, antifoam, biocide, and water. An exemplary formulation comprises: about 20-70% crystalline form A, about 0.5-10% dispersing/wetting agent, about 0.1-0.5% rheology modifier, about 0.1-10% antifreeze, about 0.1-0.5% antifoam, about 0.05-0.2% biocide, with the remainder of the SC formulation comprising water. A contemplated SC formulation further comprises an adjuvant.

In another embodiment, the agrochemical composition is a wettable powder, wherein the wettable powder comprises, for example: 0.5 to 90% crystalline form A and 0.5 to 20% wetting agents and dispersants with the remainder of the wettable powder formulation comprising a solid carrier. In other embodiments, the wettable powder comprises: 10-90% crystalline form A, 1-3% wetting agent, and 2-5% dispersant, with the remainder of the wettable powder formulation comprising a solid carrier.

In another embodiment, the agrochemical composition is a granule (for example, a water dispersible granule), wherein the granule comprises, for example: 0.5 to 30% crystalline form A and solid carrier. In other embodiments, the granule comprises: 10-90% crystalline form A, 1-12% wetting agent, and 1-12% dispersant, with the remainder of the granule formulation comprising a solid carrier.

In another embodiment, the agrochemical composition is a seed treatment, wherein the seed treatment comprises, for example: crystalline form A, and one or more of a dispersing agent, a wetting agent, a rheology modifier, an anti-freeze, a biocide, a binder/film former system, a coloring agent, and optionally other property modifiers. Seed treatment formulations are commonly made from pre-prepared suspension concentrate formulations.

In yet another embodiment, the agrochemical composition comprises an antimicrobially effective amount of crystalline form A for preventing or controlling microbial infection on plants or plant propagation material.

In yet another embodiment, the agrochemical composition comprises a fungicidally effective amount of crystalline form A for preventing or controlling fungal infection on plants or plant propagation material.

The present disclosure also encompasses a method of preparing an agrochemical composition comprising dissolving an antimicrobially effective amount of a crystalline form of the compound of formula (I):

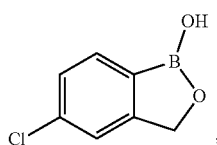
(I)

wherein the crystalline form is crystalline Form A, in a liquid carrier (a solvent). In another embodiment, the agrochemical composition comprises less than an effective amount. In another embodiment, the antimicrobially effective amount is a fungicidally effective amount. In some embodiments, the agrochemical composition is an emulsion concentrate. The agrochemical composition can further comprise a second liquid carrier(s). In some embodiments, the liquid carrier and/or the second liquid carrier is an organic solvent, a protic solvent, an aprotic solvent, an oil, or any combinations thereof. The agrochemical composition may additionally comprise, for example, emulsifiers such as surface active agents (surfactants), ionic surfactants, non-ionic surfactants, and adjuvants.

The present disclosure also encompasses a method of preparing an agrochemical composition comprising suspending an antimicrobially effective amount of a crystalline form of the compound of formula I:

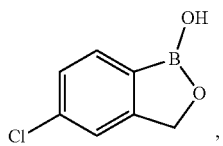
(I)

wherein the crystalline form is crystalline Form A, in at least one carrier. The carrier can be a solid or a liquid. In another embodiment, the agrochemical composition comprises less than an effective amount. In another embodiment, the antimicrobially effective amount is a fungicidally effective amount. In some embodiments, the agrochemical composition is a suspension concentrate. In one aspect, the suspension concentrate comprises a liquid carrier and the liquid carrier is water. Such a suspension concentrate may additionally comprise, for example, dispersing agents and wetting agents.

Suspension concentrate formulations may be used to prepare additional formulations such as seed treatment formulations. Accordingly, another aspect of the disclosure is a seed treatment formulation wherein a seed is coated with an agrochemical composition comprising a crystalline form of the compound of formula

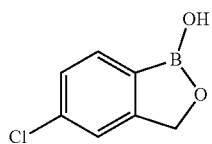
(I)

wherein the crystalline form is crystalline Form A.

The formulations/agrochemical compositions described herein may comprise a carrier and may be conveniently formulated in a known manner into emulsifiable concentrates, suspension concentrates, coatable pastes, directly sprayable or dilutable solutions, emulsions, wettable powders, soluble powders, dusts, granulates, and/or encapsulations in polymeric substances. The carrier can be any solid carrier or a liquid carrier known in the art suitable for agrochemical compositions. The type of the compositions and the methods of applications such as spraying, atomizing, dusting, scattering, coating or pouring, are chosen based on objectives and the circumstances. A contemplated composition can contain adjuvants such as stabilizers, antifoams, viscosity regulators, binders, or tackifiers, fertilizers, micronutrient donors, additives that enhance plant uptake, spreaders, stickers, or other compositions for obtaining special effects. Such adjuvants can be included in the agrochemical composition/formulation or tank mixed with the agrochemical composition/formulation prior to application.

Suitable carriers and adjuvants (auxiliaries) can be either solid or liquid and are substances in formulation technologies such as natural or regenerated mineral substances, solvents, dispersants, wetting agents, tackifiers, thickeners, binders, or fertilizers. The diluent media, as described in WO 97/33890, is incorporated by reference. Water-based diluent media are preferred.

Contemplated formulations include any conventional formulation such a powder, an emulsion, a flowable concentrate, a solution, a water dispersible powder, a capsule suspension, a gel, a cream, an emulsion concentrate, a suspension concentrate, a suspo-emulsion, a capsule suspension, a water dispersible granule, an emulsifiable granule, a water in oil emulsion, an oil in water emulsion, a microemulsion, an oil dispersion, an oil miscible liquid, a soluble concentrate, an ultra-low volume suspension, an ultra-low volume liquid, a technical concentrate, a dispersible concentrate, a wettable powder, a suspension, or any technically feasible formulation.

Crystalline form A compositions of the current disclosure can be produced by one skilled in the art through mixing the crystalline form A with appropriate formulation inerts such as solid or liquid carriers and additional ingredients such as surface-active compounds (surfactants), biocides, antifreeze agents, stickers, thickeners, and compounds that provide adjuvant effects and the like. In addition, conventional slow release formulations can be employed where long-lasting efficacy is intended.

Formulations to be applied in spraying forms, such as emulsion concentrates, water dispersible granules, wettable powders, granules, and suspension concentrates can contain surfactants, wetting agents, dispersing agents, and optionally other compounds that provide adjuvant effects.

A commercial product of the agrochemical composition is preferably formulated as a concentrate (an agrochemical composition), and the end user normally employs a diluted formulation or an applied formulation for administration to the plants of interest. Such a diluted formulation or dilution composition is referred to as a tank-mix composition or an applied formulation. A tank-mix composition or applied formulation is prepared by diluting a formulation comprising crystalline form A with a carrier such as water and also can contain further auxiliaries as an option. However, an aqueous tank-mix is preferred.

Each of the above formulations can be prepared as a package containing the crystalline form of the disclosure together with other ingredients of the formulation (carriers, diluents, emulsifiers, surfactants, wetting agents, dispersing agents, etc.). The formulations can also be prepared by a tank mix method, in which the ingredients are obtained separately and combined at the grower site.

These formulations can be applied to the areas where control is desired by conventional methods. Dust and liquid formulations, for example, can be applied by the use of power-dusters, broom and hand sprayers and spray dusters. The formulations can also be applied from airplanes as a dust, a spray, or by rope wick applications. Both solid and liquid formulations may also be applied to the soil in the locus of the plant to be treated, allowing the active ingredient to penetrate the plant through the roots.

The formulations of the disclosure may be used for dressing applications/seed treatments on plant propagation material to provide protection against microbial infections such as fungal infections on the plant propagation material as well as against microbes (particularly fungi) occurring in the soil. The compound of formula (I) may be applied to plant propagation material to be protected by impregnating the plant propagation material, in particular, seeds, either with a liquid formulation (e.g. an SC) of the crystalline form A. In some cases, other types of applications are possible, for example, the specific treatment of plant cuttings or twigs serving as propagation materials. In some embodiments, the agrochemical compositions and formulations of the present disclosure are applied prior to disease pressure.

Suitable surface-active compounds (also referred to herein as surface-active agents or surfactants) are non-ionic, or ionic surfactants (cationic and/or anionic), and have good emulsifying, dispersing and wetting properties. The term "surfactants" is also to be understood as meaning mixtures of at least one surfactant. As used herein, the term "surfactant" includes wetting agents and dispersing agents, and other compounds that provide adjuvancy effects.

Preferred non-ionic surfactants include, but are not limited to, high molecular weight polymers, polycondensates of ethylene oxide with fatty alcohols or with fatty acids or with fatty amines, substituted phenols (in particular alkylphenols or arylphenols such as mono- and di-(polyoxyalkylene alkylphenol), polycondensates of ethylene oxide with phosphated tristyrylphenols and polycondensates of ethylene oxide with phosphoric esters of alcohols or phenols, amine ethoxylates, castor oil ethoxylates and polyethylene glycol derivatives of hydrogenated castor oil, sorbitan fatty acid ester ethoxylates, sorbitan fatty acid esters, non-ionic ethoxylates, branched and unbranched secondary alcohol ethoxylates, nonylphenol ethoxylates, octylphenol ethoxylates, fatty alcohol ethoxylates, alkyl phenol ethoxylates, castor oil based ethoxylates, fatty acid ethoxylates, EO-PO block co-polymers, acrylic co-polymers, styrene acrylic polymers, sorbitan(ol) ester ethoxylates, sarcosinates, alkyl polysaccrharides, alkyl amine ethoxylates, amine oxides, siliconics, ethoxylated Graft & Comb polymers, and propoxylated and non-ethoxylated Graft & Comb polymers.

Preferred ionic surfactants include, but are not limited to, alkyl ether phosphates, alkyl phenol ether phosphates, alkyl phenol ether sulphates, condensed naphthalene sulfonates and salts, sodium alkyl naphthalene sulphonate blends, sodium naphthalene sulphonate condensate, aromatic hydrocarbon sulfonic acids, aromatic hydrocarbon sulfonic salts, aromatic hydrocarbon sulfonic blends, fatty alcohol sulphates, alkyl ether carboxylic acids, alkyl ether carboxylic salts, alkyl ether sulphates, monosulphosuccinates, polysulphosuccinates, alkyl phosphates, alkyl benzene sulphonic acids, alkyl benzene sulphonic salts, lignosulphonates and salts, alkylaryl sulphonates, alkylbenzene sulphonates, and alpha olefin sulphonates.

In some embodiments of the present disclosure, the surfactant is at least one of a fatty alcohol ethoxylate, alkyl phenol ethoxylate, castor oil based ethoxylate, fatty acid etoxylate, EO-PO block co-polymer, acrylic co-polymer, styrene acrylic polymer, sorbitan(ol) ester ethoxylate, sarcosinate, alkyl polysaccrharide, alkyl amine ethoxylate, amine oxide, siliconics, graft and/or comb polymer (ethoxylated or propoxylated and non ethoxylated), alkyl ether phosphate, alkyl phenol ether phosphate, alkyl phenol ether sulphate, condensed naphthalene sulfonate and/or salt, sodium alkyl naphthalene sulphonate blend, sodium naphthalene sulphonate condensate, aromatic hydrocarbon sulfonic acid/salt and their blends, fatty alcohol sulphate, alkyl ether carboxylic acid and/or salt, alkyl ether sulphate, mono- and/or polysulphosuccinate, alkyl phosphate, alkyl benzene sulphonic acid and/or salt, lignosulphonate and/or salt, and alpha olefin sulphonate. In another preferred embodiment, the surfactant is at least one of a(n): amine ethoxylates, alkylaryl sulphonates, alkylbenzene sulphonates, castor oil ethoxylates and polyethylene glycol derivatives of hydrogenated castor oil, sorbitan fatty acid ester ethoxylates, sorbitan fatty acid esters, non-ionic ethoxylates, branched and unbranched secondary alcohol ethoxylates, nonylphenol ethoxylates, and octylphenol ethoxylates.

When the formulation is a suspension concentrate, the formulation may comprise a wetting agent and a dispersing agent. In SC formulations, wetting agents are compounds that are used to prevent particles from clumping together before and during the milling process. Dispersants absorb to the surface of the milled particles to prevent flocculation and agglomeration. Examples of wetting agents include ATLAS™ G-5002L (an exemplary polymeric emulsifier) and ATLOX™ 4894 (an exemplary nonionic surfactant blend). Examples of dispersants include ATLOX™ 4913 LQ (a polymeric surfactant) and ATLOX™ Metasperse 500L (a polymeric dispersant solution). Wetting agents and dispersants may act via a steric or electronic mechanism.

Solid, particulate carriers that can be used, for example for dusts and dispersible powders, are kaolinite, lactose, calcite, talc, kaolin, diatomaceous earth, montmorillonite or attapulgite, highly-disperse silica or absorptive polymers. Illustrative particulate, adsorptive carriers for granules include kaolinite, lactose, pumice, crushed brick, sepiolite or bentonite, montmorillonite-type clay, and exemplary non-sorbent carrier materials are calcite or dolomite. A particulate solid formulation can also be prepared by encapsulation of a suitable mixture of fungicides, pesticides, or insecticides or by a granulation process that utilizes one or more of the above diluents or an organic diluent such as microcrystalline cellulose, rice hulls, wheat middlings, saw dust, and the like. Illustrative granules can be prepared as discussed in U.S. Pat. Nos. 4,936,901, 3,708,573 and 4,672,065.

Suitable liquid carriers include: substituted aromatic hydrocarbons, in particular the fractions $C_8$-$C_{12}$, such as xylene mixtures or substituted naphthalenes, phthalic esters such as dibutyl or dioctyl phthalate, substituted aliphatic hydrocarbons such as limonene, alcohols and glycols as well as their ethers and esters, such as ethylene glycol monomethyl ether or benzyl alcohol, ketones such as cyclohexanone or isophorone, strongly polar solvents such as N-methyl-2-pyrrolidone, dimethyl sulfoxide or dimethylformamide, and, if appropriate, and epoxidized vegetable oils such as soybean oil. If appropriate, the liquid carrier can be a naturally occurring essential oil, such as oils from citronella, castor, lemon, citrus fruits, and lemon grass. In a preferred embodiment, the liquid carrier is water.

In one embodiment, a suspension concentrate formulation includes crystalline form A in an amount of about 15% by weight to about 70% by weight, in particular about 15% by weight to about 50% by weight, in particular about 20% by weight to about 50% by weight, in particular about 20% by weight to about 40% by weight. In one aspect, an embodiment includes glycerin in an amount of about 2 to about 10% by weight, in particular about 5% by weight to about 10% by weight, in particular about 5% by weight. In one aspect, an embodiment includes a wetting agent, such as ATLAS™ G-5002L or ATLOX™ 4894, in an amount of about 0.2% by weight to about 5% by weight, in particular about 0.4% by weight to about 5% by weight, in particular about 0.4% by weight to about 2.5% by weight. In one aspect, an embodiment includes a dispersing agent, such as ATLOX™ 4913 LQ or Metasperse 500L, in an amount of about 0.2% by weight to about 5% by weight, in particular about 0.4% by weight to about 5% by weight, in particular about 0.4% by weight to about 2.5% by weight. In one aspect, an embodiment includes an antifoaming agent, such as Momentive™ SAG30 or JT Baker Antifoam B silicone emulsion, in an amount of about 0.1% by weight. In one aspect, an embodiment includes an antimicrobial agent, such as Proxcel™ or 1,2-benzothiazol-3(2H)-one in an effective amount, in particular about 0.001% by weight to about 0.2% by weight, in particular 0.004% by weight to about 0.2% by weight, in particular 0.02% by weight to about 0.2% by weight, in particular about 0.06% by weight to about 0.2% by weight, in particular 0.08% by weight to about 0.2% by weight. In one aspect, an embodiment includes a thickening agent such as Kelzan™ in an amount of about 0.1% by weight to 1.0% by weight. In one aspect, an embodiment includes a rheology modifier, such as xanthan gum in an amount of about 0.1% by weight to about 1.0% by weight.

In one embodiment, a suspension concentrate formulation includes crystalline form A with adjuvants that are favorable to agrochemical applications, including polysorbate, such as Tween 22, alkoxylated polyol ester, such as Atplus™ UEP-100, alkoxylated alcohol, such as Atplus™ PFA, methylated seed oil blend, such as Atplus™ MSO-HS 500, and blend of latex emulsion and trisiloane alkoxylate, such as Silwet Stik2.

A contemplated formulation can also include at least one polymer that is a water-dispersible film-forming polymer that improves the adherence of at least the antimicrobial to the treated plant propagation material. Suitable polymers include those known in the art for use in agrochemical compositions. Such compositions may also comprise a water soluble dye.

The formulations of the disclosure may further comprise suitable penetrants (adjuvants) to be applied in the present context. This includes substances, which are typically used in order to enhance the penetration of active agrochemical compounds into plants. Penetrants in this context are able to penetrate the cuticle of the plant and thereby increase the mobility of the active compounds in the cuticle. This property can be determined using the method described in the literature (Baur et al., 1997, Pesticide Science 51, 131-152).

The agrochemical compositions comprising the crystalline form A of the present disclosure are preventively and/or curatively valuable in the field of pest control, even at low rates of application. Specifically, the crystalline form A of the disclosure and compositions of the disclosure have a favorable antimicrobial, particularly fungicidal, spectrum. Compositions of the disclosure are particularly advantageous in that they may act against resistant fungi.

The present disclosure also encompasses a method of preventing or controlling a microbial infection on plants or plant propagation material comprising treating the plant or plant propagation material with an effective amount of a crystalline form of the compound of formula (I):

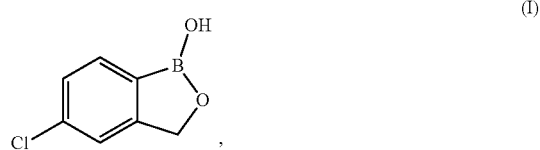 [SMILES: OB1OCc2cc(Cl)ccc21]

wherein the crystalline form is crystalline form A.

The present disclosure also encompasses a method of preventing or controlling fungal infection on plants or plant propagation material comprising treating the plant or plant propagation material with a fungicidally effective amount of a crystalline form of the compound of formula (I):

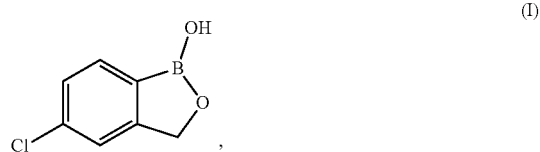 [SMILES: OB1OCc2cc(Cl)ccc21]

wherein the crystalline form is crystalline form A.

The present disclosure also encompasses a method of preventing or controlling microbial infection on plants or plant propagation material comprising treating the plant or plant propagation material with an effective amount of an agrochemical composition comprising a crystalline form of the compound of formula (I):

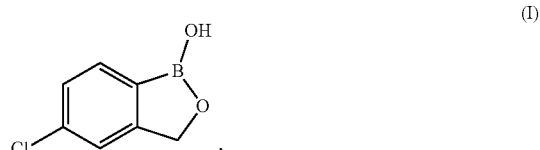

wherein the crystalline form is crystalline form A.

The present disclosure also encompasses a method of preventing or controlling fungal infection on plants or plant propagation material comprising treating the plant or plant propagation material with a fungicidally effective amount of an agrochemical composition comprising a crystalline form of the compound of formula (I):

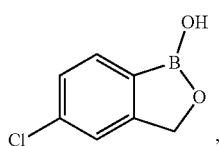
(I)

wherein the crystalline form is crystalline form A.

The agrochemical compositions comprising crystalline form A of the present disclosure may be used for the control of plant pathogenic microbes (e.g. fungi) on a number of plant species. Accordingly, the disclosure provides a method of preventing or controlling microbial (particularly fungal) infections on plants or plant propagation materials comprising treating the plant or plant propagation material with an antimicrobially effective amount of the agricultural composition of the disclosure. The disclosure also provides a method of preventing or controlling microbes on plants or plant propagation materials comprising treating the plant or plant propagation materials with the antimicrobially effective amount of the agricultural composition of the disclosure.

In some embodiments, the crystalline form A is used in less than an antimicrobially effective amount. In some embodiments, the crystalline form A is used in less than a fungicidally effective amount. In these embodiments, the crystalline form A may be used in combination with other active ingredients. In some embodiments, this combination is synergistic.

The disclosed composition with favorable tolerance by plants, the environment, and favorable homeotherm toxicity, is suitable for protecting plants and plant organs, increasing harvest yields, and improving the quality of the harvested material. It is preferred in its application as crop protection composition. It is active against normally sensitive and resistant species and against all or some stages of development.

The rate at which the agrochemical compositions of the disclosure are applied will depend upon the particular type of microbes (particularly fungi) to be controlled, the degree of control required, and the timing and method of application and can be readily determined by the person skilled in the art.

The agricultural composition of the disclosure may further comprise at least one further active ingredient selected from the group consisting of: a second fungicide, a nematicide, an insecticide, and a second antimicrobial, or any combinations thereof. In a preferred embodiment, the at least one further active ingredient is a second fungicide. Further examples of further active ingredients include agronomic chemicals such as bactericides and herbicides, as well as plant nutrients and plant fertilizers. The present disclosure enables the use of a composition together with one or more pesticides, plant nutrients, or plant fertilizers. The combination may encompass specific plant traits incorporated into the plant using any means such as conventional breeding or genetic modification.

A particular aspect of the disclosure involves the agrochemical composition comprising crystalline form A and a second fungicide. In a preferred embodiment, the agrochemical composition comprises crystalline form A and a second fungicide in a synergistic mixture.

The agrochemical compositions comprising crystalline form A and other active substances may have other surprising advantages which can be described as synergistic activity, better tolerance by plants, reduced phytotoxicity, increased anti-fungal activity, overall decreased pesticide use, and/or better behavior relating to production such as grinding, mixing, storage or use.

When the agrochemical composition comprises at least one further active ingredient that is a fungicide, the fungicide has a preselected mode of action as described by the FRAC Target Site Code. In some embodiments, the preselected FRAC Target Site Code is selected from the group consisting of: B1, B3, C2, C3, C4, C6, D1, E1, E2, E3, G1, H5, M4, and M5.

When the agrochemical composition comprises at least one further active ingredient that is a second fungicide, the second fungicide is selected from one or more of the group consisting of: carbendazim, thiabendazole, thiophanate, thiophanate-methyl, diethofencarb, zoxamide, ethaboxam, pencycuron, fluopicolide, metrafenone, pyriofenone, flutolanil, fluopyram, fluxapyroxad, penthiopyrad, benodanil, mepronil, isofetamid, fenfuram, carboxin, oxycarboxin, thifluzamide, benzovindiflupyr, bixafen, furametpyr, inpyrfluxam, isopyrazam, penflufen, sedaxane, isoflucypram, pydiflumetofen, pyraziflumid, boscalid, benomyl, fuberidazole, diflumetorim, tolfenpyrad, fenazaquin, azoxystrobin, coumaxystrobin, enoxastrobin, flufenoxystrobin, picoxystrobin, pyraoxystrobin, mandestrobin, pyraclostrobin, pyrametostrobin, triclopyricarb, kresoximmethyl, trifloxystrobin, dimoxystrobin, fenamistrobin, methominostrobin, orysastrobin, famoxadone, fluoxastrobin, fenamidone, pyribencarb, cyazofamid, amisulbrom, fenpicoxamid, binapacryl, meptyldinocap, dinocap, fluazinam, ferimzone, fentin chloride, fentin acetate, fentin hydroxide, silthiofam, ametoctradin, cyprodinil, mepanipyrim, pyrimethanil, kasugamycin, blasticidin-s, quinoxyfen, proquinazid, fenpiclonil, fludioxonil, nuarimol, imazalil, oxpoconazole, pefurazoate, prochloraz, triflumizole, azaconazole, bitertanol, bromuconazole, cyproconazole, difenoconazole, diniconazole, epoxiconazole, etaconazole, fenbuconazole, fluquinconazole, flusilazole, flutriafol, hexaconazole, imibenconazole, ipconazole, metconazole, myclobutanil, penconazole, propiconazole, simeconazole, tebuconazole, tetraconazole, triadimefon, triadimenol, triticonazole, prothioconazole, aldimorph, dodemorph, fenpropimorph, tridemorph, fenpropidin, spiroxamine, fenhexamid, fenpyrazamine, piperalin, pyributicarb, naftifine, terbinafine, validamycin, polyoxin, dimethomorph, flumorph, pyrimorph, benthiavalicarb, iprovalicarb, valifenalate, mandipropamid, copper, sulphur, ferbam, mancozeb, maneb, metiram, propineb, thiram, zineb, zinc thiazole, ziram, captan, captafol, folpet, dichlofluanid, tolylfluanid, chlorothalonil, chlozolinate, dimethachlone, anilazine, iprodione, procymidone, vinclozolin, triforine, pyrifenox, pyrisoxazole, fenarimol, guazatine, iminoctadine, dithianon, chinomethionat, quinomethionate, fluoroimide, methasulfocarb, and phenamacril.

The mixing partners may exist in the form of any suitable agrochemically acceptable ester or salt, as mentioned in The Pesticide Manual, Fifteenth Edition, British Crop Protection Council, 2009.

The crystalline form of the disclosure can be used to control one or more target microbes or prevent the growth of one or more target microbes. Accordingly, the agrochemical composition of the disclosure can be used to control one or more target microbes or prevent the growth of one or more target microbes.

The crystalline form of the disclosure can be used to control one or more target fungi or prevent the growth of one or more target fungi. Accordingly, the agrochemical composition of the disclosure can be used to control one or more target fungi or prevent the growth of one or more target fungi.

The crystalline form of the disclosure can exhibit outstanding efficacy against a broad spectrum of phytopathogenic fungi, including soil borne pathogens, which are in particular members of the classes Plasmodiophoromycetes, Peronosporomycetes (Syn. Oomycetes), Chytridiomycetes, Zygomycetes, Ascomycetes, Basidiomycetes, and Deuteromycetes (Syn. Fungi imperfecti). Some fungicides are systemically active and can be used in plant protection as foliar, seed dressing or soil fungicide. Furthermore, they are suitable for combating fungi, which, inter alia, infest wood or roots of plant.

Examples of target fungi include: one or more members of the phyla of Ascomycota, Oomycota, Basidiomycota, and the subphylum Mucoromycotina.

The target fungi of the division Ascomycota include, for example, subdivision Pezizomycotina and Taphrinomycotina which include Dothideomycetes, Leotiomycetes, Sordariomycetes and Taphrinomycetes classes.

The target fungi of the division Basidiomycota include, for example, subdivisions Agaricomycotina, Pucciniomycotina, and Ustilaginomycotina.

In some embodiments, the one or more target fungi whose growth is to be controlled or inhibited is selected from one or more of the group consisting of *Alternaria, Aspergillus, Bipolaris, Blumeria, Botrytis, Candida, Cercospora, Cercosporidium, Claviceps, Cochliobolus, Colletotrichum, Corynespora, Dybotryon, Dilophospora, Erysiphe, Exserohilum, Fusarium, Leveillula, Magnaporthe, Melampsora, Microsphaera, Microsphaeropsis, Monilia, Monilinia, Mycosphaerella, Oidiopsis, Peronospora, Phaeosphaeria, Phakopsora, Phomopsis, Phymatotrichum, Phytophthora, Plasmopora, Podosphaera, Pseudoperonospora, Puccinia, Pyrenophora, Pyricularia, Pythium, Rhizoctonia, Sclerophthora, Sclerotinia, Septoria, Setosphaeria, Stangospora, Uncinula, Ustilago, Venturia, Verticillium*, and *Zymoseptoria*.

In yet another aspect of the disclosure is a compound of formula (II):

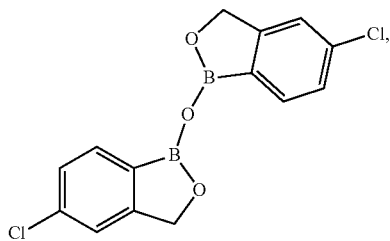

(II)

which may be referred to as 1,1'-oxybis(5-chloro-1,3-dihydrobenzo[c][1,2]oxaborole).

The compound of formula (II) can be prepared by heating the compound of formula (I) under vacuum or by exposing the compound of formula (I) to dehydrating conditions. The compound of formula (II) is advantageous in that it reverts to the compound of formula (I) once it is exposed to water.

Plants that are treated in accordance with the disclosure include the following plants: maize, soya bean, alfalfa, cotton, sunflower, *Brassica* oil seeds such as *Brassica napus* (e.g. canola, rapeseed), *Brassica rapa, B. juncea* (e.g. field mustard), *Brassica carinata, Arecaceae* sp. (e.g. oilpalm, coconut, rice, wheat, sugar beet, sugar cane, oats, rye, barley, millet and sorghum, triticale, flax, nuts, grapes and vine and various fruit and vegetables from various botanic taxa), *Rosaceae* sp. (e.g. pome fruits such as apples and pears, but also stone fruits such as apricots, cherries, almonds, plums, peaches, and berry fruits such as strawberries, raspberries, red and black currant, and gooseberry), *Ribesioidae* sp., *Juglandaceae* sp., *Betulaceae* sp., *Anacardiaceae* sp., *Fagaceae* sp., *Moraceae* sp., *Oleaceae* sp. (e.g. olive tree), *Actinidaceae* sp., *Lauraceae* sp. (e.g. avocado, cinnamon, camphor), *Musaceae* sp. (e.g. banana trees and plantations), *Rubiaceae* sp. (e.g. coffee), *Theaceae* sp. (e.g. tea), *Sterculiceae* sp., *Rutaceae* sp. (e.g. lemons, oranges, mandarins, and grapefruit), *Solanaceae* sp. (e.g. tomatoes, potatoes, peppers, *capsicum*, aubergines, tobacco), *Liliaceae* sp., *Compositae* sp. (e.g. lettuce, artichokes and chicory including root chicory, endive or common chicory), *Umbelliferae* sp. (e.g. carrots, parsley, celery and celeriac), *Cucurbitaceae* sp. (e.g. cucumbers—including gherkins, pumpkins, watermelons, calabashes and melons), *Alliaceae* sp. (e.g. leeks and onions), *Cruciferae* sp. (e.g. white cabbage, red cabbage, broccoli, cauliflower, Brussels sprouts, pak choi, kohlrabi, radishes, horseradish, cress and chinese cabbage), *Leguminosae* sp. (e.g. peanuts, peas, lentils, and beans such as common beans and broad beans), *Chenopodiaceae* sp. (e.g. Swiss chard, fodder beet, spinach, beetroot), *Linaceae* sp. (e.g. hemp), *Cannabeacea* sp. (e.g. *cannabis*), *Malvaceae* sp. (e.g. okra, cocoa), Papaveraceae (e.g. poppy), Asparagaceae (e.g. asparagus), useful plants and ornamental plants in the garden and woods including turf, lawn, grass, and *Stevia rebaudiana*. In each case it also includes genetically modified types of these plants.

Other plants that can be treated in accordance with the disclosure are selected from the group consisting of fruits and vegetables from various botanic taxa including *Rosaceae* sp. (e.g. pome fruits such as apples and pears, but also stone fruits such as apricots, cherries, almonds, plums and peaches, and berry fruits such as strawberries, raspberries, red and black currant and gooseberry), *Ribesioidae* sp., *Juglandaceae* sp., *Betulaceae* sp., *Anacardiaceae* sp., *Fagaceae* sp., *Moraceae* sp., *Oleaceae* sp. (e.g. olive tree), *Actinidaceae* sp., *Lauraceae* sp. (e.g. avocado, cinnamon, camphor), *Musaceae* sp. (e.g. banana trees and plantations), *Rubiaceae* sp. (e.g. coffee), *Theaceae* sp. (e.g. tea), *Sterculiceae* sp., *Rutaceae* sp. (e.g. lemons, oranges, mandarins and grapefruit); *Solanaceae* sp. (e.g. tomatoes, potatoes, peppers, *capsicum*, aubergines, tobacco), *Liliaceae* sp., *Compositae* sp. (e.g. lettuce, artichokes and chicory such as root chicory, endive or common chicory), *Umbelliferae* sp. (e.g. carrots, parsley, celery and celeriac), *Cucurbitaceae* sp. (e.g. cucumber including gherkins, pumpkins, watermelons, calabashes and melons), *Alliaceae* sp. (e.g. leeks and onions), *Cruciferae* sp. (e.g. white cabbage, red cabbage, broccoli, cauliflower, Brussels sprouts, pak choi, kohlrabi, radishes, horseradish, cress and Chinese cabbage), *Leguminosae* sp. (e.g. peanuts, peas, lentils and beans such as common beans and broad beans), *Chenopodiaceae* sp. (e.g. Swiss chard, fodder beet, spinach, beetroot), *Linaceae* sp. (e.g. hemp), *Cannabeacea* sp. (e.g. *cannabis*), *Malvaceae* sp. (e.g. okra, cocoa), Papaveraceae (e.g. poppy), Asparagaceae (e.g. asparagus), and useful plants and ornamental plants in the garden and woods including turf, lawn, grass, and *Stevia rebaudiana*. In each case it also includes genetically modified types of these plants. More preferably, plants which can be treated in accordance with the disclosure are tomatoes.

By using or employing composition in the treatment according to the present disclosure, plants can be protected against attack by the designated pathogens within a certain period of time after the treatment. The period of time within which protection is effected extends from 1 to up to 14 days, preferably 1 to 7 days, after the treatment of the plants.

While this specification contains many specific implementation details, these should not be construed as limitations on the scope of any disclosure or on the scope of what may be claimed, but rather as descriptions of features that may be specific to particular implementations of particular disclosures. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combinations.

Particular implementations of the subject matter have been described. Other implementations, alterations, and permutations of the described implementations are within the scope of the following claims as will be apparent to those skilled in the art. For example, the actions recited in the claims can be performed in a different order and still achieve desirable results.

Accordingly, the above description of example implementations does not define or constrain this disclosure. Other changes, substitutions, and alterations are also possible without departing from the spirit and scope of this disclosure.

A number of embodiments of the present disclosure have been described. While this specification contains many specific implementation details, the specific implementation details should not be construed as limitations on the scope of any disclosures or of what may be claimed, but rather as descriptions of features specific to particular embodiments of the present disclosure.

Certain features that are described in this specification in the context of separate embodiments can also be implemented in combination in a single embodiment. Conversely, various features that are described in the context of a single embodiment can also be implemented in combination in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

In certain implementations, multitasking and parallel processing may be advantageous. Nevertheless, it will be understood that various modifications may be made without departing from the spirit and scope of the claimed disclosure.

EXAMPLES

This section summarizes the results of solid form screening and single crystal structure determination for the compounds of Formula (I) and Formula (II).

Example 1: Analysis of Solids Forms

The compound of formula (I) was prepared according to the methods described below. The solid form screening results were characterized using the methods described below.

Example 1.1: XRPD

For XRPD analysis, PANalytical Empyrean and X' Pert3 X-ray powder diffract meters were used. The XRPD parameters used were listed in Table 1.1.

TABLE 1.1

Parameters for XRPD test

| Parameters | X' Pert3 | X' Pert3 |
|---|---|---|
| X-Ray wavelength | Empyrean<br>Kα1 (Å): 1.540598<br>Kα2 (Å): 1.544426<br>intensity ratio Kα2/Kα1: 0.50 | Cu, Kα;<br>Kα1 (Å): 1.540598<br>Kα2 (Å): 1.544426<br>intensity ratio Kα2/Kα1: 0.50 |
| X-Ray tube setting | 45 kV, 40 mA | 45 kV, 40 mA |
| Divergence slit | Automatic | 1/8° |
| Scan mode | Continuous | Continuous |
| Scan range (2θ/°) | 3°~40° | 3°~40° |
| Step size (2θ/°) | 0.0167 | 0.0263° |
| Scan step time (s) | 46.665 | 39.525 |
| Test time (s) | 5 min 30 s | 4 mins 27 s |

Example 1.2: SCXRD

Single crystal X-ray diffraction data was collected at 175 K using Bruker D8 VENTURE diffractometer (Mo/Kα X=0.71073 Å). The parameters are listed below in Table 1.2.

TABLE 1.2.

SCXRD instrument parameters

| Instrument | Bruker D8 VENTURE |
|---|---|
| X-Ray sources generator | TXS rotating anode microfocus X-ray source (Cu/kα: 1.54178 Å) |
| Detector | PHOTON 100 CMOS detector (Active area: 100 × 100 mm$^2$) |
| Goniometer | FIXED-CHI Goniometer |
| Low Temperature Devices | Cobra (Oxford Cryosystems) |
| Software package | APEX3 |

Example 1.3: TGA and DSC

TGA data were collected using a TA Q5000/5500 TGA from TA Instruments. DSC was performed using a TA Q2000/2500 DSC from TA Instruments. The detailed parameters used are listed in Table 1.3.

TABLE 1.3

Parameters for TGA and DSC test

| Parameters | TGA | DSC |
|---|---|---|
| Method | Ramp | Ramp |
| Sample pan | Aluminum, open | Aluminum, crimped/open |

TABLE 1.3-continued

Parameters for TGA and DSC test

| Parameters | TGA | DSC |
|---|---|---|
| Temperature | RT- desired temperature | 25° C. - desired temperature |
| Heating rate | 10° C./min | 10° C./min |
| Purge gas | $N_2$ | $N_2$ |

Example 1.4: HPLC

Agilent HPLC was utilized and detailed chromatographic conditions for purity measurements are listed in Table 1.4.

TABLE 1.4

Chromatographic conditions and parameters for purity/solubility test

Parameters

| | Agilent 1260 DAD Detector | |
|---|---|---|
| Column | Waters Sunfire C18, 150 * 4.6 mm, 3.5 μm | |
| Mobile phase | A: 0.037% TFA in Water | |
| | B: 0.018% TFA in Acetonitrile | |

| | Agilent 1260 DAD Detector | |
|---|---|---|
| | Time (min) | % B |
| Gradient table | 0.0 | 20 |
| | 5.0 | 50 |
| | 10.0 | 90 |
| | 15.0 | 90 |
| | 15.1 | 20 |
| | 20.0 | 20 |
| Run time | 20.0 min | |
| Post time | 0.0 min | |
| Flow rate | 0.8 mL/min | |
| Injection volume | 5 μL | |
| Detector wavelength | UV at 220 nm | |
| Column temperature | RT | |
| Sampler temperature | RT | |
| Diluent | Acetonitrile/Water (1:1) | |

Example 1.6: ¹H Solution NMR

¹H NMR spectra were collected on Bruker 400M NMR Spectrometer using DMSO-$d_6$.

Example 1.7: Abbreviations

Solid form screening experiments were carried out using various solvents. Solvent abbreviations for the screening experiments are listed below in Table 1.5.

TABLE 1.5

Solvent abbreviation list

| Abbreviation | Solvent | Abbreviation | Solvent |
|---|---|---|---|
| MeOH | Methanol | THF | Tetrahydrofuran |
| EtOH | Ethanol | 2-MeTHF | 2-Methyltetrahydrofuran |
| IPA | Isopropyl alcohol | DCM | Dichloromethane |
| MIBK | 4-Methyl-2-pentanone | ACN | Acetonitrile |

TABLE 1.5-continued

Solvent abbreviation list

| Abbreviation | Solvent | Abbreviation | Solvent |
|---|---|---|---|
| EtOAc | Ethyl acetate | DMSO | Dimethylsulfoxide |
| IPAc | Isopropyl acetate | DMAc | N,N-Dimethylacetamide |
| MTBE | Methyl tert-butyl ether | NMP | 1-Methyl-2-pyrrolidone |
| CPME | Cyclpentyl methyl ether | — | — |

Example 2: Baseline Characterization for the Compound of Formula (I)

After preparation by the method described in Example 1, the starting material was characterized by X-ray powder diffraction (XRPD), thermo gravimetric analysis (TGA), differential scanning calorimetry (DSC), dynamic vapor sorption (DVS), high performance liquid chromatography (HPLC), and 1H solution nuclear magnetic resonance CH NMR). The XRPD results indicated that the starting material was crystalline. Detailed results are summarized in Table 2.1. The data showed that the starting material was crystals of a crystalline form referred to herein as crystalline form A. Further single crystal structure determination experiments described below showed that Type A (herein also referred to as "crystalline Type A") was an anhydrate.

TABLE 2.1

Characterization summary for Type A

| Crystal Form | ID | Wt Loss on TGA (%, up to 100° C.) | Endotherm on DSC (° C., onset) | Form Identity |
|---|---|---|---|---|
| Crystalline Form A | Type A | 0.5 | 142.7 | Anhydrate |

Figure 1B:
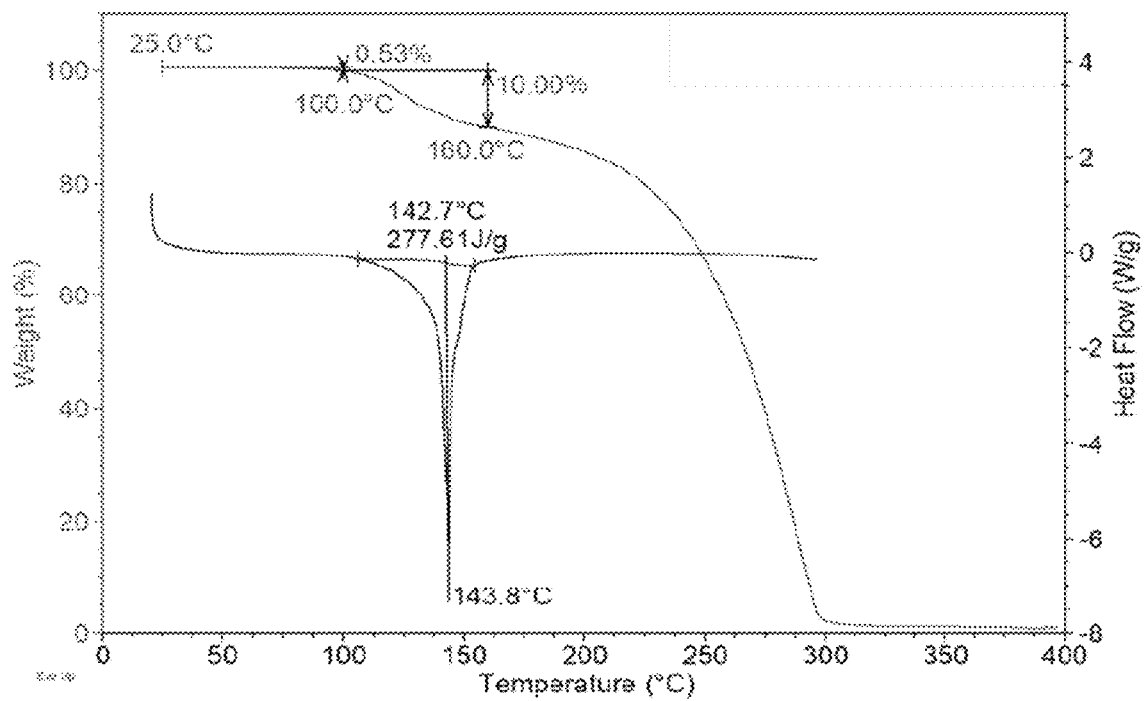
FIG. 1B shows TGA/DSC curves of starting material.
Figure 2A:
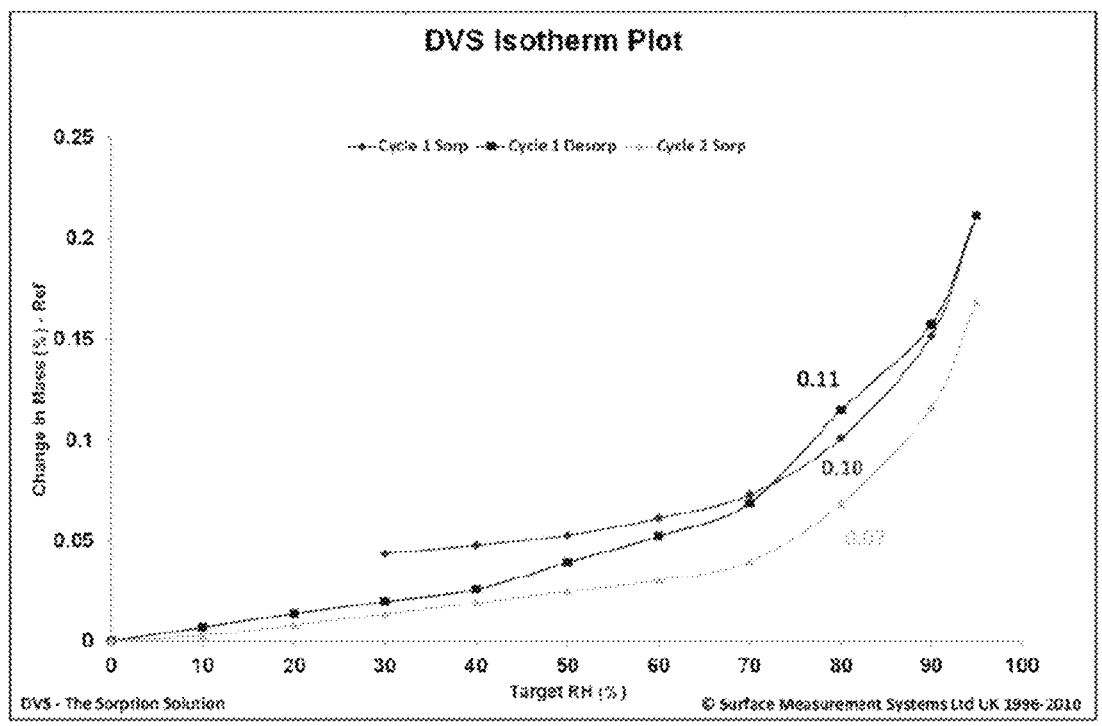
FIG. 2A shows DVS plot of starting material.
Figure 2B:
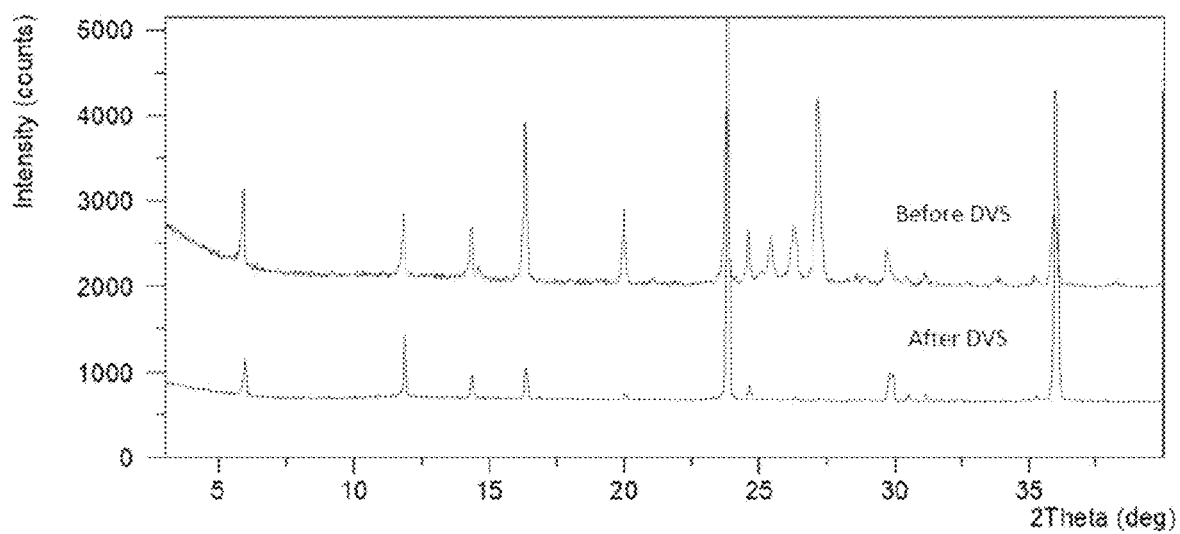
FIG. 2B shows an XRPD overlay of starting material before and after DVS.

XRPD (FIG. 1A) revealed that the starting material was crystalline and was named as Type A. Upon comparison of the XRPD patterns for the starting sample in reflection and transmission modes, several additional diffraction peaks (~23°, ~25°, ~28°, ~33°) were clearly observed on the transmission pattern. This difference was postulated to be caused by preferred orientation, since the morphology of Type A starting material was rod-like. TGA and DSC data are shown in FIG. 1B. A two-stage weight loss of 0.5% up to 100° C. and 10.0% from 100° C. to 160° C. was observed on the TGA curve. The DSC result exhibited one sharp endotherm at 142.7° C. (onset temperature). The DVS isotherm plot of Type A was collected at 25° C. between 0 and 95% RH. As displayed in FIG. 2A, a water up-take of 0.1% was observed at 25° C./80% RH. The XRPD comparison in FIG. 2B indicated that no form change was observed for Type A after the DVS test.

Using Type A as the starting material, solid form screening experiments were performed via anti-solvent addition, reverse anti-solvent addition, slow evaporation, slow cooling, slurry, vapor-solid diffusion, vapor-solution diffusion and polymer induced crystallization. The results of these experiments are shown in Example 3.

Example 3: Solid Form Screening

After preparation by the methods described above, the sample was subjected to various solid form screening conditions. The samples were then subjected to analysis by, for example, the methods described in Example 1.

The solid form screening experiments were performed using different crystallization or solid transformation methods. Some exemplary screening experiments are listed in Table 3.1.

TABLE 3.1

Summary of solid form screening experiments

| Method | Number of Conditions Tested | Result |
|---|---|---|
| Anti-solvent addition | 13 | Type A |
| Reverse anti-solvent addition | 10 | Type A/Amorphous |
| Slow evaporation | 12 | Type A |
| Slow cooling | 7 | Type A |
| Slurry at RT | 14 | Type A |
| Slurry at 50° C. | 8 | Type A |
| Slurry Cycling (5-50° C.) | 8 | Type A |
| Vapor-solid diffusion | 10 | Type A |
| Vapor-solution diffusion | 10 | Type A/Amorphous |
| Polymer induced crystallization | 8 | Type A |
| Total | 100 | Type A/amorphous |

Example 3.1: Anti-Solvent Addition

Figure 3A:
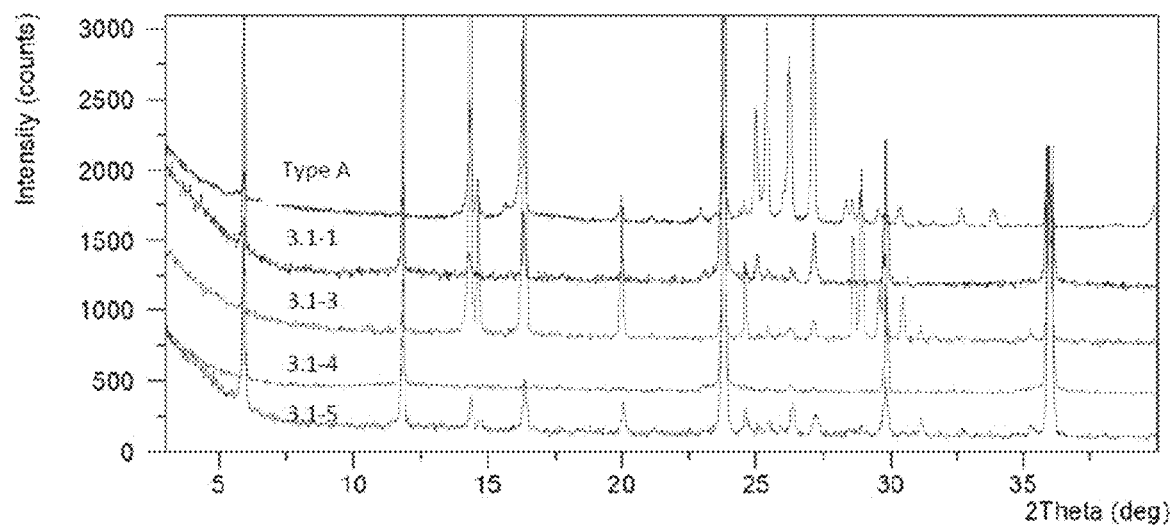
FIG. 3A shows an XRPD overlay of anti-solvent addition experiments.
Figure 3B:
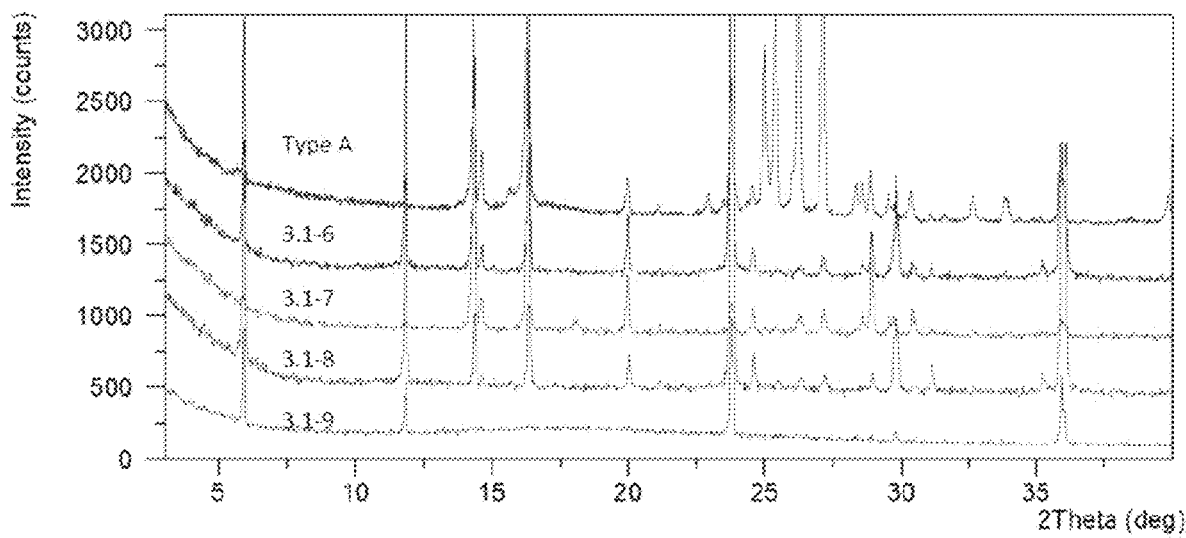
FIG. 3B shows an XRPD overlay of anti-solvent addition experiments.
Figure 4A:
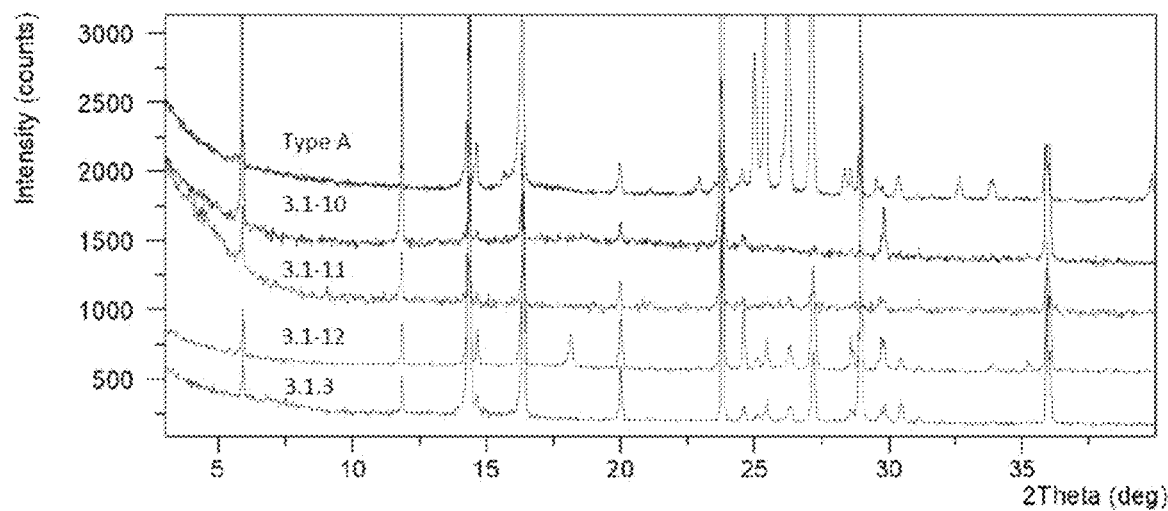
FIG. 4A shows an XRPD overlay of anti-solvent addition experiments.

A total of 13 anti-solvent addition experiments were carried out. About 15 mg of starting material was dissolved in 0.4-0.8 mL of solvent to obtain a clear solution and the solution was magnetically stirred (~1000 rpm) followed by addition of 0.1 mL anti-solvent per aliquot until precipitate appeared or the total amount of anti-solvent reached 10 mL. The obtained precipitate was isolated for XRPD analysis. The results of the anti-solvent addition tests are shown in Table 3.1.1. The XRPD overlays are shown in FIGS. 3A, 3B, and 4A.

TABLE 3.1.1

Summary of anti-solvent addition experiments

| Experiment Number | Solvent | Anti-solvent | Solid Form |
|---|---|---|---|
| 3.1-1 | IPAc | DCM | Type A |
| 3.1-2 | DMSO | | NA |
| 3.1-3** | EtOH | CHCl$_3$ | Type A |
| 3.1-4** | MTBE | | Type A |
| 3.1-5 | MIBK | n-Heptane | Type A |
| 3.1-6** | IPA | | Type A |
| 3.1-7* | THF | | Type A |
| 3.1-8 | Acetone | H$_2$O | Type A |
| 3.1-9 | DMAc | | Type A |
| 3.1-10 | NMP | | Type A |
| 3.1-11 | EtOAc | Cyclohexane | Type A |
| 3.1-12* | 1,4-Dioxane | | Type A |
| 3.1-13* | 2-MeTHF | | Type A |

*Solid was obtained after stirring at 5° C.
**Clear solution was obtained after anti-solvent addition and stirring at 5° C., which was transferred to evaporate at RT.
NA: No solid was obtained after anti-solvent addition, stirring at 5° C. and evaporation at RT.

Example 3.2: Reverse Anti-Solvent Addition

Figure 4B:
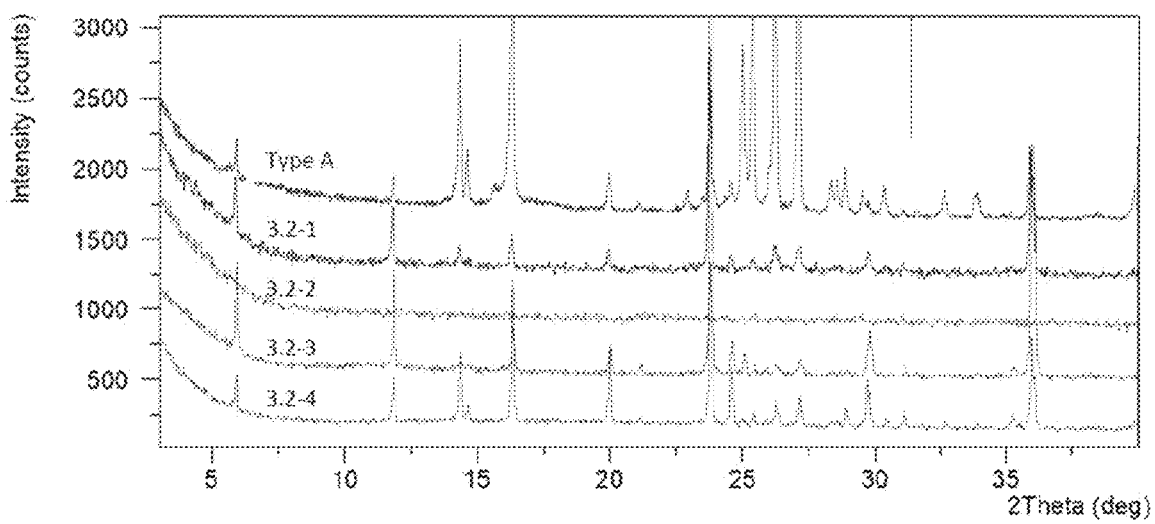
FIG. 4B shows an XRPD overlay of reverse anti-solvent addition experiments.
Figure 5A:
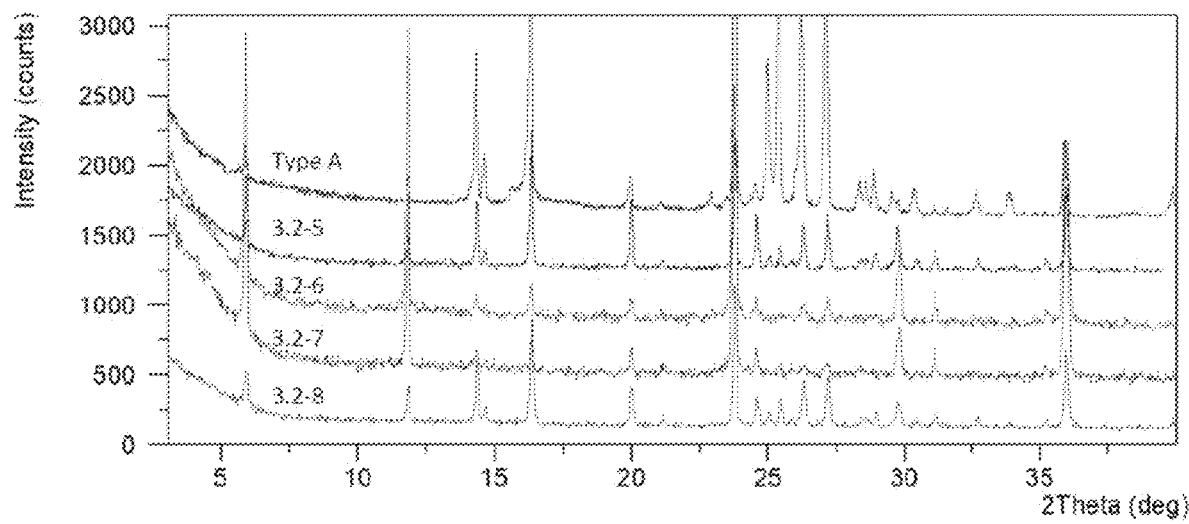
FIG. 5A shows an XRPD overlay of reverse anti-solvent addition experiments.
Figure 5B:
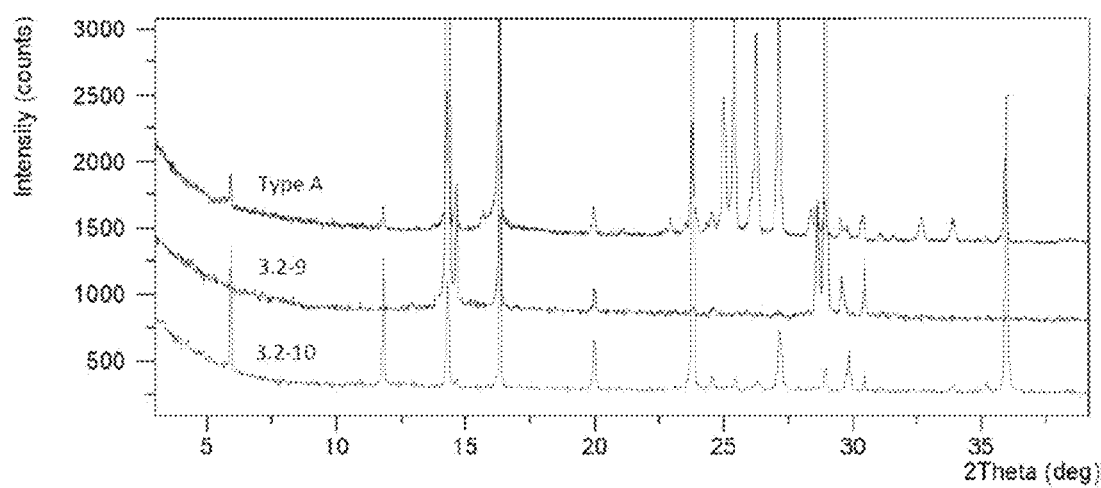
FIG. 5B shows an XRPD overlay of reverse anti-solvent addition experiments.

Reverse anti-solvent addition experiments were conducted under the conditions listed in Table 3.2.1. Approximately 15 mg of starting material was dissolved in 0.5-0.7 mL of each solvent to get a clear solution. This solution was added drop-wise into a glass vial containing 5 mL of each anti-solvent at room temperature. The precipitates were isolated for XRPD analysis. The results of the tests are summarized in Table 3.2.1. The XRPD overlays are shown in FIGS. 4B, 5A and 5B.

TABLE 3.2.1

Summary of reverse anti-solvent addition experiments

| Experiment ID | Solvent | Anti-solvent | Solid Form |
|---|---|---|---|
| 3.2-1** | Acetone | DCM | Type A |
| 3.2-2*** | DMAc | CHCl$_3$ | Amorphous |
| 3.2-3** | EtOAc | | Type A |
| 3.2-4 | IPAc | n-Heptane | Type A |
| 3.2-5 | MIBK | | Type A |
| 3.2-6 | 1,4-Dioxane | H$_2$O | Type A |
| 3.2-7 | EtOH | | Type A |
| 3.2-8 | THF | | Type A |
| 3.2-9** | IPA | Cyclohexane | Type A |
| 3.2-10* | MTBE | | Type A |

*Solid was obtained after stirring at 5° C.
**Clear solution was obtained after stirring at 5° C., and then transferred to RT for evaporation.
***Solids were obtained after vacuum drying at RT for 7 days and at 80° C. for 17 hrs.

Example 3.3: Slow Evaporation

Figure 6A:
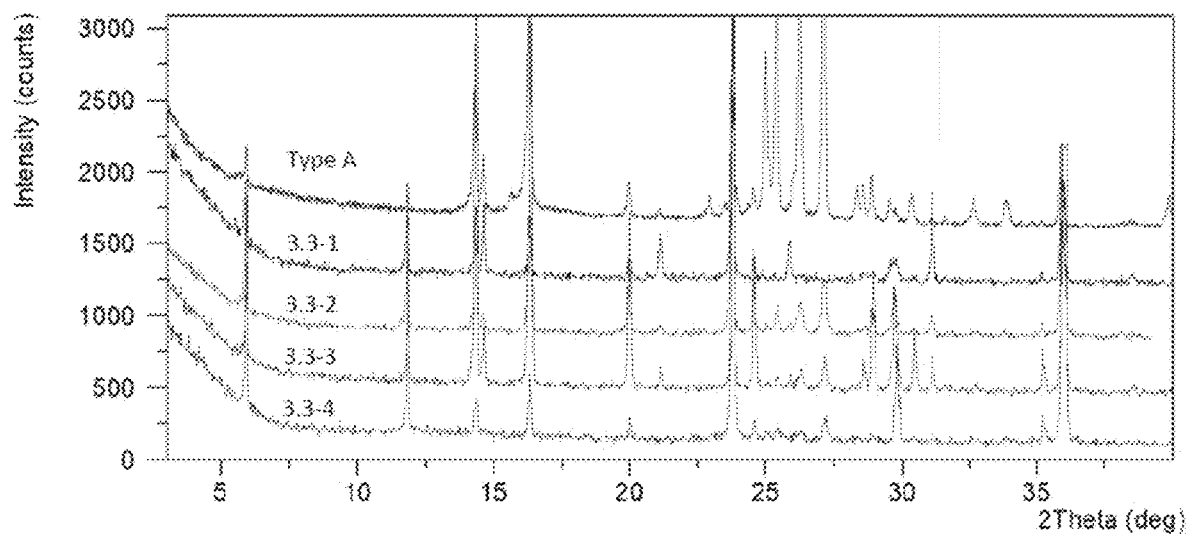
FIG. 6A shows an XRPD overlay of slow evaporation experiments.
Figure 6B:
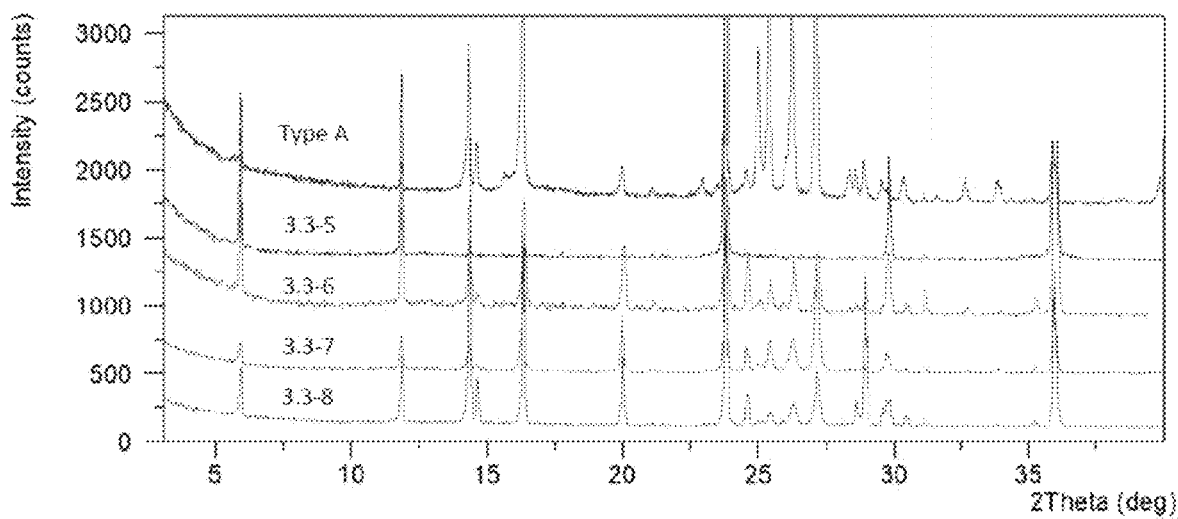
FIG. 6B shows an XRPD overlay of slow evaporation experiments.
Figure 7A:
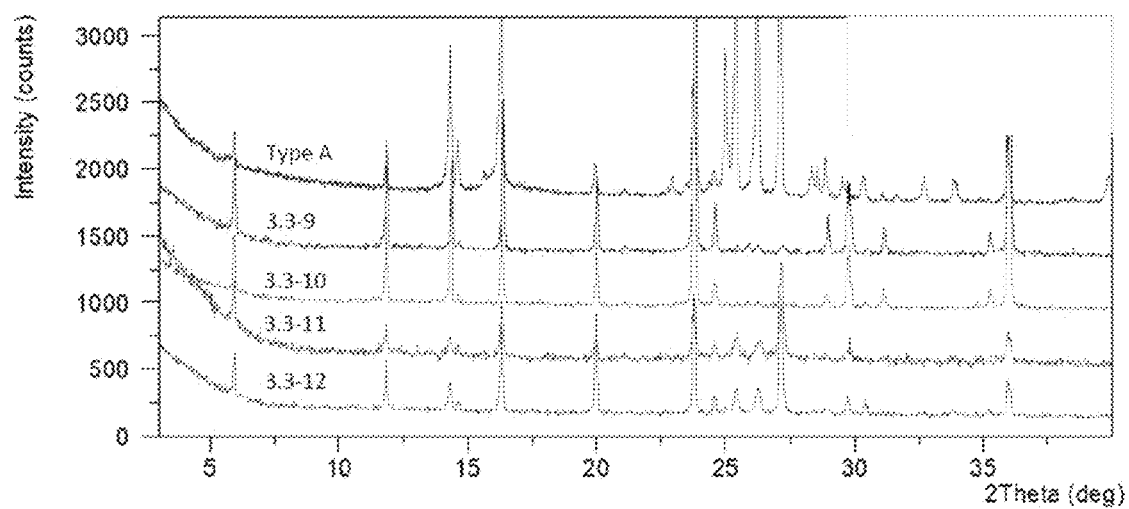
FIG. 7A shows an XRPD overlay of slow evaporation experiments.

Slow evaporation experiments were performed under 12 conditions. For each experiment, ~15 mg of starting material was dissolved in 0.8 mL of solvent in a 3-mL glass vial. The resulting suspensions were then filtered using a PTFE membrane (pore size of 0.45 μm) and the filtrates were used for all further manipulations. The visually clear solutions were subjected to evaporation at room temperature with vials sealed by Parafilm® (poked with 3 pin-holes). The solids were isolated for XRPD analysis. The results of the screening are summarized in Table 3.3.1. The XRPD overlays are shown in FIGS. 6A, 6B and 7A.

TABLE 3.3.1

Summary of slow evaporation experiments

| Experiment ID | Solvent | Solid Form |
|---|---|---|
| 3.3-1 | MeOH | Type A |
| 3.3-2 | EtOH | Type A |
| 3.3-3 | IPA | Type A |
| 3.3-4 | Acetone | Type A |
| 3.3-5 | EtOAc | Type A |
| 3.3-6 | MIBK | Type A |
| 3.3-7 | IPAc | Type A |
| 3.3-8 | MTBE | Type A |
| 3.3-9 | THF | Type A |
| 3.3-10 | 2-MeTHF | Type A |
| 3.3-11 | 1,4-Dioxane | Type A |
| 3.3-12 | ACN | Type A |

Example 3.4: Slow Cooling

Figure 7B:
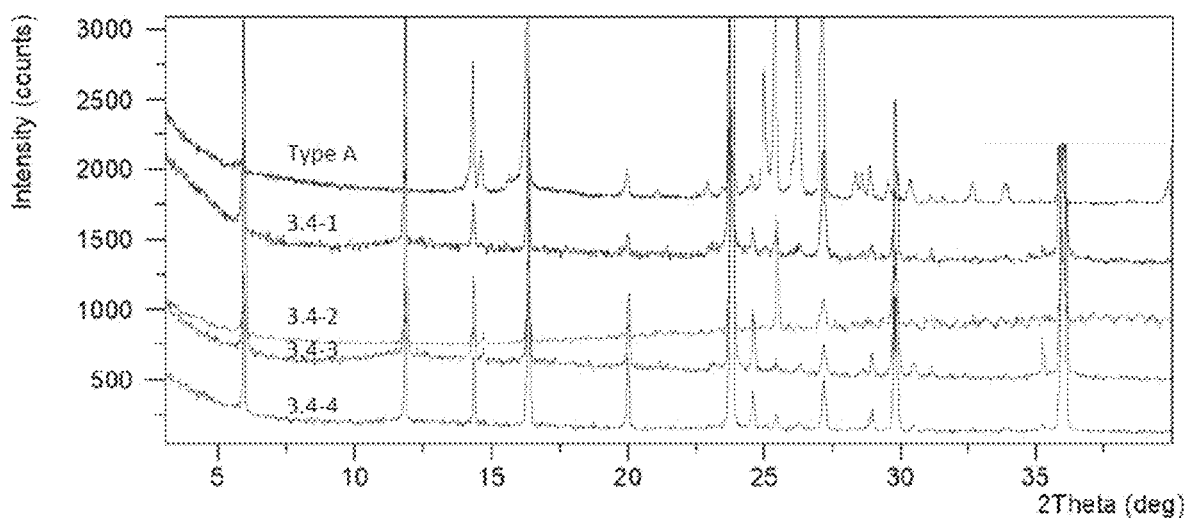
FIG. 7B shows an XRPD overlay of slow cooling experiments.
Figure 8A:
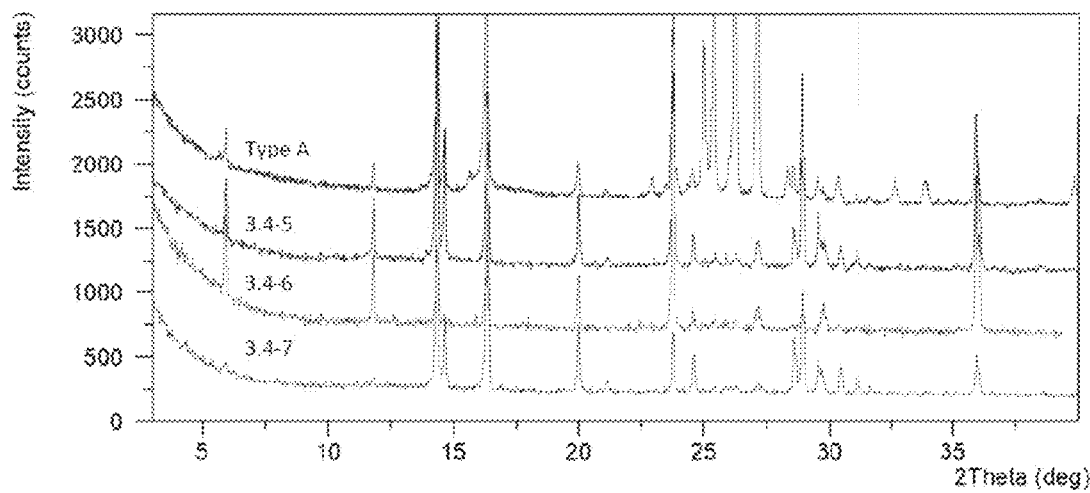
FIG. 8A shows an XRPD overlay of slow cooling experiments.
Figure 8B:
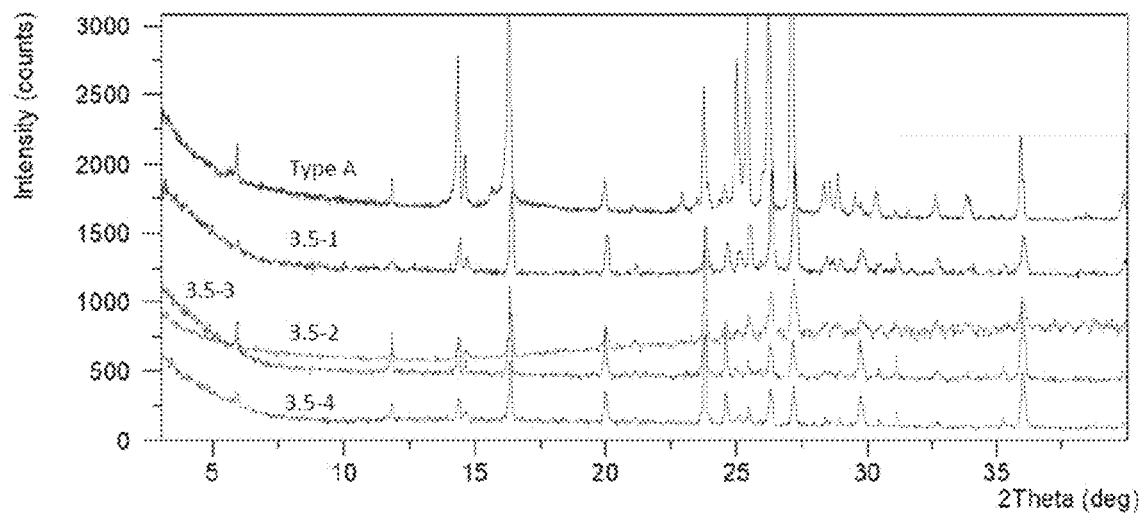
FIG. 8B shows an XRPD overlay of slurry at room temperature experiments.
Figure 9A:
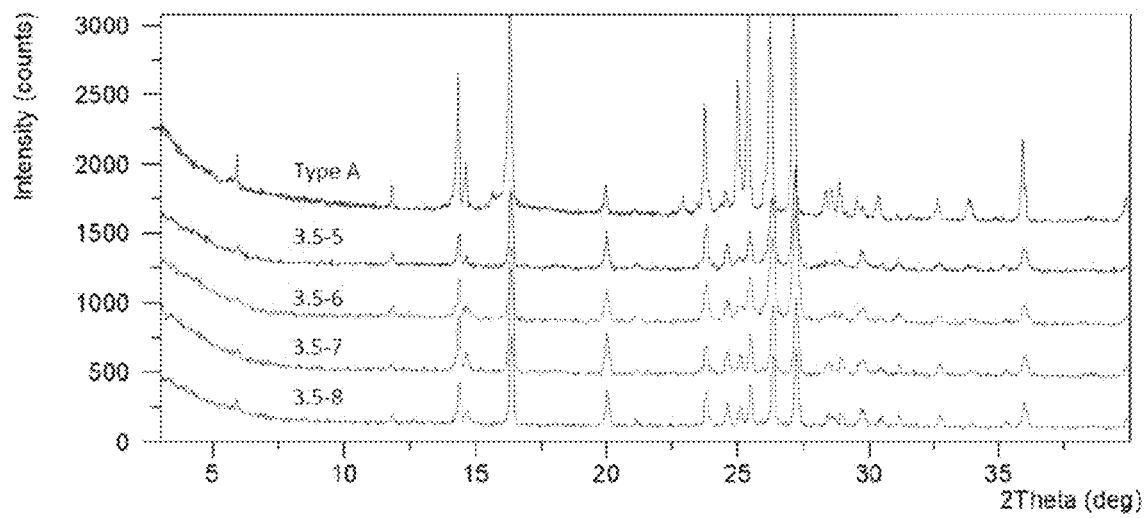
FIG. 9A shows an XRPD overlay of slurry at room temperature experiments.
Figure 9B:
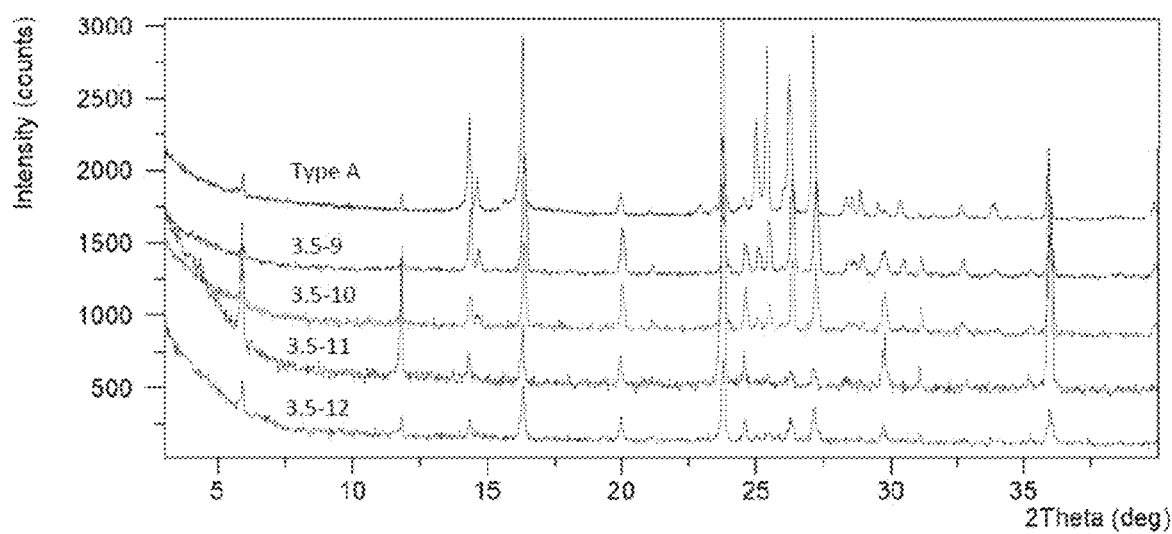
FIG. 9B shows an XRPD overlay of slurry at room temperature experiments.

Slow cooling experiments were conducted in 7 solvent systems. For each experiment, 15 mg of starting material was suspended in 0.8 mL of solvent in an HPLC vial at room temperature. The suspension was then heated to 50° C., equilibrated for about 2 hours and filtered to a new vial using a PTFE membrane (pore size of 0.45 μm) if the solids were not completely dissolved. The filtrates were slowly cooled down to 5° C. at a rate of 0.1° C./min. The resulting solids were kept isothermal at 5° C. before being isolated for XRPD analysis. Clear solutions were evaporated to dryness at room temperature and then the solids were analyzed by XRPD. The results of the slow cooling experiments are summarized in Table 3.4.1. The XRPD overlays are shown in FIGS. 7B and 8A.

TABLE 3.4.1

Summary of slow cooling experiments

| Experiment ID | Solvent (v:v) | Solid Form |
|---|---|---|
| 3.4-1* | Toluene | Type A |
| 3.4-2* | ACN | Type A |
| 3.4-3* | THF/DCM (1:4) | Type A |
| 3.4-4* | IPAc/CHCl$_3$ (1:4) | Type A |
| 3.4-5* | EtOH/n-Heptane (1:4) | Type A |
| 3.4-6* | 1,4-Dioxane/H$_2$O (1:4) | Type A |
| 3.4-7* | IPA/Cyclohexane (1:4) | Type A |

*Clear solution was obtained after cooling and stirring at 5° C. and −20° C., which was transferred to a vial at room temperature for evaporation.

Example 3.5: Slurry at Room Temperature

Slurry conversion experiments were conducted at room temperature in 14 different solvent systems. For each experiment, ~15 mg of starting material was suspended in 0.5 mL of solvent in an HPLC vial. After the suspension was stirred magnetically (~1000 rpm) for about 4 days at room temperature, the remaining solids were isolated for XRPD analysis. The results of the slurry at room temperature experiments are summarized in Table 3.5.1. The XRPD overlays are shown in FIGS. 8B, 9A, 9B and 10A.

TABLE 3.5.1

Summary of slurry conversion experiments at RT

| Experiment ID | Solvent (v:v) | Solid Form |
|---|---|---|
| 3.5-1 | Toluene | Type A |
| 3.5-2 | H$_2$O | Type A |
| 3.5-3 | DCM | Type A |
| 3.5-4 | CHCl$_3$ | Type A |
| 3.5-5 | n-Heptane | Type A |
| 3.5-6 | Cyclohexane | Type A |
| 3.5-7* | ACN/H$_2$O (a$_w$~0.3) | Type A |
| 3.5-8* | ACN/H$_2$O (a$_w$~0.6) | Type A |
| 3.5-9* | ACN/H$_2$O (a$_w$~0.9) | Type A |
| 3.5-10* | NMP/CHCl$_3$ (1:9) | Type A |
| 3.5-11 | 1,4-Dioxane/DCM (1:9) | Type A |
| 3.5-12 | IPAc/n-Heptane (1:9) | Type A |
| 3.5-13 | MTBE/n-Heptane (1:9) | Type A |
| 3.5-14* | EtOH/Cyclohexane (1:9) | Type A |

*Clear solution was obtained after stirring at room temperature for 4 days, then ~15 mg starting material was further added and the suspension was stirred at room temperature for 2 days.

Example 3.6: Slurry at 50° C.

Figure 10A:
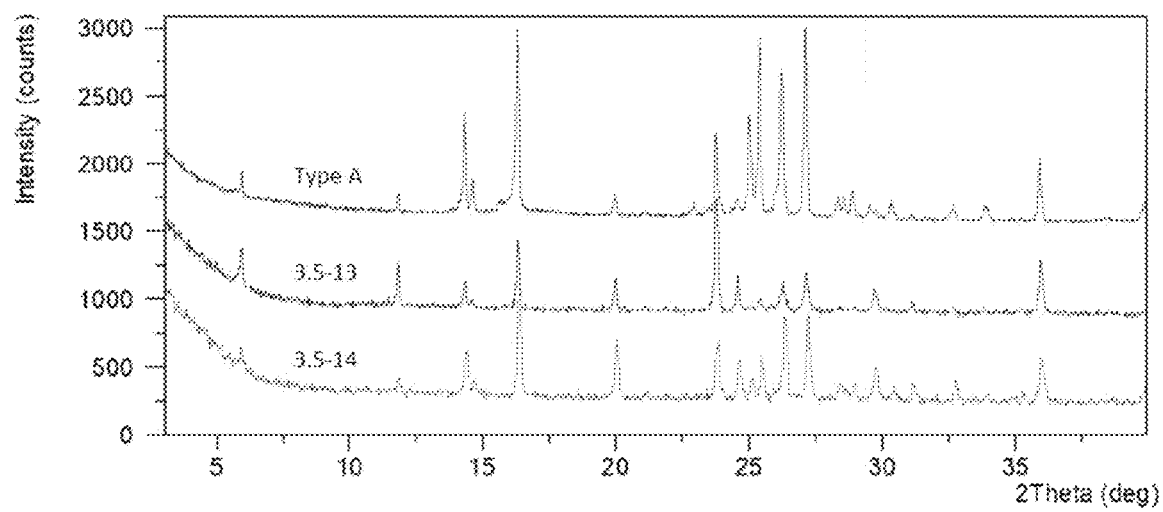
FIG. 10A shows an XRPD overlay of slurry at room temperature experiments.
Figure 10B:
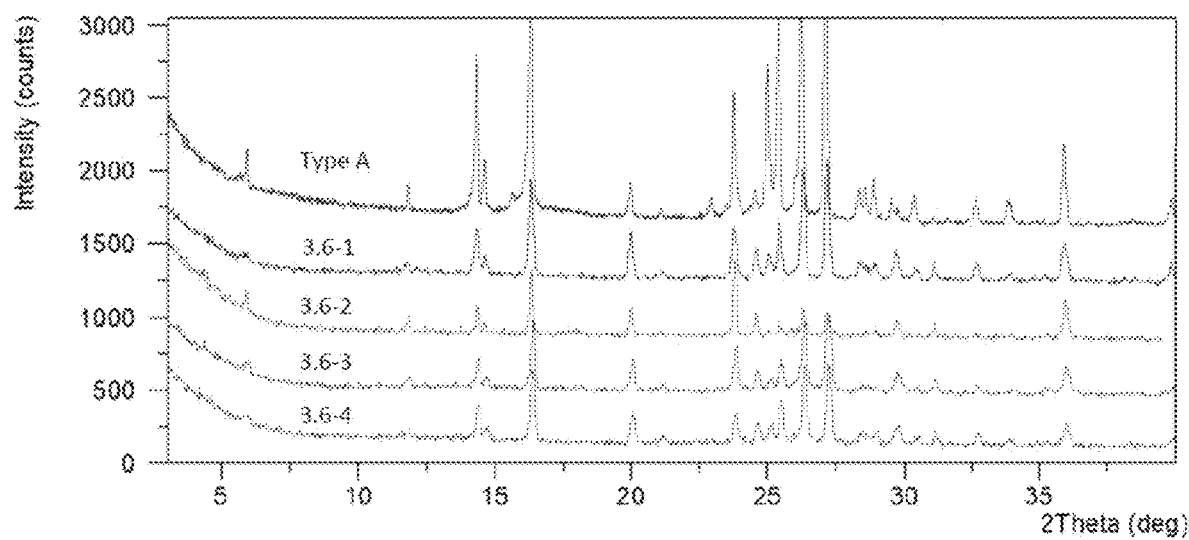
FIG. 10B shows an XRPD overlay of slurry at 50° C. experiments.
Figure 11A:
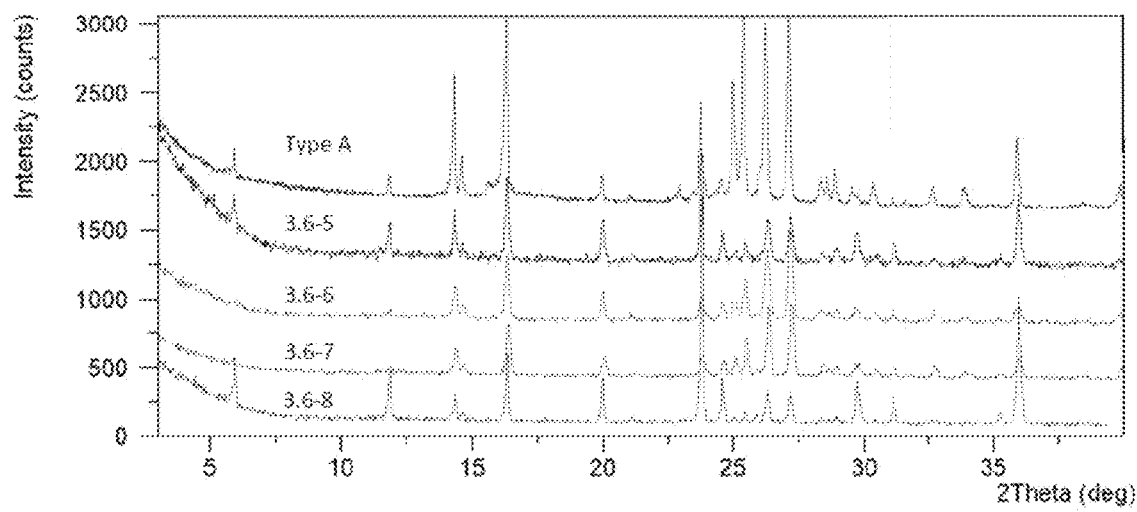
FIG. 11A shows an XRPD overlay of slurry at 50° C. experiments.

Slurry conversion experiments were also conducted at 50° C. in 8 different solvent systems. For each experiment, 15 mg of starting material was suspended in 0.5 mL of solvent in an HPLC vial. After the suspension was magnetically stirred (~1000 rpm) for about 4 days at 50° C., the remaining solids were isolated for XRPD analysis. The results of the slurry at 50° C. experiments are summarized in Table 3.6.1. The XRPD overlays are shown in FIGS. 10B and 11A.

TABLE 3.6.1

Summary of slurry conversion experiments at 50° C.

| Experiment ID | Solvent (v:v) | Solid Form |
|---|---|---|
| 3.6-1 | Toluene | Type A |
| 3.6-2 | H$_2$O | Type A |
| 3.6-3 | Cyclohexane | Type A |
| 3.6-4 | DMAc/H$_2$O (1:9) | Type A |
| 3.6-5 | Acetone/H$_2$O (1:9) | Type A |
| 3.6-6 | Toluene/n-Heptane (1:4) | Type A |
| 3.6-7 | 1,4-Dioxane/n-Heptane (1:9) | Type A |
| 3.6-8 | IPAc/Cyclohexane (1:9) | Type A |

Example 3.7: Slurry Cycling (50-5° C.)

Figure 11B:
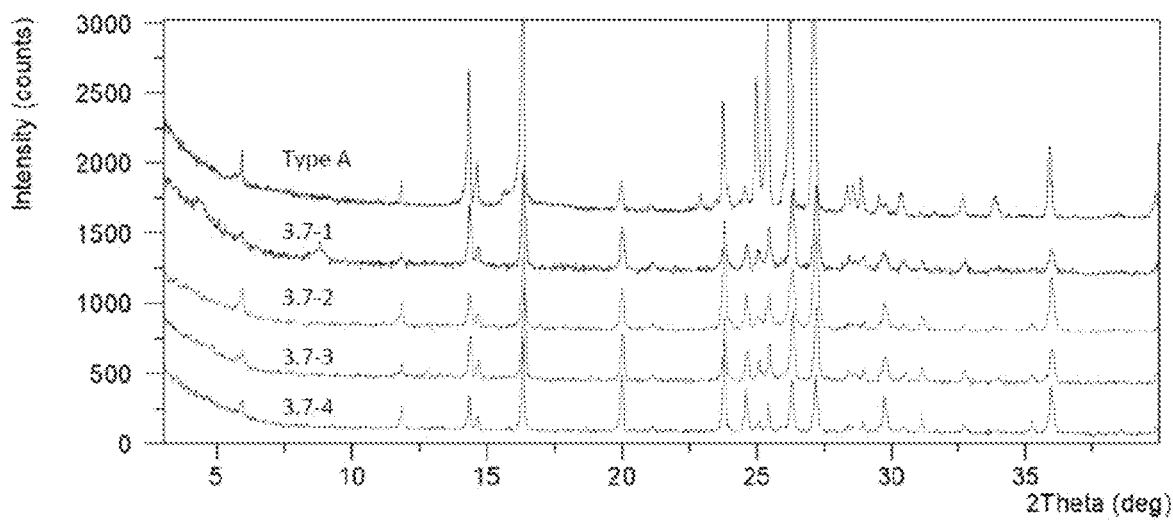
FIG. 11B shows an XRPD overlay of slurry cycling (50-5° C.) experiments.
Figure 12A:
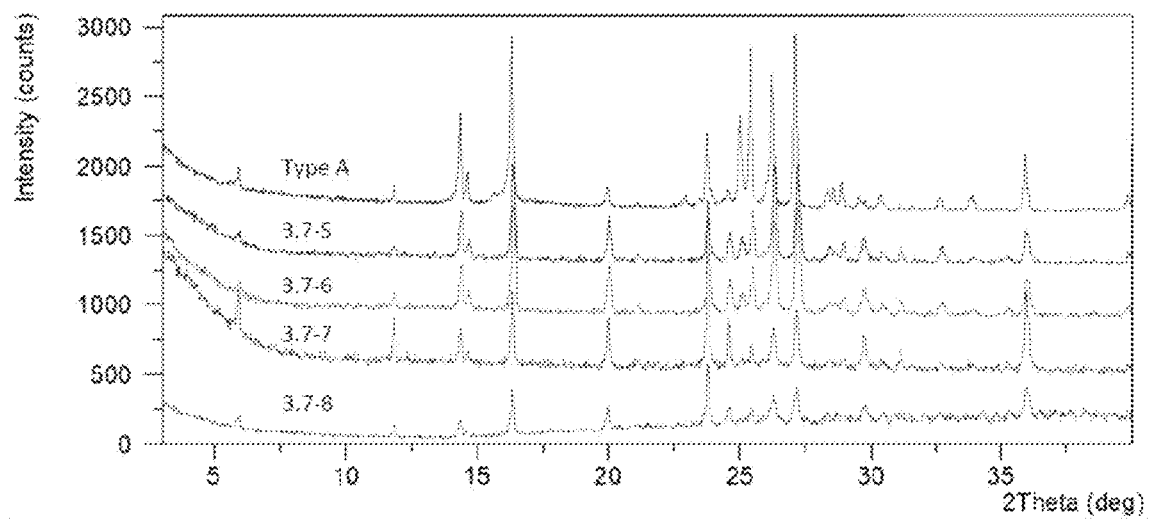
FIG. 12A shows an XRPD overlay of slurry cycling (50-5° C.) experiments.

Slurry cycling (50-5° C.) experiments were conducted in 8 different solvent systems. For each experiment, 15 mg of starting material was suspended in 0.5 mL of solvent in an HPLC vial. The suspensions were magnetically stirred (~1000 rpm) at 50° C. for 2 hours and then slowly cooled down to 5° C. at a rate of 0.1° C./min. The obtained solids were kept isothermal at 5° C. after cycled between 50° C. and 5° C. for 3 times. The results of the slurry cycling experiments are summarized in Table 3.7.1. The XRPD overlays are shown in FIGS. 11B and 12A.

TABLE 3.7.1

Summary of slurry cycling (50-5° C.) experiments

| Experiment ID | Solvent (v:v) | Solid Form |
|---|---|---|
| 3.7-1 | H$_2$O | Type A |
| 3.7-2 | n-Heptane | Type A |
| 3.7-3 | Toluene | Type A |
| 3.7-4 | IPAc/CHCl$_3$ (1:9) | Type A |
| 3.7-5 | THF/H$_2$O (1:9) | Type A |
| 3.7-6 | ACN/H$_2$O (1:9) | Type A |
| 3.7-7 | EtOAc/n-Heptane (1:9) | Type A |
| 3.7-8 | MTBE/Cyclohexane (1:9) | Type A |

Example 3.8: Vapor-Solid Diffusion

Figure 12B:
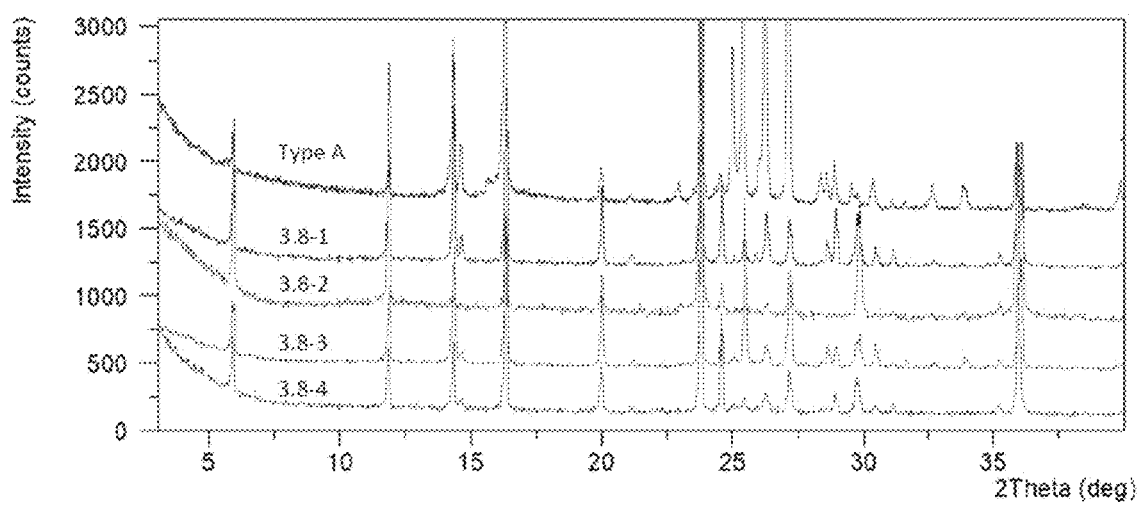
FIG. 12B shows an XRPD overlay of vapor-solid diffusion experiments.
Figure 13A:
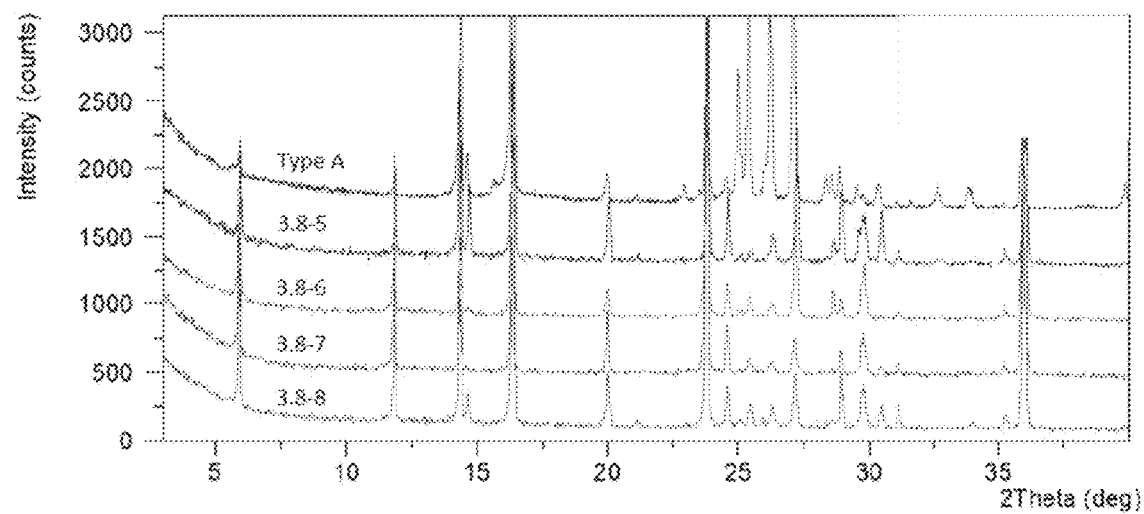
FIG. 13A shows an XRPD overlay of vapor-solid diffusion experiments.
Figure 13B:
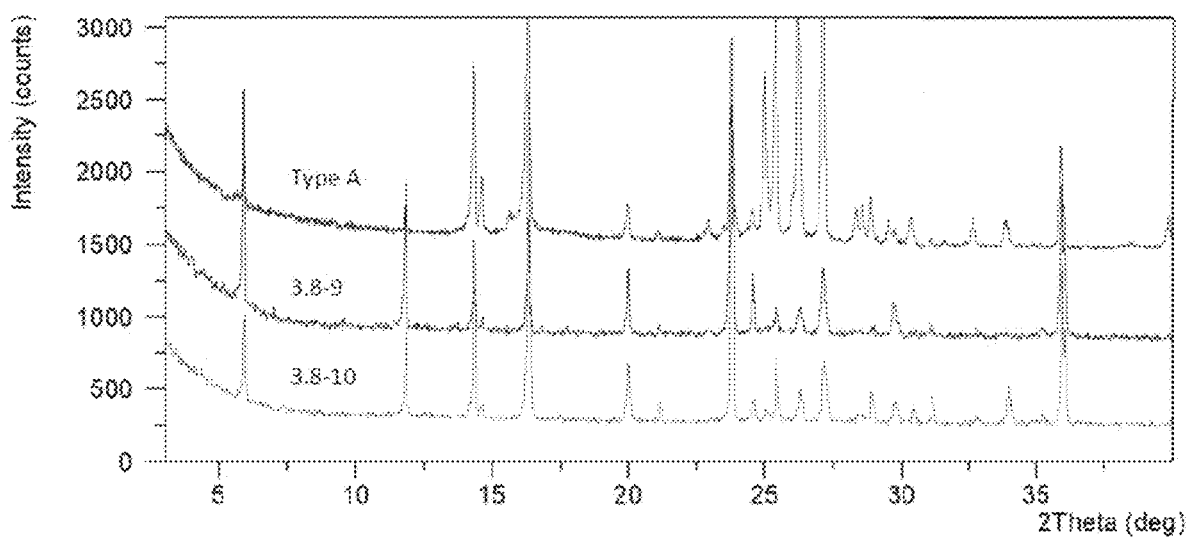
FIG. 13B shows an XRPD overlay of vapor-solid diffusion experiments.

Ten (10) vapor-solid diffusion experiments were performed using different solvents. For each experiment, 15 mg of Type A sample was weighed into a 3-mL glass vial. This 3-mL vial was then placed into a 20-mL vial with 4 mL of solvents. The 20-mL vial was sealed with a cap and kept at room temperature for 7 days. The resulting solids were isolated for XRPD analysis. The results of the vapor-solid diffusion experiments are summarized in Table 3.8.1. The XRPD overlays are shown in FIGS. 12B, 13A, and 13B.

TABLE 3.8.1

Summary of vapor-solid diffusion experiments

| Experiment ID | Solvent | Solid Form |
|---|---|---|
| 3.8-1* | EtOH | Type A |
| 3.8-2 | Acetone | Type A |
| 3.8-3* | IPAc | Type A |
| 3.8-4* | MTBE | Type A |
| 3.8-5 | THF | Type A |
| 3.8-6* | DCM | Type A |
| 3.8-7* | CHCl$_3$ | Type A |

TABLE 3.8.1-continued

Summary of vapor-solid diffusion experiments

| Experiment ID | Solvent | Solid Form |
|---|---|---|
| 3.8-8* | ACN | Type A |
| 3.8-9* | H₂O | Type A |
| 3.8-10 | 1,4-Dioxane | Type A |

*Clear solution was obtained, and then transferred to RT for evaporation.

Figure 14A:
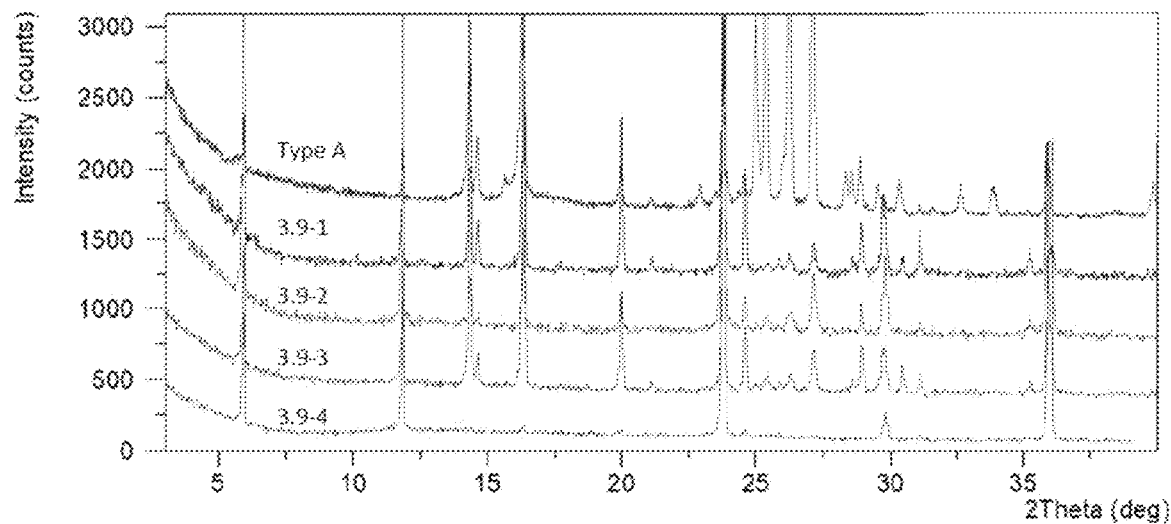
FIG. 14A shows an XRPD overlay of vapor-solution diffusion experiments.
Figure 14B:
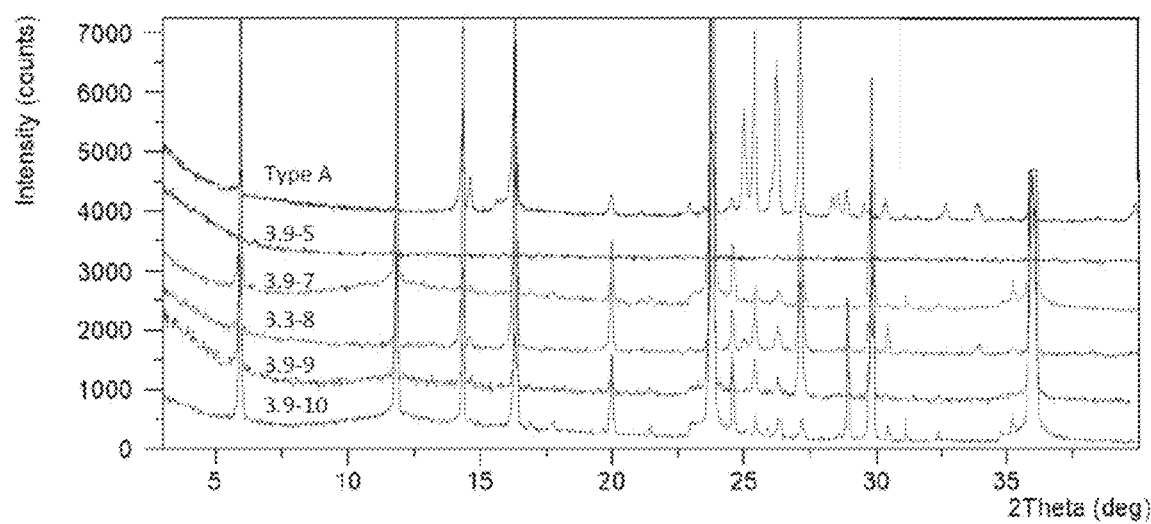
FIG. 14B shows an XRPD overlay of vapor-solution diffusion experiments.

Example 3.9: Vapor-Solution Diffusion 10 vapor-solution diffusion experiments were conducted. For each experiment, 15 mg of starting material was dissolved in 0.5 mL of appropriate solvent to obtain a clear solution in a 3-mL vial. This solution was then placed into a 20-mL vial with 4 mL of volatile solvents. The 20-mL vial was sealed with a cap and kept at room temperature allowing sufficient time for organic vapor to interact with the solution. The solids were isolated for XRPD analysis. The results of the vapor-solution diffusion experiments are summarized in Table 3.9.1. The XRPD overlays are shown in FIGS. 14A and 14B.

TABLE 3.9.1

Summary of vapor-solution diffusion experiments

| Experiment ID | Solvent | Anti-solvent | Solid Form |
|---|---|---|---|
| 3.9-1* | EtOH | DCM | Type A |
| 3.9-2* | Acetone | | Type A |
| 3.9-3* | IPA | CHCl₃ | Type A |
| 3.9-4* | EtOAc | | Type A |
| 3.9-5** | NMP | H₂O | Amorphous |
| 3.9-6** | DMAc | | NA |
| 3.9-7 | MIBK | n-Heptane | Type A |
| 3.9-8 | 1,4-Dioxane | | Type A |
| 3.9-9 | CPME | Cyclohexane | Type A |
| 3.9-10 | IPAc | | Type A |

*Clear solution was obtained after 13 days and transferred to evaporate at room temperature.
**Clear solution was obtained after vapor-solution diffusion, which was transferred for vacuum drying at room temperature for 7 days and at 80° C. for 17 hrs.
NA: No solid was obtained after vapor-solution diffusion and vacuum drying.

Example 3.10: Polymer Induced Crystallization

Figure 15A:
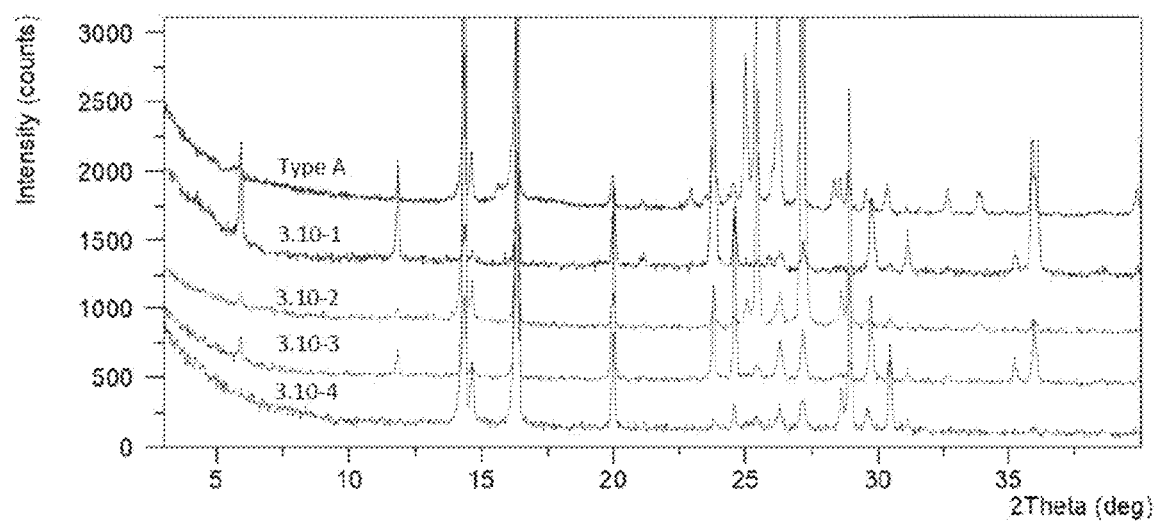
FIG. 15A shows an XRPD overlay of polymer induced crystallization experiments.
Figure 15B:
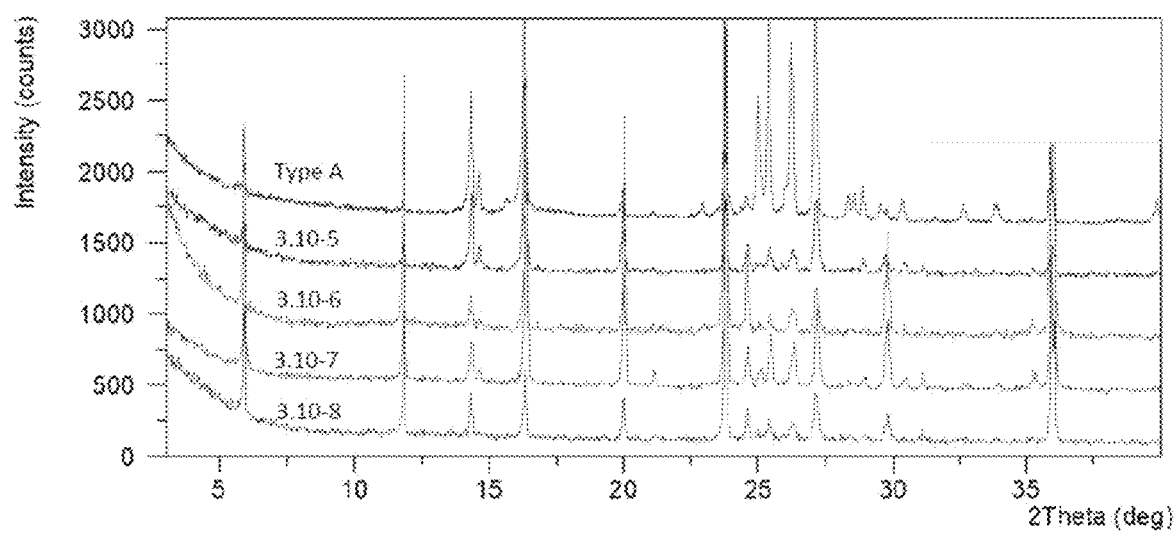
FIG. 15B shows an XRPD overlay of polymer induced crystallization experiments.

Polymer induced crystallization experiments were performed with two sets of polymer mixtures in 8 different solvent systems. For each experiment, 15 mg of starting material was dissolved in 0.5-1.0 mL of solvent in a 3-mL glass vial. About 2 mg of polymer mixture was added into the 3-mL glass vial. The resulting solutions were subjected to evaporation at room temperature with vials sealed by Parafilm® (poked with 3 pin-holes) for slow evaporation. The solids were isolated for XRPD analysis. The results of the polymer induced crystallization experiments are summarized in Table 3.10.1. The XRPD overlays are shown in FIGS. 15A and 15B.

TABLE 3.10.1

Summary of polymer induced crystallization experiments

| Experiment ID | Solvent (v:v) | Polymer | Solid Form |
|---|---|---|---|
| 3.10-1 | MeOH | Polymer mixture A | Type A |
| 3.10-2 | IPA | | Type A |
| 3.10-3 | EtOAc | | Type A |
| 3.10-4 | THF | | Type A |
| 3.10-5 | EtOH | Polymer mixture B | Type A |
| 3.10-6 | Acetone | | Type A |
| 3.10-7 | IPAc | | Type A |
| 3.10-8 | MTBE | | Type A |

Polymer mixture A: polyvinyl pyrrolidone (PVP), polyvinyl alcohol (PVA), polyvinylchloride (PVC), polyvinyl acetate (PVAC), hypromellose (HPMC), methyl cellulose (MC) (mass ratio of 1:1:1:1:1:1).
Polymer mixture B: polycaprolactone (PCL), polyethylene glycol (PEG), polymethyl methacrylate (PMMA), sodium alginate (SA), and hydroxyethyl cellulose (HEC) (mass ratio of 1:1:1:1:1).

Example 3.11: Crystallization by Lyophilization/Slow Evaporation

Further crystallization experiments were performed by lyophilization or slow evaporation. The lyophilization experiment was attempted for the starting material in MeOH/H₂O (1:4). For each experiment, 50 mg of starting material was dissolved in 2.0 mL of the solvent in a 20-mL glass vial. The solution was poured into a watch glass and kept in the −20° C. fridge to freeze for 4 days. Solids of Type A precipitated from the MeOH/H₂O (1:4) solution during the freezing process, which was postulated to be the solubility decrease with temperature.

Figure 16A:
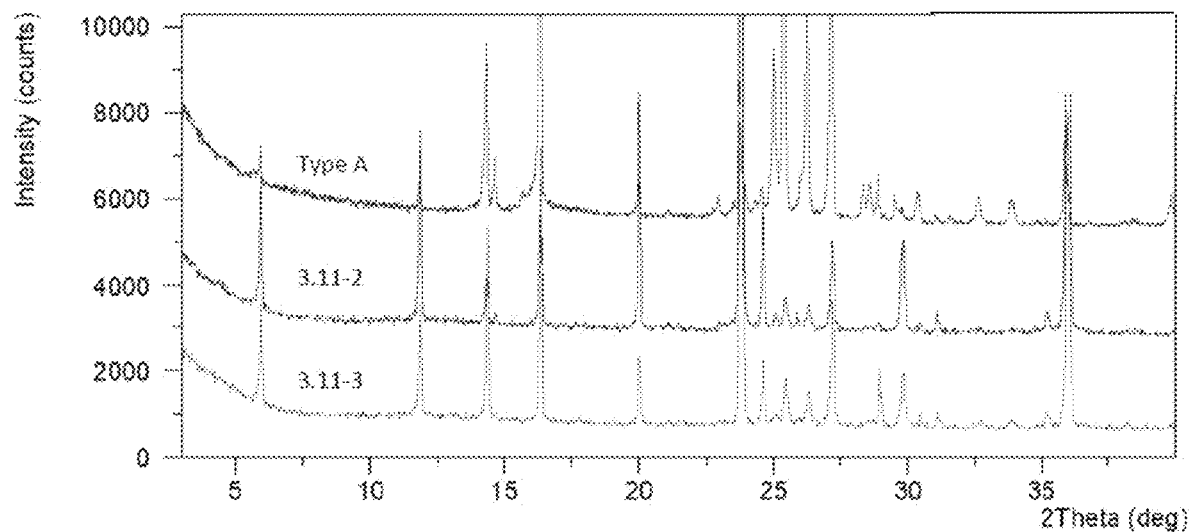
FIG. 16A shows an XRPD overlay of evaporation induced crystallization experiments.

Further evaporation experiments were performed under 2 conditions. Briefly, ~50 mg of starting material was dissolved in 2.0 or 3.0 mL of solvent in a 20-mL glass vial. The resulting suspensions were filtered using a PTFE membrane (pore size of 0.45 μm) and the filtrates were used for the follow-up steps. The visually clear solutions were subjected to evaporation at room temperature with vials sealed by Parafilm® (poked with 5 pin-holes). The solids were isolated for XRPD analysis. The results of the experiments are summarized in Table 3.11.1. The XRPD overlays are shown in FIG. 16A.

TABLE 3.11.1

Summary of lyophilization/evaporation induced crystallization experiments

| Experiment ID | Solvent (v:v) | Method | Solid Form |
|---|---|---|---|
| 3.11-1 | MeOH/H₂O (1:4) | Lyophilization | Type A* |
| 3.11-2 | Acetone | Slow evaporation | Type A |
| 3.11-3 | MTBE | | Type A |

*The solids of Type A precipitated from the MeOH/H₂O (1:4) solution during the freezing process and it was postulated to be the solubility decrease with temperature.

Example 3.12: Crystallization by pH Modification

Figure 16B:
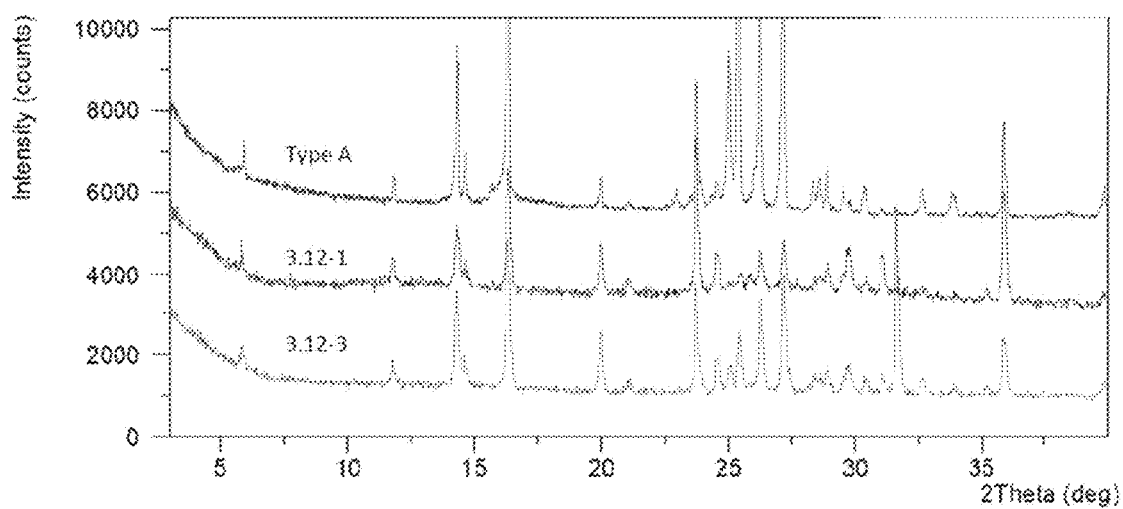
FIG. 16B shows an XRPD overlay of pH modification induced crystallization experiments.
Figure 17A:
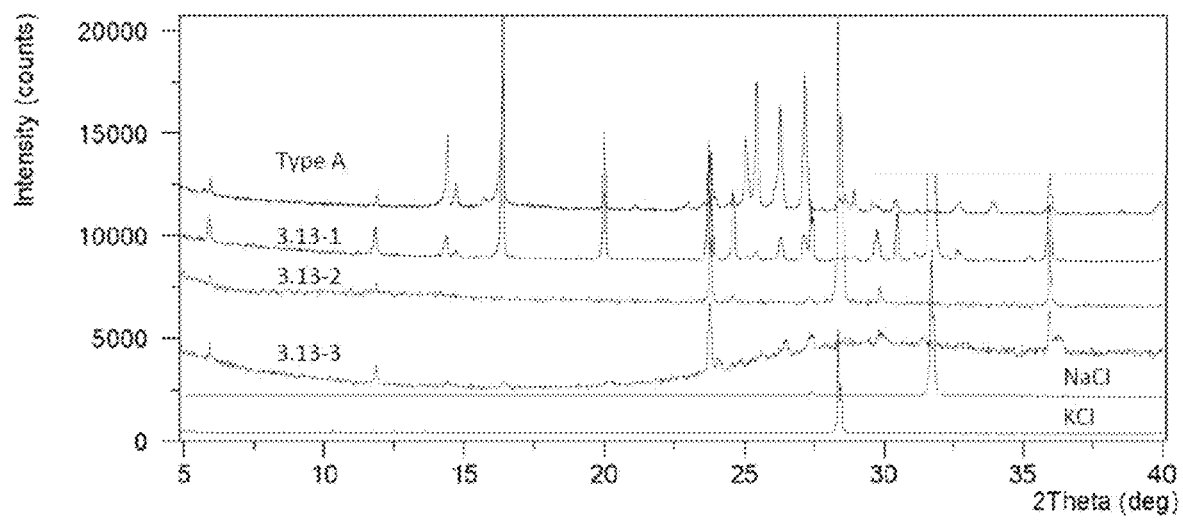
FIG. 17A shows an XRPD overlay of crystallization experiments with the presence of cations.
Figure 17B:
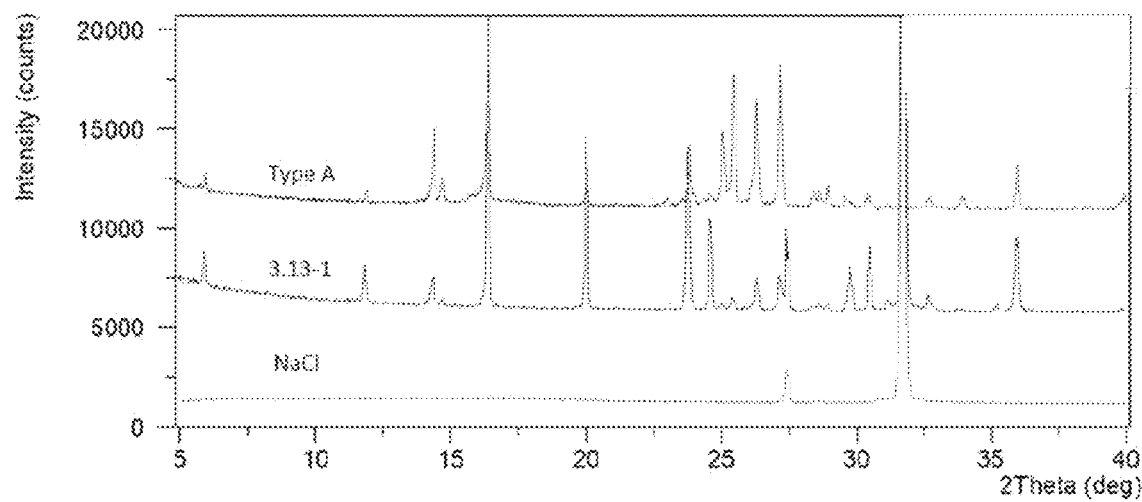
FIG. 17B shows an XRPD overlay of the presence of NaCl induced crystallization experiments.
Figure 18A:
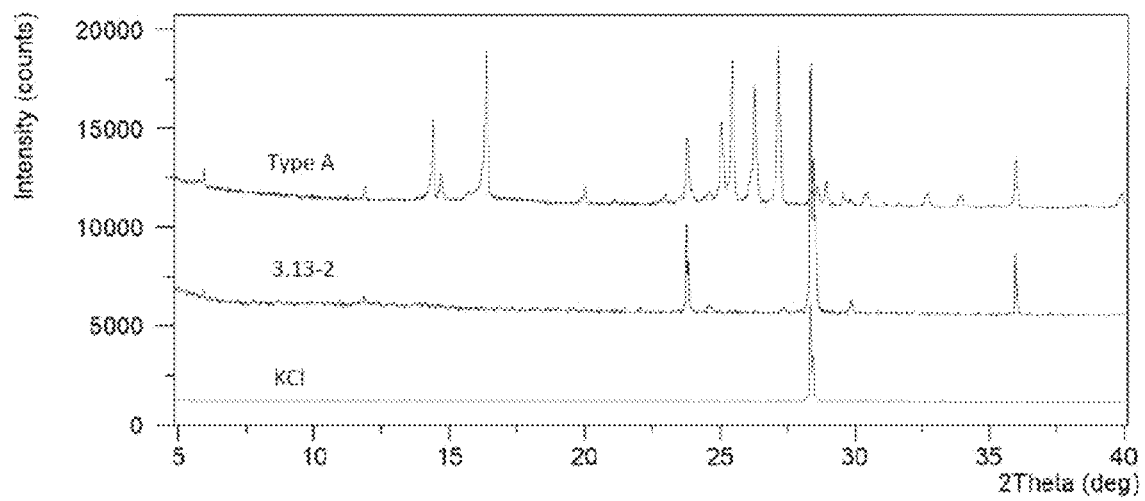
FIG. 18A shows an XRPD overlay of the presence of KCl induced crystallization experiments.
Figure 18B:
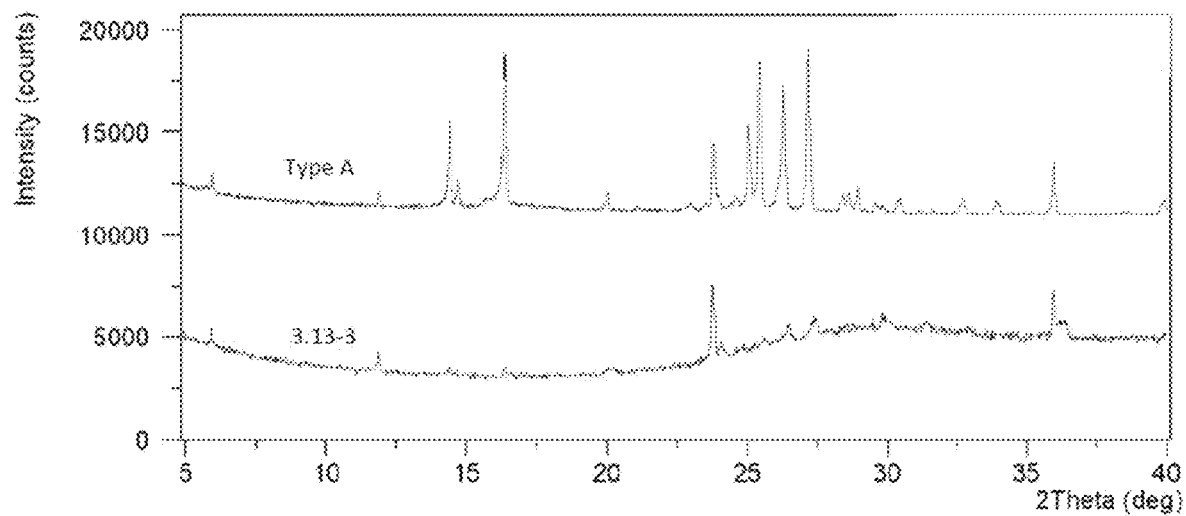
FIG. 18B shows an XRPD overlay of the presence of AlCl$_3$ induced crystallization experiments.

Crystallization experiments by pH modification were performed under 2 conditions. For experiment 3.12-1 in the table below, ~50 mg of starting material was dissolved in 1.0 mL of MeOH, then ice-water and 1.5 M H₂SO₄ were poured into the solution to induce precipitation. For experiment 3.12-3 in the table below, ~50 mg of starting material was dissolved in 1.5 M NaOH solution, then washed with isometric EtOAc and the pH was adjusted to be acidic with HCl. The resulting solids were isolated and analyzed by XRPD. The results of the experiments are summarized in Table 3.12.1. The XRPD overlays are shown in FIG. 16B.

TABLE 3.12.1

Summary of pH modification induced crystallization experiments

| Experiment ID | Solvent | Solid Form |
|---|---|---|
| 3.12-1 | MeOH | Type A |
| 3.12-3 | 1.5M NaOH in water | Type A |

Example 3.13: Crystallization with the Presence of Cations

Crystallization experiments in the presence of cations were performed under 3 conditions, using NaCl, KCl and $AlCl_3$. Control experiments using the same solvent and amount of chloride salt (without addition of (I)) were also set up in parallel.

For each experiment, 50 mg of starting material was dissolved in 2.0 mL solvent to obtain a clear solution and the solution was magnetically stirred (~1000 rpm) followed by addition the corresponding salts (charge ratio of API:salt was 1:5). If solid was obtained, slurry for 24-48 h was performed before isolating. If a solution was obtained, evaporation or anti-solvent addition was performed. A clear solution for NaCl was obtained, and the solution sample was kept at room temperature for evaporation. Solids were obtained for KCl and $AlCl_3$, and the samples were slurried for 24 h before isolating the solids. The obtained solids were analyzed by XRPD. The results of the experiments are summarized in Table 3.13.1. The XRPD overlays are shown in FIGS. 17A, 17B, 18A and 18B.

TABLE 3.13.1

Summary of crystallization experiments with the presence of cations

| Experiment ID | Solvent (v:v) | Cation (source) | Charge ratio (API:cation) | Solid Form Sample | Control |
|---|---|---|---|---|---|
| 3.13-1 | EtOH/$H_2O$ (4:1) | NaCl | 1:5 | Type A + NaCl | NaCl |
| 3.13-2 | | KCl | | Type A + KCl | NA |
| 3.13-3 | | $AlCl_3$ | | Type A | NA |

NA: No solid obtained after slurrying.

Example 4: Type A Single Crystal Structure Determination

Example 4.1: Results

To investigate the form identity of Type A, single crystal structure determination was performed. The results summarized below indicate that Type A is an anhydrate.

The crystal structure of the single crystal sample was determined by single-crystal X-ray diffraction (SCXRD) successfully. The crystal system is triclinic and the space group is P1. The cell parameters are: a=3.8658(6) Å, b=6.3053(10) Å, c=15.082(2) Å, α=98.676(5)°, β=91.240(5)°, γ=99.207(5)°, V=358.34(10) Å$^3$. Further crystallographic data and the refinement parameters are listed below in Table 4.1.1.

Figure 19A:
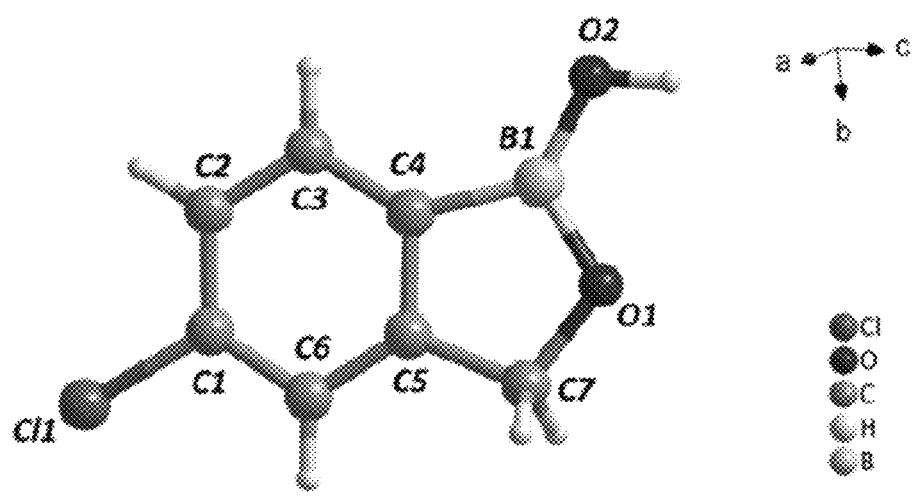
FIG. 19A shows the asymmetric unit of (I) single crystal.
Figure 19B:
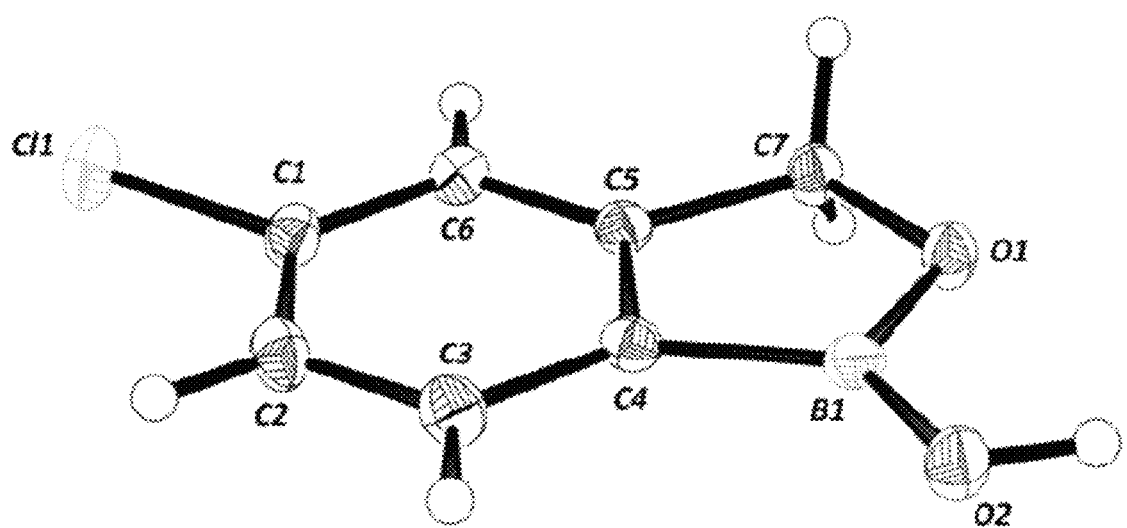
FIG. 19B shows thermal ellipsoid drawing of the (I) molecule (at 50% probability level)
Figure 20A:
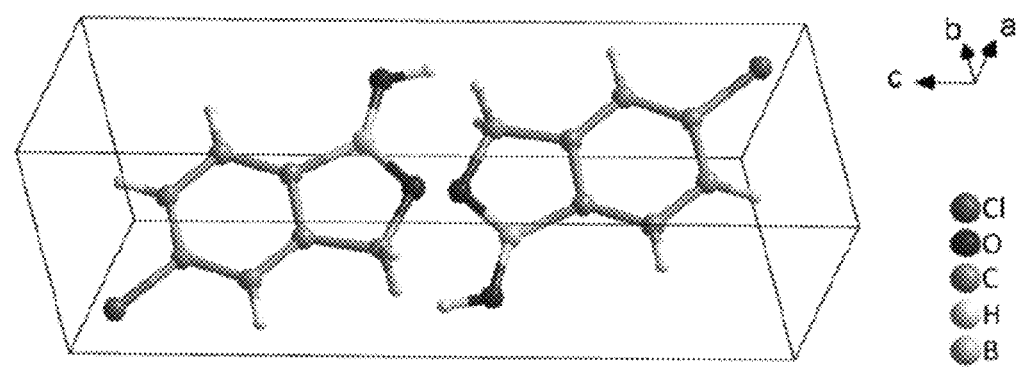
FIG. 20A shows the unit cell of (I) from the single crystal structure.
Figure 20B:
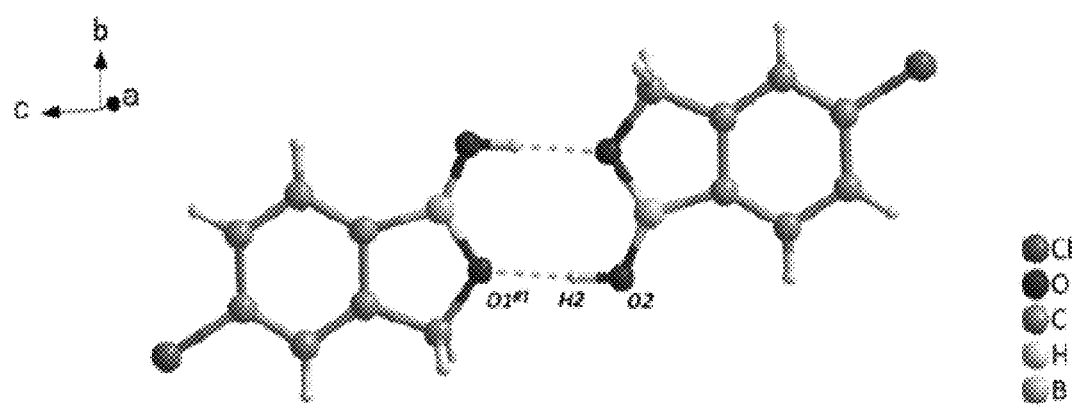
FIG. 20B shows classic hydrogen-bonds in the (I) single crystal structure.
Figure 21A:
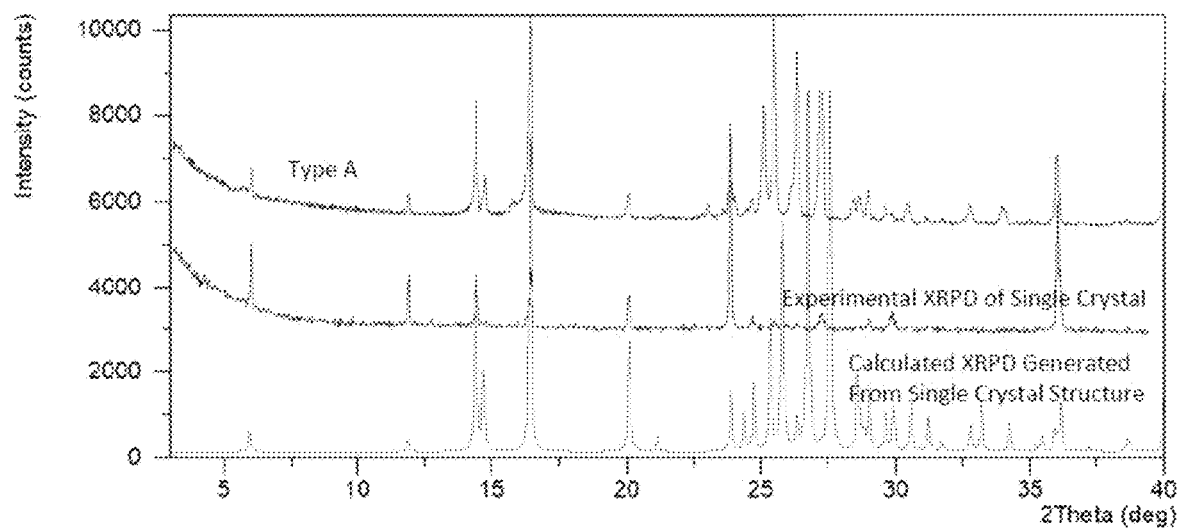
FIG. 21A shows calculated and experimental XRPDs of the single crystal sample and XRPD of (I) Type A reference.

The asymmetric unit of the single crystal is comprised of only one benzoxaborole molecule, which indicates that the single crystal is an anhydrate of the benzoxaborole (FIG. 19A). The thermal ellipsoid drawing of Type A in the crystal lattice is shown in FIG. 19B. The single crystal structure determination confirms the chemical structure of (I) in the crystal. The unit cell of the single crystal is shown in FIG. 20A. demonstrating that each unit cell contains two (I) molecules. The classic hydrogen bonds in the single crystal structure are shown in FIG. 20B and the classic hydrogen bonding parameters are listed in Table 4.1.2. The calculated and experimental XRPD patterns of this single crystal are consistent with experimental XRPD of Type A reference as shown in FIG. 21A.

Tables of positional parameters and their estimated standard deviations, anisotropic displacement factor coefficients, bond distances and angles, torsion angles and hydrogen atom coordinates can be found in Tables 4.7.1-4.7.6.

TABLE 4.1.1

Crystallographic data and refinement parameters

| | |
|---|---|
| Identification code | 814910-07-A6 |
| Empirical formula | $C_7H_6BClO_2$ |
| Formula weight | 168.38 |
| Temperature | 175K |
| Wavelength | Mo/$K_α$ (λ = 0.71073 Å) |
| Crystal system, space group | triclinic, P1̄ |
| Unit cell dimensions | a = 3.8658(6) Å |
| | b = 6.3053(10) Å |
| | c = 15.082(2) Å |
| | α = 98.676(5)° |
| | β = 91.240(5)° |
| | γ = 99.207(5)° |
| Volume | 358.34(10) Å$^3$ |
| Z, Calculated density | 2, 1.561 g/cm$^3$ |
| Absorption coefficient | 0.465 mm$^{-1}$ |
| F(000) | 172.0 |
| Crystal size | 0.6 × 0.15 × 0.02 mm$^3$ |
| 2 Theta range for data collection | 5.47° to 55.252° |
| Limiting indices | −5 ≤ h ≤ 5 |
| | −8 ≤ k < 8 |
| | −19 ≤ l ≤ 19 |
| Reflections collected/Independent reflections | 9247/1611 [$R_{int}$ = 0.0622, $R_{sigma}$ = 0.0393] |
| Refinement method | Full-matrix least-squares on F$^2$ |
| Data/restraints/parameters | 1611/1/104 |
| Goodness-of-fit on F$^2$ | 1.058 |
| Final R indices [I ≥ 2sigma(I)] | $R_1$ = 0.0356, w$R_2$ = 0.0957 |
| Final R indices [all data] | $R_1$ = 0.0374, w$R_2$ = 0.0968 |
| Largest diff. peak and hole | 0.35/−0.30 e · Å$^{-3}$ |

TABLE 4.1.2

Classic H-bonds list in the BAG8 single crystal structure

| | Type | | | | |
|---|---|---|---|---|---|
| | D-H . . . A | d(D-H)/Å | d(H-A)/Å | d(D . . . A)/Å | (D-H . . . A)/° |
| Intermolecular | O2-H2 . . . O1[#1] | 0.919(16) | 1.844(16) | 2.7625(16) | 177.5(14) |

Calculated by PLATON program (version: 290617),
(Analysis of Potential Hydrogen Bonds with d(D . . . A) < R(D) + R(A) + 0.50 Ang., d(H . . . A) < R(H) + R(A) − 0.12 Ang., D-H . . . A ≥ 100.0 Deg).
Symmetry operation code[#1]: (−x, 1 − y, 1 − z)

Example 4.2: Data Collection

A suitable single crystal with good diffraction quality was selected and was wrapped with Paratone-N (an oil based cryoprotectant). The crystal was mounted on a mylar loop in a random orientation and immersed in a stream of nitrogen at 175 K. Preliminary examination and data collection were performed on a Bruker D8 VENTURE diffractometer (Mo/$K_\alpha$ radiation, $\lambda = 0.71073$ Å) and analyzed with the APEX3 software package.

Cell parameters and an orientation matrix for data collection were retrieved and refined (least-squares refinement) by SAINT (Bruker, V8.37A, 2015) software using the setting angles of 8581 reflections in the range $2.736° < \theta < 27.608°$. The data were collected to a maximum diffraction angle ($\theta$) of 27.626° at 175 K. The data set was 97.7% complete out to 27.626° in $\theta$, having a Mean I/$\sigma$ of 25.5 and D min (Mo) of 0.77 Å.

Example 4.3: Data Reduction

Frames were integrated with SAINT (Bruker, V8.37A, 2015). A total of 9247 reflections were collected, of which 1611 were unique. Lorentz and polarization corrections were applied to the data. A multi-scan absorption correction was performed using SADABS-2016/2 (Bruker, 2016/2). $wR_2$ (int) was 0.1763 before and 0.0948 after correction. The absorption coefficient $\mu$ of this material is 0.465 mm$^{-1}$ at this wavelength ($\lambda = 0.71073$ Å) and the minimum and maximum transmissions are 0.5018 and 0.7456. Intensities of equivalent reflections were averaged. The agreement factor for the averaging was 6.22% based on intensity.

Example 4.4: Single Crystal Structure Solution and Refinement

The structure was solved in the space group P$\bar{1}$ by Intrinsic Phasing method using the ShelXT structure solution program and refined by full-matrix least-squares on $F^2$ method using ShelXL (Version 2018/1) refinement package contained in OLEX2. All non-hydrogen atoms were refined anisotropically. The positions of hydrogen atoms residing on carbon atoms were calculated geometrically and refined using the riding model. The positions of hydrogen atom residing on oxygen atom was refined freely according to the Fourier Map.

Example 4.5: Calculated X-Ray Powder Diffraction (XRPD) Pattern

The calculated XRPD pattern was generated for Cu radiation using Mercury program and the atomic coordinates, space group, and unit cell parameters from the single crystal structure.

Example 4.6: Single Crystal Structure Diagrams

The crystal structure representations were generated by Diamond. The thermal ellipsoids drawing was generated by ORTEP-III.

Example 4.7: Single Crystal Structure Data

TABLE 4.7.1

Fractional atomic coordinates ($\times 10^4$) and equivalent isotropic displacement parameters (Å$^2 \times 10^3$) for BAG8 single crystal structure

| Atom | x | y | z | Ueq |
|---|---|---|---|---|
| Cl1 | 9468.0(10) | 8178.9(7) | 710.1(2) | 29.58(16) |
| O1 | 2587(3) | 6546.6(16) | 4356.3(7) | 19.9(2) |
| O2 | 286(3) | 2759.0(17) | 3984.7(7) | 23.1(3) |
| C6 | 7119(4) | 8234(2) | 2380.0(10) | 19.5(3) |
| C3 | 4354(4) | 3764(2) | 2057.1(10) | 22.0(3) |
| C7 | 4638(4) | 8258(2) | 3959.2(10) | 19.3(3) |
| C5 | 5384(4) | 7215(2) | 3033.9(9) | 16.7(3) |
| C4 | 3975(4) | 5006(2) | 2890.1(9) | 17.5(3) |
| C1 | 7419(4) | 6957(3) | 1562.5(10) | 20.6(3) |
| C2 | 6081(4) | 4745(3) | 1392.0(10) | 23.3(3) |
| B1 | 2121(4) | 4597(3) | 3764.6(11) | 18.1(3) |

$U_{eq}$ is defined as ⅓ of the trace of the orthogonalised $U_{ij}$ tensor.

TABLE 4.7.2.

Anisotropic displacement parameters (Å$^2 \times 10^3$) for BAG8 single crystal structure

| Atom | $U_{11}$ | $U_{22}$ | $U_{33}$ | $U_{23}$ | $U_{13}$ | $U_{12}$ |
|---|---|---|---|---|---|---|
| Cl1 | 32.3 (3) | 37.8 (3) | 18.7 (2) | 8.90 (16) | 5.50 (15) | 0.86 (17) |
| O1 | 25.3 (5) | 16.0 (5) | 17.7 (5) | 2.7 (4) | 5.6 (4) | 0.5 (4) |
| O2 | 29.5 (6) | 16.7 (5) | 22.2 (5) | 3.0 (4) | 5.6 (4) | 0.6 (4) |
| C6 | 19.2 (7) | 19.3 (7) | 19.8 (7) | 4.1 (5) | −0.3 (5) | 2.2 (5) |
| C3 | 23.0 (7) | 19.9 (7) | 21.3 (7) | −0.7 (6) | 0.6 (6) | 1.6 (5) |
| C7 | 24.2 (7) | 14.5 (6) | 18.7 (7) | 2.9 (5) | 4.7 (5) | 0.9 (5) |
| C5 | 15.4 (6) | 18.3 (6) | 16.6 (6) | 2.5 (5) | −0.4 (5) | 4.1 (5) |
| C4 | 16.4 (6) | 17.6 (6) | 18.6 (7) | 2.0 (5) | −0.2 (5) | 3.7 (5) |

TABLE 4.7.2.-continued

Anisotropic displacement parameters (Å² × 10³) for BAG8 single crystal structure

| Atom | U₁₁ | U₂₂ | U₃₃ | U₂₃ | U₁₃ | U₁₂ |
|---|---|---|---|---|---|---|
| C1 | 17.9 (7) | 28.1 (8) | 16.2 (7) | 5.2 (6) | 0.2 (5) | 3.7 (5) |
| C2 | 24.0 (7) | 28.1 (8) | 16.0 (7) | −1.6 (6) | 0.3 (5) | 4.0 (6) |
| B1 | 19.6 (7) | 16.4 (7) | 18.9 (7) | 3.3 (6) | 0.2 (6) | 4.2 (6) |

The anisotropic displacement factor exponent takes the form −2π²[h²a*²U₁₁ + 2hka*b*U₁₂ + . . . ].

TABLE 4.7.3

Bond lengths for BAG8 single crystal structure

| Atom | Atom | Length/Å | Atom | Atom | Length/Å |
|---|---|---|---|---|---|
| Cl1 | C1 | 1.7383(15) | C3 | C4 | 1.400(2) |
| O1 | C7 | 1.4469(17) | C3 | C2 | 1.385(2) |
| O1 | B1 | 1.3895(19) | C7 | C5 | 1.5046(19) |
| O2 | B1 | 1.3490(19) | C5 | C4 | 1.3945(19) |
| C6 | C5 | 1.385(2) | C4 | B1 | 1.551(2) |
| C6 | C1 | 1.385(2) | C1 | C2 | 1.391(2) |

TABLE 4.7.4.

Bond angles for BAG8 single crystal structure

| Atom | Atom | Atom | Angle/° | Atom | Atom | Atom | Angle/° |
|---|---|---|---|---|---|---|---|
| B1 | O1 | C7 | 110.39 (11) | C5 | C4 | B1 | 105.07 (12) |
| C5 | C6 | C1 | 116.97 (13) | C6 | C1 | Cl1 | 118.67 (12) |
| C2 | C3 | C4 | 119.75 (14) | C6 | C1 | C2 | 122.56 (14) |
| O1 | C7 | C5 | 105.56 (11) | C2 | C1 | Cl1 | 118.76 (12) |
| C6 | C5 | C7 | 126.92 (13) | C3 | C2 | C1 | 119.34 (14) |
| C6 | C5 | C4 | 122.44 (13) | O1 | B1 | C4 | 108.35 (12) |
| C4 | C5 | C7 | 110.61 (12) | O2 | B1 | O1 | 121.39 (14) |
| C3 | C4 | B1 | 135.94 (13) | O2 | B1 | C4 | 130.26 (14) |
| C5 | C4 | C3 | 118.92 (13) | — | — | — | — |

TABLE 4.7.5

Hydrogen atom coordinates (Å × 10⁴) and isotropic displacement parameters (Å² × 10³) for BAG8 single crystal structure

| Atom | x | y | z | U_eq |
|---|---|---|---|---|
| H6 | 8061.18 | 9742.31 | 2487.19 | 23 |
| H3 | 3429.68 | 2254.02 | 1948.55 | 26 |
| H7A | 6851.24 | 8843.11 | 4318.24 | 23 |
| H7B | 3303.47 | 9460.91 | 3924.71 | 23 |
| H2A | 6350.45 | 3915.25 | 824.75 | 28 |
| H2 | −710(60) | 2950(40) | 4533(9) | 46(6) |

TABLE 4.7.6

Torsion angles for BAG8 single crystal structure

| Atom | Atom | Atom | Atom | Angle/° |
|---|---|---|---|---|
| Cl1 | C1 | C2 | C3 | −178.18(11) |
| O1 | C7 | C5 | C6 | 176.47(13) |
| O1 | C7 | C5 | C4 | −1.75(15) |
| C6 | C5 | C4 | C3 | 0.6(2) |
| C6 | C5 | C4 | B1 | −176.84(13) |
| C6 | C1 | C2 | C3 | 0.5(2) |
| C3 | C4 | B1 | O1 | −177.47(15) |
| C3 | C4 | B1 | O2 | 2.0(3) |
| C7 | O1 | B1 | O2 | −179.97(13) |
| C7 | O1 | B1 | C4 | −0.43(16) |
| C7 | C5 | C4 | C3 | 178.93(12) |
| C7 | C5 | C4 | B1 | 1.47(15) |
| C5 | C6 | C1 | Cl1 | 178.24(10) |

TABLE 4.7.6-continued

Torsion angles for BAG8 single crystal structure

| Atom | Atom | Atom | Atom | Angle/° |
|---|---|---|---|---|
| C5 | C6 | C1 | C2 | −0.4(2) |
| C5 | C4 | B1 | O1 | −0.67(15) |
| C5 | C4 | B1 | O2 | 178.82(15) |
| C4 | C3 | C2 | C1 | 0.0(2) |
| C1 | C6 | C5 | C7 | −178.15(13) |
| C1 | C6 | C5 | C4 | −0.1(2) |
| C2 | C3 | C4 | C5 | −0.5(2) |
| C2 | C3 | C4 | B1 | 175.92(15) |
| B1 | O1 | C7 | C5 | 1.29(15) |

Example 5: Formation of (II) and Investigation of TGA Weight Loss

The single crystal structure determination results in Example 4 demonstrated that (I) of Type A is an anhydrate, while a weight loss of 10.0% from 100° C. to 160° C. was observed on the TGA curve. To investigate this TGA weight loss, additional experiments were performed.

Based on the chemical structure, (I) has a benzoxaborole group, which may undergo a dehydration reaction under elevated temperature as shown below:

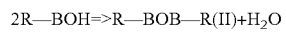

Meanwhile, the dehydrated product would convert back to BAG8 when exposed to water as shown below:

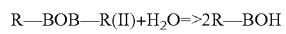

Accordingly, the TGA weight loss may be associated with the dehydration reaction shown above, where the compound of formula (II) is a product.

Figure 21B:
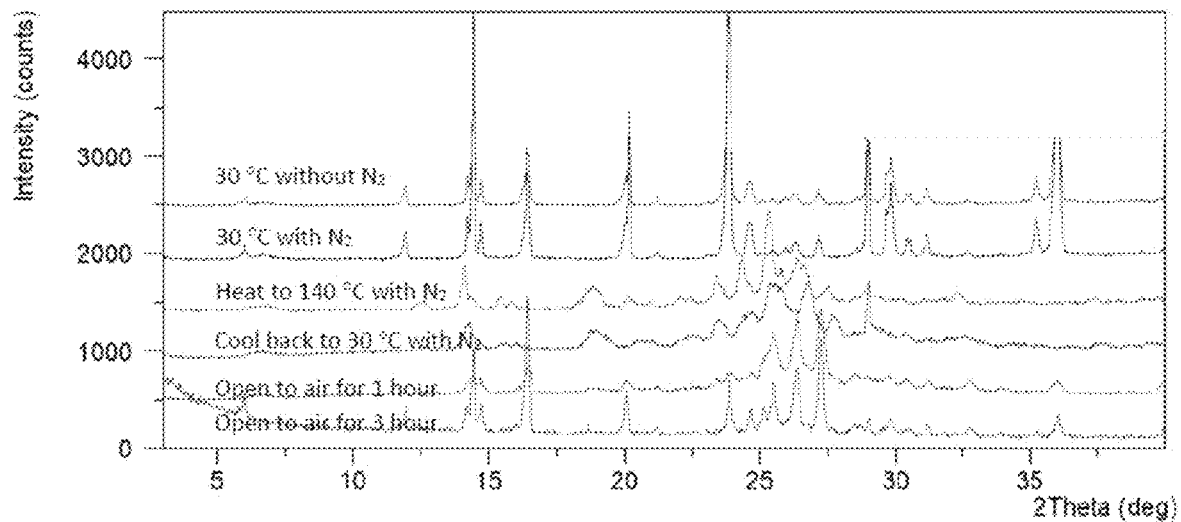
FIG. 21B shows VT-XRPD patterns of crystalline form A.
Figure 22A:
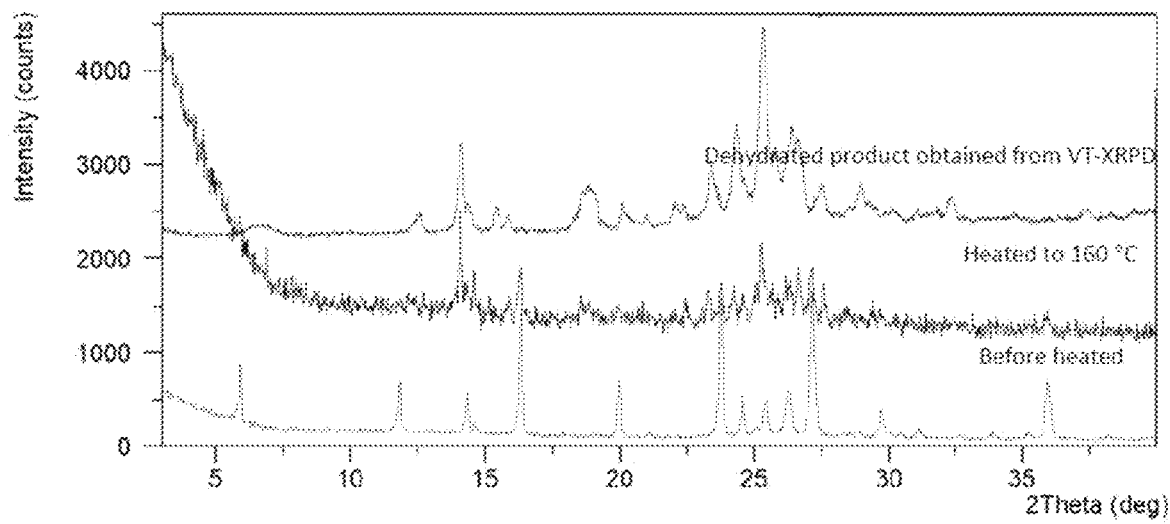
FIG. 22A shows an XRPD overlay of heating experiment for crystalline form A.
Figure 22B:
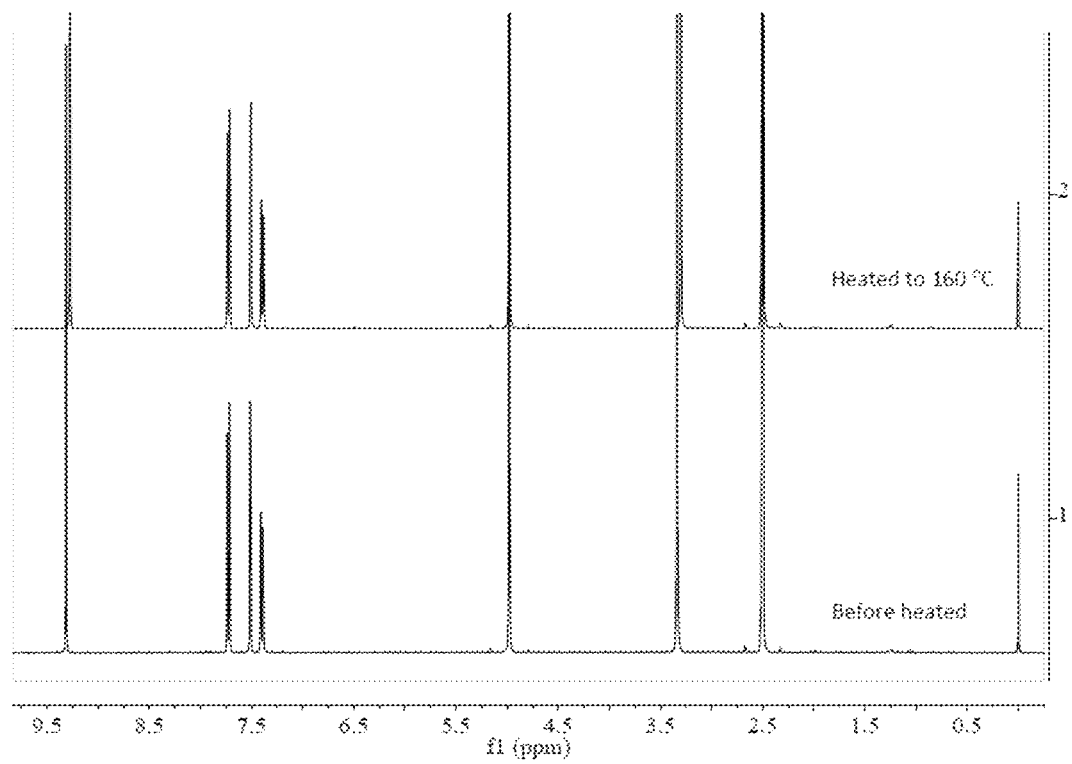
FIG. 22B shows an $^1$H NMR overlay of crystalline form A before and after heating.
Figure 23A:
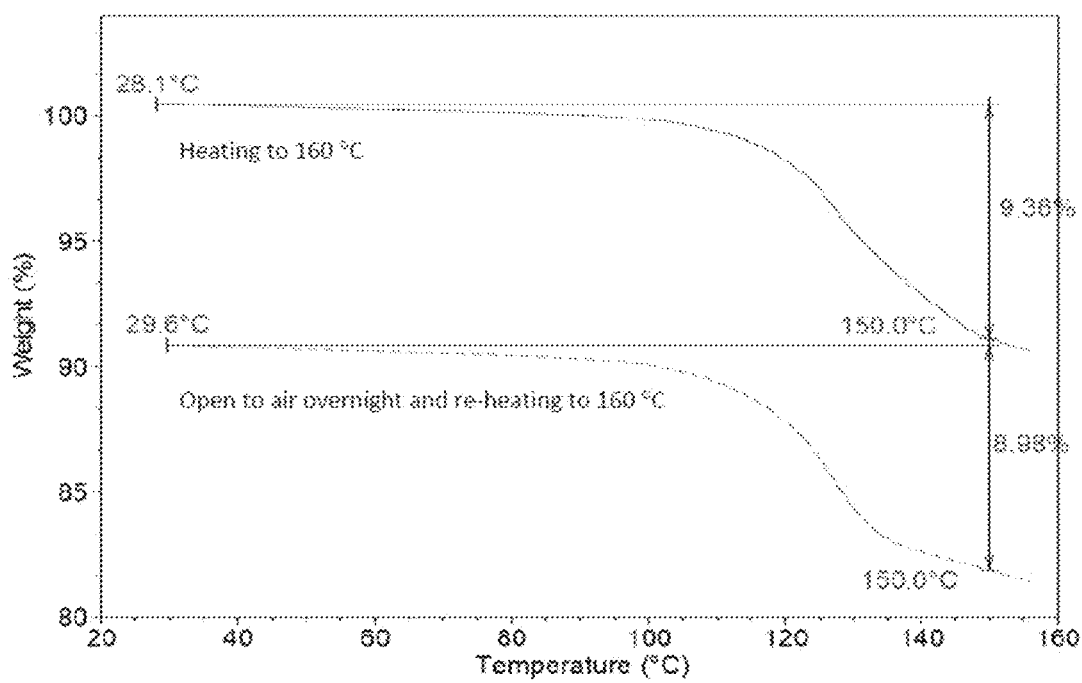
FIG. 23A shows TGA curves of crystalline form A before and after heating.

To confirm this hypothesis, variable-temperature XRPD (VT-XRPD) and heating experiments were performed. The VT-XRPD patterns in FIG. 21B indicated that changes of diffraction peaks were observed after heating to 140° C. with N2 purge, which was postulated to be the formation of the dehydrated product (II). After being exposed in air for 3 hrs, the XRPD pattern converted back to Type A, which may be due to the conversion from dehydrated product to Type A when exposed to moisture in air. A further heating experiment was conducted for Type A. The XRPD overlay displayed in FIG. 22A indicated that a partial conversion to the dehydrated product (II) occurred after being heated to 160° C. and cooled to RT (when exposed to air). ¹H NMR and TGA were also performed for the samples before and after heating. The ¹H NMR results in FIG. 22B show no difference before and after heating, likely because the dehydrated product converted back to (I) after being exposed to residual water in DMSO-d₆. TGA was also performed by heating (I) to 160° C. and cooling to room temperature, followed by re-heating to 160° C. after placed being placed under ambient conditions overnight. The results in FIG. 23A showed a similar weight loss was still observed for the re-heated sample. All the results were consistent with the hypothesis that dehydration and hydration reactions would occur during heating and exposure to air, respectively.

Figure 23B:
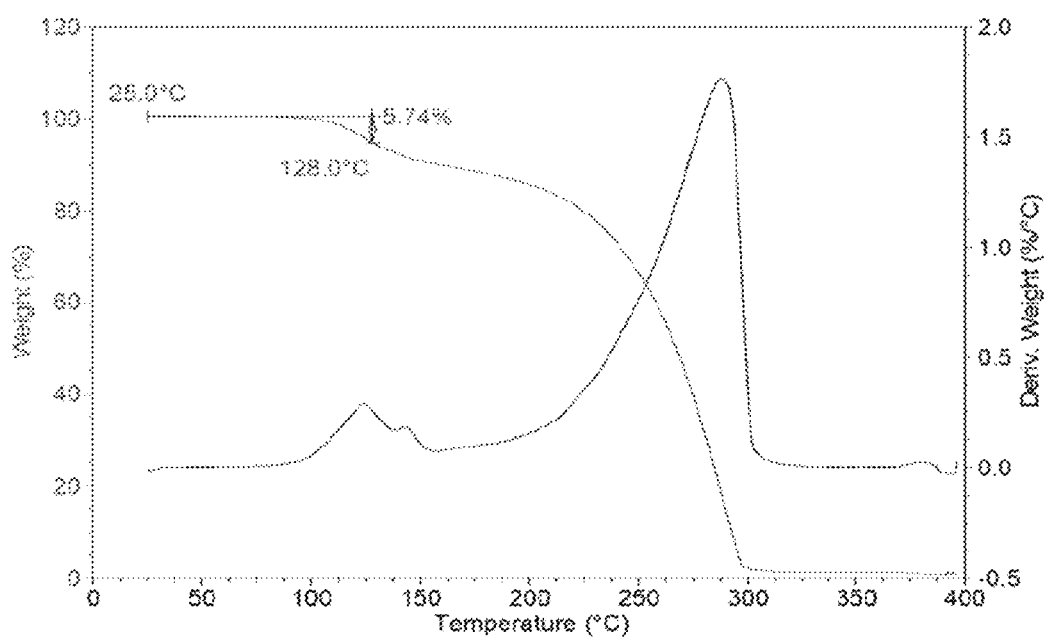
FIG. 23B shows TGA curve of crystalline form A.

The results of VT-XRPD and heating experiment preliminarily confirmed the dehydration reaction. However, the theoretical weight loss of dehydration was calculated to be 5.4%, which was not consistent with the observed TGA weight loss of 10.0%. To further explain the difference on weight loss, the TGA data of Type A were re-visited. The results in FIG. 23B indicate that there might be 2 events involved in the TGA weight loss from 100° C. to 160° C., one of which is the dehydration of (I) (the theoretical weight loss of dehydration was close to the TGA weight loss up to 128° C.), while the other may be the complete decomposition or sublimation of the dehydrated product (if it's partial decomposition, the sample after heated should not convert back to (I) upon exposure to air).

Figure 24A:
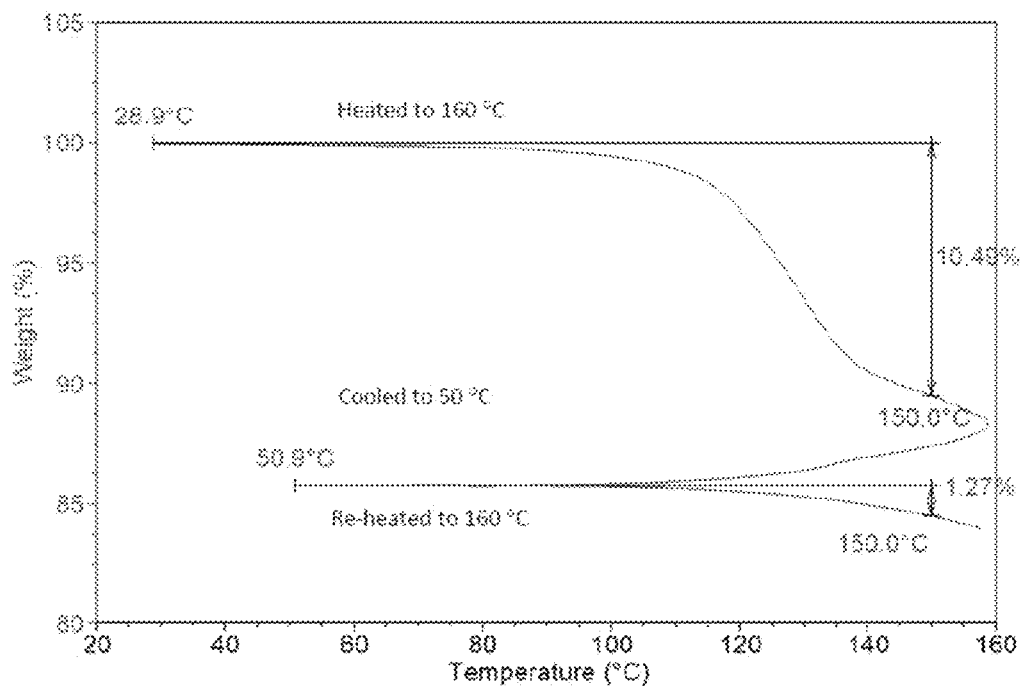
FIG. 24A shows Cycle TGA curve of crystalline form A.
Figure 24B:
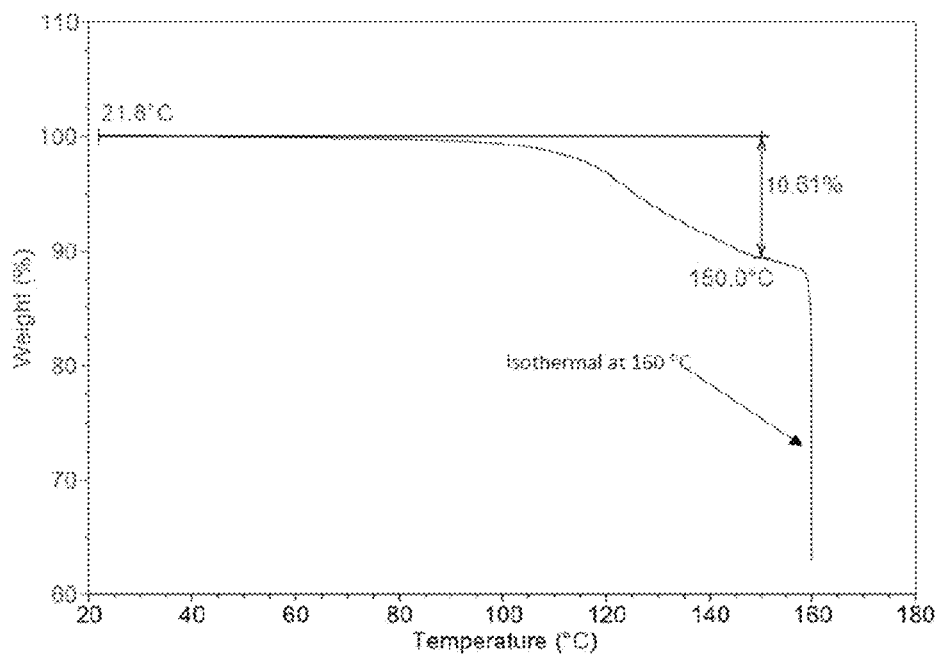
FIG. 24B shows isothermal TGA curve of crystalline form A.

To further demonstrate the event of complete decomposition or sublimation, cycle TGA and isothermal TGA were performed. Cycle TGA was conducted by heating Type A to 160° C. and cooling to 50° C. (with N2 purge, without exposure to air), followed by re-heating to 160° C. The results in FIG. 24A indicated that a weight loss of 1.3% up to 150° C. was still observed on the re-heating curve, which was postulated to be decomposition/sublimation rather than dehydration. Isothermal TGA was conducted by heating Type A to 160° C. and isothermal at 160° C. for 0.5 hr. A weight loss of >20% was observed during the isothermal stage FIG. 24B, which was postulated to be decomposition/sublimation.

Based on the above-mentioned results, it is postulated that the TGA weight loss of 10.0% from 100° C. to 160° C. is caused by the dehydration reaction of (I) to (II) and subsequent decomposition and/or sublimation of the dehydrated product.

Example 6: Peak List of Type A

Figure 25:
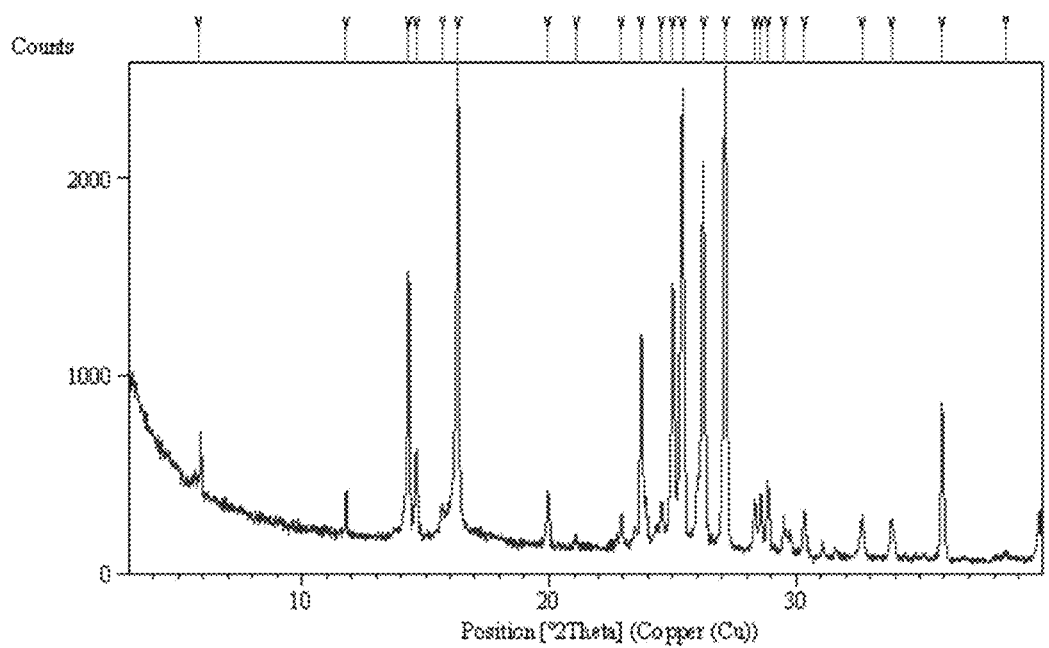
FIG. 25 shows a full XRPD pattern of crystalline form A.

The XRPD pattern of the crystalline form A (Type A) is shown in FIG. 25 and the corresponding peak lists are summarized in Table 6.1.

TABLE 6.1

Peak list of Crystalline Form A

| Pos. [°2Th.] | Height [cts] | FWHM Left [°2Th.] | d-spacing [Å] | Rel. Int. [%] |
| --- | --- | --- | --- | --- |
| 5.790387 | 63.703740 | 0.307008 | 15.26331 | 2.65 |
| 11.806800 | 184.519300 | 0.153504 | 7.49563 | 7.68 |
| 14.306790 | 971.673800 | 0.153504 | 6.19096 | 40.44 |
| 14.654560 | 353.063800 | 0.102336 | 6.04482 | 14.69 |
| 15.699860 | 139.953100 | 0.153504 | 5.64463 | 5.82 |
| 16.319600 | 2349.213000 | 0.102336 | 5.43164 | 97.76 |
| 19.954330 | 244.041000 | 0.153504 | 4.44971 | 10.16 |
| 21.071230 | 49.189390 | 0.153504 | 4.21630 | 2.05 |
| 22.921070 | 164.057200 | 0.102336 | 3.88004 | 6.83 |
| 23.730930 | 1097.223000 | 0.102336 | 3.74943 | 45.66 |
| 24.545800 | 247.172900 | 0.102336 | 3.62677 | 10.29 |
| 25.009240 | 1334.304000 | 0.127920 | 3.56061 | 55.53 |
| 25.393310 | 2308.539000 | 0.102336 | 3.50762 | 96.07 |
| 26.240490 | 1822.920000 | 0.102336 | 3.39627 | 75.86 |
| 27.128160 | 2402.974000 | 0.102336 | 3.28712 | 100.00 |

TABLE 6.1-continued

Peak list of Crystalline Form A

| Pos. [°2Th.] | Height [cts] | FWHM Left [°2Th.] | d-spacing [Å] | Rel. Int. [%] |
| --- | --- | --- | --- | --- |
| 28.335420 | 263.444600 | 0.127920 | 3.14975 | 10.96 |
| 28.568900 | 296.917800 | 0.102336 | 3.12454 | 12.36 |
| 28.869550 | 357.150700 | 0.102336 | 3.09268 | 14.86 |
| 29.537930 | 155.971900 | 0.153504 | 3.02421 | 6.49 |
| 30.343380 | 217.025700 | 0.153504 | 2.94574 | 9.03 |
| 32.662840 | 203.905000 | 0.127920 | 2.74166 | 8.49 |
| 33.863760 | 178.581400 | 0.102336 | 2.64713 | 7.43 |
| 35.909360 | 772.947800 | 0.102336 | 2.50089 | 32.17 |
| 38.485450 | 27.402440 | 0.716352 | 2.33922 | 1.14 |

Example 7: Suspension Concentrate Formulation Preparation and Tank Mix Stability (Unconfirmed)

A suspension concentrate formulation was prepared using the following reagents and procedure:

| Reagent | Amount |
| --- | --- |
| Water | 66.59 g |
| Glycerin | 5.0 g |
| ATLAS G-5002L (wetting agent) | 1.0 g |
| ATLOX 4913 LQ (dispersant) | 1.0 g |
| Momentive SAG30 (antifoam) | 0.1 g |
| Thickner (kelzan, proxcel antimicrobial, water) | 0.12 g kelzan, 60 mg antimicrobial, 5.82 g water |
| I (unconfirmed crystalline form A) | 20.2 g |

The water and glycerin was mixed with a low shear mixture. The wetting agent was then added to the mixture, followed by the dispersant and antifoam. Compound I (believed to be crystalline form A) was then added slowly portion-wise. The resulting suspension was then added to a Szegvani Atritor Bead Mill system, and the suspension is bead milled for 1.5-2 hours or until (I) reached the desired particle size. While the suspension is milling, in a separate container, the thickener mixture was prepared by first adding the proxcel to water, then adding the kelzan slowly with a high shear mixture. When the milling was complete, the beads were removed by filtration and the thickener mixture was mixed with the milled mixture with a low shear mixer.

To determine the stability of the tank mix (applied formulation) 150 mg of the suspension concentrate was then added to 20 g of water and gently shaken. This applied formulation was visually monitored for stability over the course of 30 minutes, and then analyzed with a Malvern 3000E to determine particle size. The applied formulation remained a white suspension over the course of about 30 minutes. When analyzed, the solution showed a $D_{50}$ of 10.70 μm and a $D_{90}$ of 25.50 μm. The form is believed to be crystalline form A.

Example 8: Suspension Concentrate Formulation Preparation and Stability (Unconfirmed)

A suspension concentrate formulation was prepared using the following reagents and the procedure detailed in Example 7:

| Reagent | Amount |
| --- | --- |
| Water | 66.59 g |
| Glycerin | 5.0 g |
| ATLAS G-5002L (wetting agent) | 1.0 g |
| ATLOX 4913 LQ (dispersant) | 1.0 g |
| Momentive SAG30 (antifoam) | 0.1 g |
| Thickner (kelzan, proxcel antimicrobial, water) | 0.12 g kelzan, 60 mg antimicrobial, 5.82 g water |
| I (unconfirmed crystalline form A) | 20.2 g |

The SC formulation were visually monitored for stability after it was stored at; 5° C., 20° C., or 50° C. for 10 days. The formulations were then diluted in water and analyzed with a Malvern 3000E to determine particle size. Visually, the 50° C. sample demonstrated hard sedimentation and settling of active ingredient but little to no change was noted for the samples that were stored at 5° C. or 20° C. Particle size analysis of the diluted SC formulations are shown in the Table below. The form is believed to be crystalline form A. The data shows that the particle size of the SC formulations did not change under any of the storage conditions, demonstrating that the solid form and corresponding SC formulation are favorable for agrochemical applications.

| Formulation | Day 1 $D_{10}$ | Day 1 $D_{50}$ | Day 1 $D_{90}$ | Day 5 $D_{10}$ | Day 5 $D_{50}$ | Day 5 $D_{90}$ | Day 10 $D_{10}$ | Day 10 $D_{50}$ | Day 10 $D_{90}$ |
| --- | --- | --- | --- | --- | --- | --- | --- | --- | --- |
| 5° C. | 3.29 | 9.57 | 24.8 | 3.27 | 9.42 | 23.4 | 3.10 | 9.02 | 22.9 |
| 20° C. | 3.74 | 10.7 | 25.5 | 3.06 | 8.95 | 22.7 | 3.40 | 9.74 | 23.9 |
| 50° C. | 3.18 | 9.02 | 22.5 | 3.42 | 9.66 | 32.6 | 2.89 | 8.28 | 21.0 |

Example 9: Suspension Concentrate Formulation Preparation and Tank Mix Stability (Unconfirmed)

A suspension concentrate formulation was prepared using the following reagents and the procedure detailed in Example 7:

| Reagent | Amount |
| --- | --- |
| Water | 54.95 g |
| Glycerin | 5.0 g |
| ATLAS G-50002L (wetting agent) | 0.4 g |
| ATLOX 4913 LQ (dispersant) | 0.4 g |
| Momentive SAG30 (antifoam) | 0.1 g |
| Thickner (kelzan, proxcel antimicrobial, water) | 0.24 g kelzan, 0.12 g antimicrobial, 11.64 g water |
| I (unconfirmed crystalline form A) | 20.1 g |

To determine the stability of the tank mix (applied formulation) 150 mg of this suspension concentrate was then added to 20 g of water and gently shaken. The applied formulation was visually monitored for stability over the course of 30 minutes, and then analyzed with a Malvern 3000E to determine particle size. The applied formulation remained a white suspension over the course of 30 minutes. When analyzed, the solution showed a $D_{50}$ of 6.10 µm and a $D_{90}$ of 15.50 µm. The form is believed to be crystalline form A.

Example 10: Suspension Concentrate Formulation Preparation and Stability (Unconfirmed)

A suspension concentrate formulation was prepared using the following reagents and the procedure detailed in Example 7:

| Reagent | Amount |
| --- | --- |
| Water | 54.95 g |
| Glycerin | 5.0 g |
| ATLAS G-50002L (wetting agent) | 0.4 g |
| ATLOX 4913 LQ (dispersant) | 0.4 g |
| Momentive SAG30 (antifoam) | 0.1 g |
| Thickner (kelzan, proxcel antimicrobial, water) | 0.24 g kelzan, 0.12 g antimicrobial, 11.64 g water |
| I (unconfirmed crystalline form A) | 20.1 g |

The SC formulation was visually monitored for stability when it was stored at: 5° C., 20° C., or 50° C., each for 10 days. Following storage, the formulations were then diluted in water analyzed with a Malvern 3000E to determine particle size. Visually, the sample displayed little to no change over the 10 days at; 5° C., 20° C., or 50° C. Particle size analysis of the diluted SC formulations are shown in the Table below. The form is believed to be crystalline form A. The data shows that the particle size of the SC formulations did not change under any storage conditions, demonstrating that the solid form and corresponding SC formulation are favorable for agrochemical applications.

| Formulation | Day 1 $D_{10}$ | Day 1 $D_{50}$ | Day 1 $D_{90}$ | Day 5 $D_{10}$ | Day 5 $D_{50}$ | Day 5 $D_{90}$ | Day 10 $D_{10}$ | Day 10 $D_{50}$ | Day 10 $D_{90}$ |
|---|---|---|---|---|---|---|---|---|---|
| 5° C. | 2.06 | 5.89 | 14.3 | 1.95 | 5.65 | 14.0 | 2.02 | 5.81 | 14.3 |
| 20° C. | 2.11 | 6.10 | 15.5 | 1.79 | 5.60 | 13.7 | 1.67 | 5.41 | 13.1 |
| 50° C. | 1.84 | 5.89 | 20.5 | 2.34 | 7.11 | 26.9 | 2.24 | 7.14 | 28.4 |

Example 11: Suspension Concentrate Formulation Preparation and Tank Mix Stability (Unconfirmed)

A suspension concentrate formulation was prepared using the following reagents and the procedure detailed in Example 7:

| Reagent | Amount |
|---|---|
| Water | 46.34 g |
| Glycerin | 5.0 g |
| ATLAS G-50002L (wetting agent) | 0.8 g |
| ATLOX 4913 LQ (dispersant) | 0.8 g |
| Momentive SAG30 (antifoam) | 0.1 g |
| Thickner (kelzan, proxcel antimicrobial, water) | 0.178 g kelzan, 89 mg antimicrobial, 8.61 g water |
| I (unconfirmed crystalline form A) | 40.0 g |

To determine the stability of the tank mix (applied formulation) 150 mg of this suspension concentrate was then added to 20 g of water and gently shaken. The applied formulation was visually monitored for stability over the course of 30 minutes, and then analyzed with a Malvern 3000E to determine particle size. The applied formulation remained a white suspension over the course of 30 minutes. When analyzed, the solution showed a $D_{50}$ of 4.57 μm and a $D_{90}$ of 16.1 μm. The form is believed to be crystalline form A.

Example 12: Suspension Concentrate Formulation Preparation and Stability (Unconfirmed)

A suspension concentrate formulation was prepared using the following reagents and the procedure detailed in Example 7:

| Reagent | Amount |
|---|---|
| Water | 46.34 g |
| Glycerin | 5.0 g |
| ATLAS G-50002L (wetting agent) | 0.8 g |
| ATLOX 4913 LQ (dispersant) | 0.8 g |
| Momentive SAG30 (antifoam) | 0.1 g |
| Thickner (kelzan, proxcel antimicrobial, water) | 0.178 g kelzan, 89 mg antimicrobial, 8.61 g water |
| I (unconfirmed crystalline form A) | 40.0 g |

The SC formulation was visually monitored for stability when it was stored at; 5° C., 20° C., or 50° C. for 10 days. The formulations were then diluted in water analyzed with a Malvern 3000E to determine particle size. Visually, the sample displayed little to no change over the 10 days at; 5° C., 20° C., or 50° C. The data shows that the particle size of the SC formulations did not change under 5° C. and 20° C. storage conditions. A particle size change was noticed in the 50° C. storage condition after 10 days. The form is believed to be crystalline form A.

| Formulation | Day 1 $D_{10}$ | Day 1 $D_{50}$ | Day 1 $D_{90}$ | Day 5 $D_{10}$ | Day 5 $D_{50}$ | Day 5 $D_{90}$ | Day 10 $D_{10}$ | Day 10 $D_{50}$ | Day 10 $D_{90}$ |
|---|---|---|---|---|---|---|---|---|---|
| 5° C. | 2.03 | 5.45 | 20.5 | 1.64 | 4.67 | 16.7 | 1.66 | 4.64 | 16.3 |
| 20° C. | 1.62 | 4.57 | 16.1 | 1.85 | 5.06 | 18.0 | 1.63 | 4.61 | 17.0 |
| 50° C. | 1.90 | 5.57 | 15.1 | 2.20 | 6.44 | 21.9 | 2.23 | 6.81 | 24.8 |

Example 13: Seed Treatment Formulation and Germination Studies (Unconfirmed)

A sample suspension concentrate was prepared as described in Example 11. 23 mg of this suspension concentrate, which was believed to be crystalline form A, was then added to 0.26 g of water, followed by 78 mg of Florite 1706 Plantability Polymer and 36 mg of Keystone 610-548-25; the resulting mixture was gently shaken to produce a sample of formulation suitable for treating seeds. The formulation was added to 100 g of soybean seeds in a tumbler seed treater.

The treated seeds were then planted in small pots of soil to test germination. Germination results were recorded after 7 days; as illustrated below, the treated seeds germinated at a rate of 90%, which was similar to the untreated seeds germination rate of 98%. The data shows that an SC based seed treatment did not affect germination rates of the seeds in a significant way, and therefor is a favorable formulation type for agrochemical application.

| | Germination |
|---|---|
| Soil germination | 18/20 |
| Germination % | 90% |

Example 14: Suspension Concentrate for Seed Treatment Formulation and Germination Studies (Unconfirmed)

A sample suspension concentrate was prepared as described in Example 11. The form is believed to be crystalline form A. 46 mg of this suspension concentrate was then added to 0.26 g of water, followed by 78 mg of Florite 1706 Plantability Polymer and 36 mg of Keystone 610-548-25; the resulting mixture was gently shaken (to produce a sample of formulation suitable for treating seeds). The formulation was added to 100 g of soybean seeds in a tumbler seed treater.

The treated seeds were planted in small pots of soil to test germination. Germination results were recorded after 7 days; as illustrated below, the treated seeds germinated at a rate of 95% which is similar to the untreated seeds germination rate of 98%. The data shows that an SC based seed treatment did not affect germination rates of the seeds in a significant way, and therefor is a favorable formulation type for agrochemical application.

| | Germination |
|---|---|
| Soil germination | 19/20 |
| Germination % | 95% |

Example 15: Suspension Concentrate for Seed Treatment Formulation and Germination Studies (Unconfirmed)

A sample suspension concentrate was prepared as described in Example 11. The form is believed to be crystalline form A. 70 mg of this suspension concentrate was then added to 0.26 g of water, followed by 78 mg of Florite 1706 Plantability Polymer and 36 mg of Keystone 610-548-25; the resulting mixture was gently shaken (to produce a formulation suitable for treating seeds).

The formulation was added to 100 g of soybean seeds in a tumbler seed treater. The treated seeds were planted in small pots of soil to test germination. Germination results were recorded after 7 days; as illustrated below, the treated seeds germinated at a rate of 95%, which is similar to the untreated seeds germination rate of 98%. The data shows that an SC based seed treatment did not affect germination rates of the seeds in a significant way, and therefor is a favorable formulation type for agrochemical application.

| | Germination |
|---|---|
| Soil germination | 19/20 |
| Germination % | 95% |

Example 16: Suspension Concentrate for Seed Treatment Formulation and Germination Studies (Unconfirmed)

A sample suspension concentrate was prepared as described in Example 11. The form is believed to be crystalline form A. 0.14 g of this suspension concentrate was then added to 0.26 g of water, followed by 78 mg of Florite 1706 Plantability Polymer and 36 mg of Keystone 610-548-25; the resulting mixture was gently shaken (to produce a formulation suitable for treating seeds).

The formulation was added to 100 g of soybean seeds in a tumbler seed treater. The treated seeds were planted in small pots of soil to test germination. Germination results were recorded after 7 days; as illustrated below, the treated seeds germinated at a rate of 95% which is similar to the untreated seeds germination rate of 98%. The data shows that an SC based seed treatment did not affect germination rates of the seeds in a significant way, and therefore is a favorable formulation type for agrochemical application.

| | Germination |
|---|---|
| Soil germination | 19/20 |
| Germination % | 95% |

Example 17: Suspension Concentrate Formulation Preparation and Tank Mix Stability A suspension concentrate formulation was prepared using the following reagents and procedure:

| Reagent | Amount |
|---|---|
| Water | 64.69 g |
| Glycerin | 5.0 g |
| ATLAS G-5002L (wetting agent) | 2.5 g |
| ATLOX 4913 LQ (dispersant) | 2.5 g |
| JT Baker Antifoam B Silicone Emulsion (antifoam) | 0.1 g |
| Xanthan Gum (rheology modifier) | 0.2 g |
| 1,2-Benzisothiazol-3(2H)-one | 0.0036 g |
| I (crystalline form A) | 25 g |

The water was mixed using a low shear mixer. The wetting agent was then added to the mixture, followed by the dispersant and antifoam. Compound I (crystalline form A) was then added slowly portion-wise. The resulting suspension was then added to a Union Process Atritor Bead Mill system, and the suspension was bead milled for 1.5-2 hours or until (I) had reached the desired particle size. While the suspension was milling, in a separate container, the thickener mixture was prepared by first adding the xanthan gum to glycerin, then adding the 1,2-Benzisothiazol-3(2H)-one and hand mixing to create a slurry. When the milling was complete, the beads were removed by filtration and the thickener mixture was mixed with the milled mixture with a high shear mixer.

To determine the stability of the tank mix (applied formulation), 150 mg of the suspension concentrate was added to 20 g of water and gently shaken. This applied formulation was visually monitored for stability over the course of 30 minutes, and then analyzed with a Malvern 3000E to determine particle size. The applied formulation remained a white suspension over the course of 30 minutes. When analyzed, the solution showed a $D_{50}$ of 3.11 μm and a $D_{90}$ of 7.36 μm.

The solid form of (I) was analyzed by XRPD before and after milling/formulation to determine if the solid form was sufficiently stable to remain unchanged during the milling and formulation process. The suspension concentrate sample was prepared for XRPD analysis by centrifugation at 12000 RPM for 10 minutes. The resulting wet cake was then analyzed by XRPD.

All XRPD for Examples 17 and on was performed with a Panalytical X'Pert³ Powder XRPD on a Si zero-background holder. The 2θ position was calibrated against a Panalytical Si reference standard disc. The parameters used for the analysis are listed below in Table 17.

TABLE 17

Parameters for XRPD test

| Parameters | Reflection Mode |
| --- | --- |
| X-Ray wavelength | Cu, kα<br>Kα1 (Å): 1.540598,<br>Kα2 (Å): 1.544426,<br>Kα2/Kα1 intensity ratio: 0.50 |
| X-Ray tube setting | 45 kV, 40 mA |
| Divergence slit | Fixed 1/8° |
| Scan mode | Continuous |
| Scan range (° 2TH) | 3-40 |
| Scan step time [s] | 18.87 |
| Step size (° 2TH) | 0.0131 |
| Test Time | 4 min 15 s |

Figure 26A:
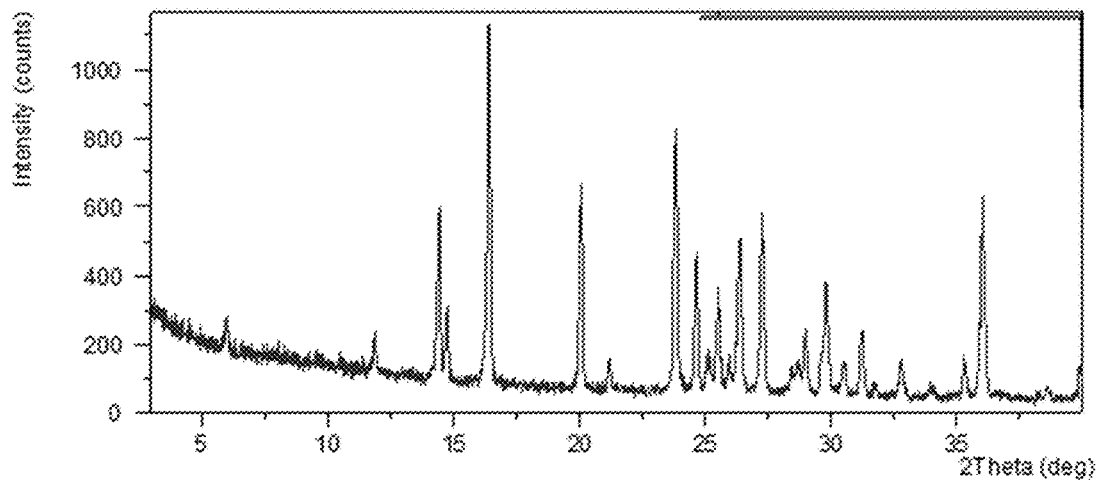
FIG. 26A shows an XRPD of starting material.
Figure 26B:
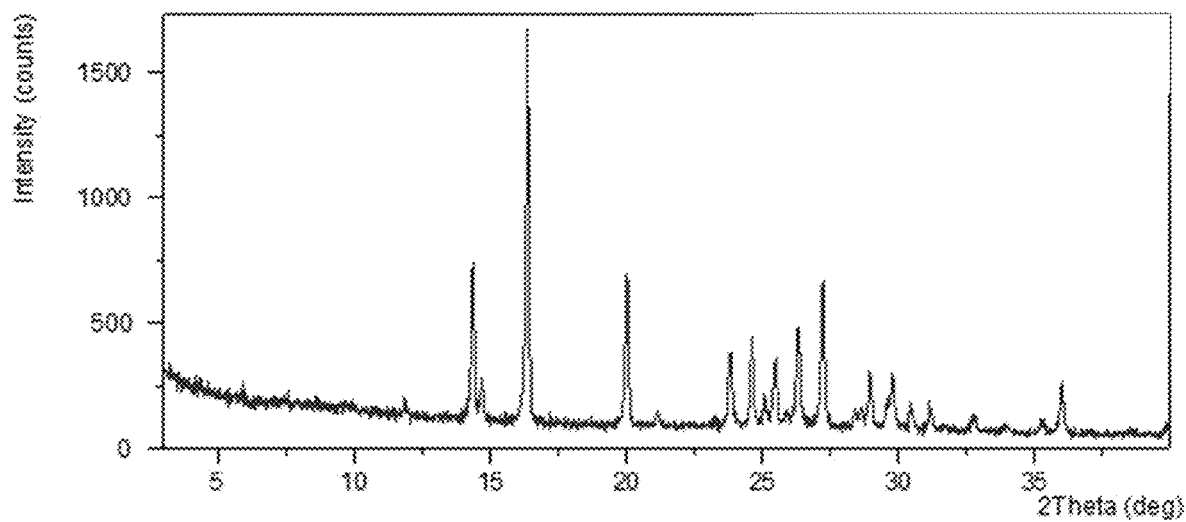
FIG. 26B shows an XRPD of milled and formulated material.
Figure 27A:
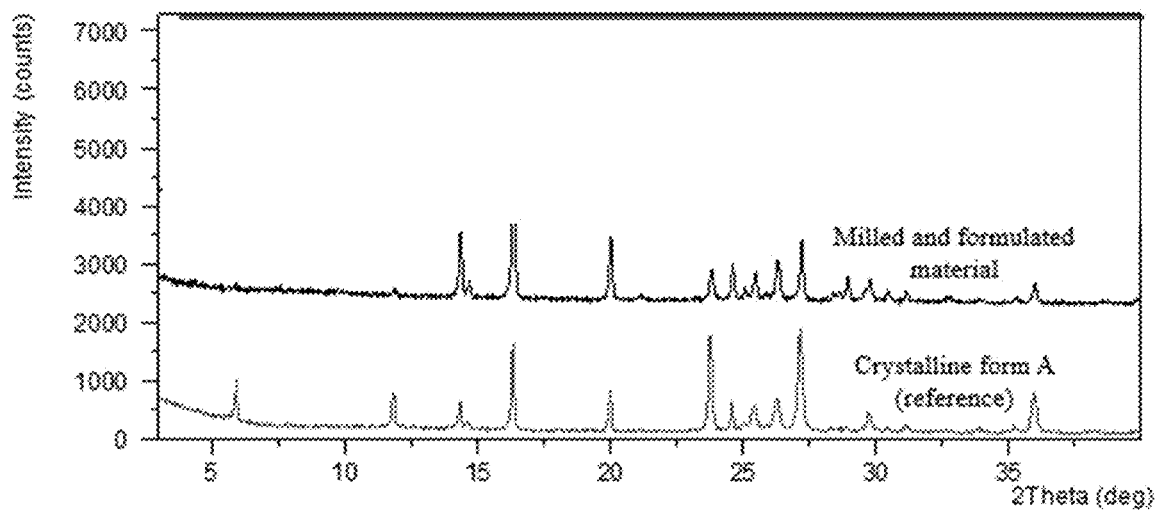
FIG. 27A shows an overlay of milled and formulated material and crystalline Form A for reference.

Results are shown in FIGS. 26A, 26B and 27A. The XRPD results showed that the solid form is crystalline form A before and after milling/formulation (all the samples conformed to Type A), indicating that crystalline form A is a favorable crystalline form to use for further SC development.

Example 18: Suspension Concentrate Formulation Preparation and Stability

A suspension concentrate formulation was prepared using the following reagents and the procedure detailed in Example 17:

| Reagent | Amount |
| --- | --- |
| Water | 64.69 g |
| Glycerin | 5.0 g |
| ATLAS G-5002L (wetting agent) | 2.5 g |
| ATLOX 4913 LQ (dispersant) | 2.5 g |
| JT Baker Antifoam B Silicone Emulsion (antifoam) | 0.1 g |
| Xanthan Gum (rheology modifier) | 0.2 g |
| 1,2-Benzisothiazol-3(2H)-one | 0.0036 g |
| I (crystalline form A) | 25 g |

The SC formulation was visually monitored for stability when it was stored at; 5° C., 20° C., or 50° C. for 10 days. After storage, the formulations were diluted in water analyzed with a Malvern 3000E to determine particle size and a VWR pH meter to determine pH. Visually, the sample displayed little to no change over the 10 days at 5° C., 20° C., or 50° C. The data shows that the particle size of the SC formulations did not change under 5° C. storage conditions. A particle size change was noticed in the 20° C. and 50° C. storage condition after 10 days. Under all three storage conditions at 10 days, the change in pH was minimal.

| Formulation | Day 1 $D_{10}$ | Day 1 $D_{50}$ | Day 1 $D_{90}$ | Day 1 pH | Day 10 $D_{10}$ | Day 10 $D_{50}$ | Day 10 $D_{90}$ | Day 10 pH |
| --- | --- | --- | --- | --- | --- | --- | --- | --- |
| 5° C. | 0.93 | 3.11 | 7.36 | 5.42 | 1.02 | 3.13 | 7.87 | 5.63 |
| 20° C. | 0.93 | 3.11 | 7.36 | 5.42 | 1.45 | 4.06 | 14.3 | 5.43 |
| 50° C. | 0.93 | 3.11 | 7.36 | 5.42 | 2.15 | 6.10 | 20.9 | 5.37 |

Example 19: Suspension Concentrate Formulation Preparation and Tank Mix Stability A suspension concentrate formulation was prepared using the following reagents and procedure:

| Reagent | Amount |
| --- | --- |
| Water | 65.94 g |
| Glycerin | 5.0 g |
| ATLOX 4894 (wetting agent) | 1.75 g |
| ATLOX Metasperse 500L (dispersant) | 2.5 g |
| JT Baker Antifoam B Silicone Emulsion (antifoam) | 0.1 g |
| Xanthan Gum (rheology modifier) | 0.2 g |
| 1,2-Benzisothiazol-3(2H)-one | 0.0036 g |
| I (crystalline form A) | 25 g |

The water was mixed using a low shear mixer. The wetting agent was then added to the mixture, followed by the dispersant and antifoam. (I) (crystalline form A) was then added slowly portion-wise. The resulting suspension was then added to a Union Process Atritor Bead Mill system, and the suspension was bead milled for 1.5-2 hours or until (I) had reached the desired particle size. While the suspension was milling, in a separate container, the thickener mixture was prepared by first adding the xanthan gum to glycerin, then adding the 1,2-benzisothiazol-3(2H)-one and hand mixing to create a slurry. When the milling was complete, the beads were removed by filtration and the thickener mixture was mixed with the milled mixture with a high shear mixer.

To determine the stability of the tank mix (applied formulation), 150 mg of the suspension concentrate was then added to 20 g of water and gently shaken. This applied formulation was visually monitored for stability over the course of 30 minutes, and then analyzed with a Malvern 3000E to determine particle size. The applied formulation remained a white suspension over the course of 30 minutes. When analyzed, the solution showed a $D_{50}$ of 5.22 μm and a $D_{90}$ of 16.1 μm.

Figure 27B:
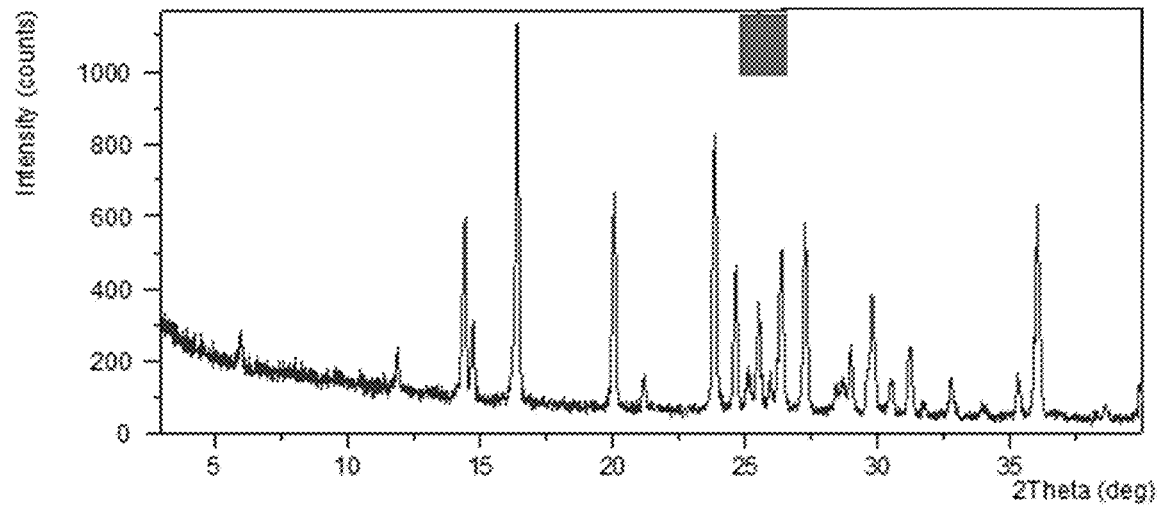
FIG. 27B shows an XRPD of starting material.
Figure 28A:
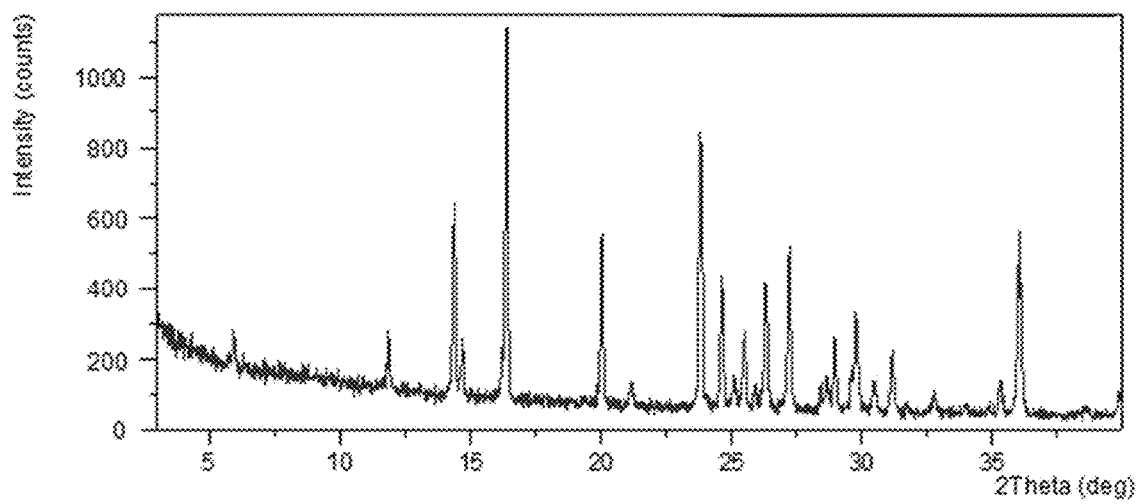
FIG. 28A shows an XRPD of milled and formulated material.
Figure 28B:
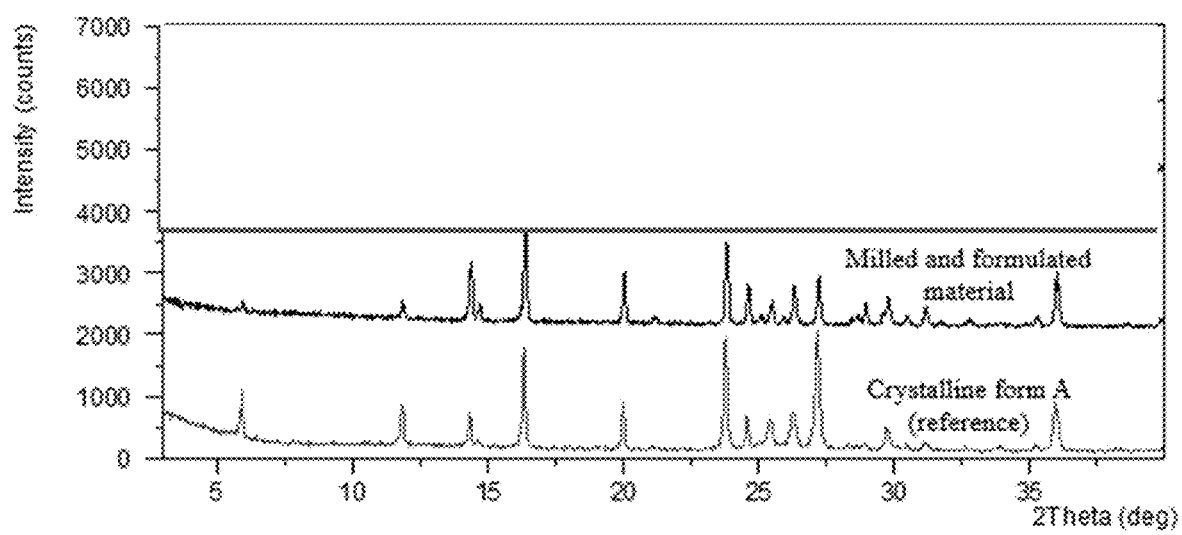
FIG. 28B shows an overlay of milled and formulated material and crystalline Form A for reference.

The solid form of (I) was analyzed by XRPD before and after milling/formulation to determine if the solid form was sufficiently stable to remain unchanged during the milling and formulation process. The suspension concentrate sample was prepared for XRPD analysis by centrifugation at 12000 RPM for 10 minutes. The resulting wet cake was then analyzed by XRPD. The results are shown in FIGS. 27B, 28A and 28B. The XRPD results showed that the solid form is crystalline form A before and after milling/formulation (all the samples conformed to Type A), indicating that crystalline form A is a favorable crystalline form to use for further SC development.

Example 20: Suspension Concentrate Formulation Preparation and Stability

A suspension concentrate formulation was prepared using the following reagents and the procedure detailed in Example 19:

| Reagent | Amount |
| --- | --- |
| Water | 65.94 g |
| Glycerin | 5.0 g |
| ATLOX 4894 (wetting agent) | 1.75 g |
| ATLOX Metasperse 500L (dispersant) | 2.5 g |
| JT Baker Antifoam B Silicone Emulsion (antifoam) | 0.1 g |
| Xanthan Gum (rheology modifier) | 0.2 g |
| 1,2-Benzisothiazol-3(2H)-one | 0.0036 g |
| I (crystalline form A) | 25 g |

The SC formulation was visually monitored for stability when it was stored at; 5° C., 20° C., or 50° C. for 10 days. The formulations were then diluted in water and analyzed with a Malvern 3000E to determine particle size and a VWR pH meter to determine pH. Visually, the sample displayed little to no change over the 10 days at 5° C., 20° C., or 50° C. The data shows that the particle size of the SC formulations did not change under 20° C. storage conditions. A particle size change was noticed in the 5° C. and 50° C. storage condition after 10 days. Under all three storage conditions at 10 days, the change in pH was minimal.

| Formulation | Day 1 $D_{10}$ | Day 1 $D_{50}$ | Day 1 $D_{90}$ | Day 1 pH | Day 10 $D_{10}$ | Day 10 $D_{50}$ | Day 10 $D_{90}$ | Day 10 pH |
| --- | --- | --- | --- | --- | --- | --- | --- | --- |
| 5° C. | 1.84 | 5.25 | 16.1 | 6.97 | 4.71 | 45.0 | 127 | 7.07 |
| 20° C. | 1.84 | 5.25 | 16.1 | 6.97 | 2.28 | 6.25 | 18.1 | 7.05 |
| 50° C. | 1.84 | 5.25 | 16.1 | 6.97 | 3.67 | 10.1 | 24.7 | 7.10 |

Example 21: Milling Slurry Preparation

A milling slurry was prepared using the following reagents and procedure:

| Reagent | Amount |
| --- | --- |
| Water | 90 g |
| I (crystalline form A) | 10 g |

The water was mixed using a low shear mixer. (I) (crystalline form A) was then added slowly portion-wise. The resulting slurry was then added to a Union Process Atritor Bead Mill system, and the slurry was bead milled for 1.5-2 hours. When the milling was complete, the beads were removed by filtration.

To determine the particle size of the slurry 1.5 mL of the slurry was then added to 20 mL of water and gently shaken. This slurry was analyzed with a Malvern 3000E to determine particle size. When analyzed, the solution showed a $D_{90}$ of 43.32 µm.

Figure 29A:
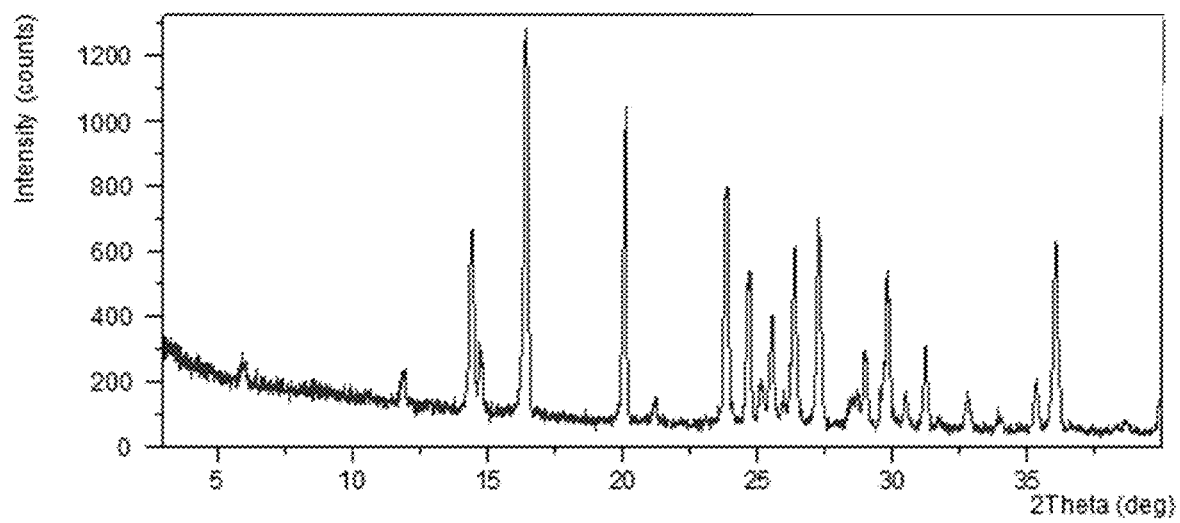
FIG. 29A XRPD patterns of starting material.
Figure 29B:
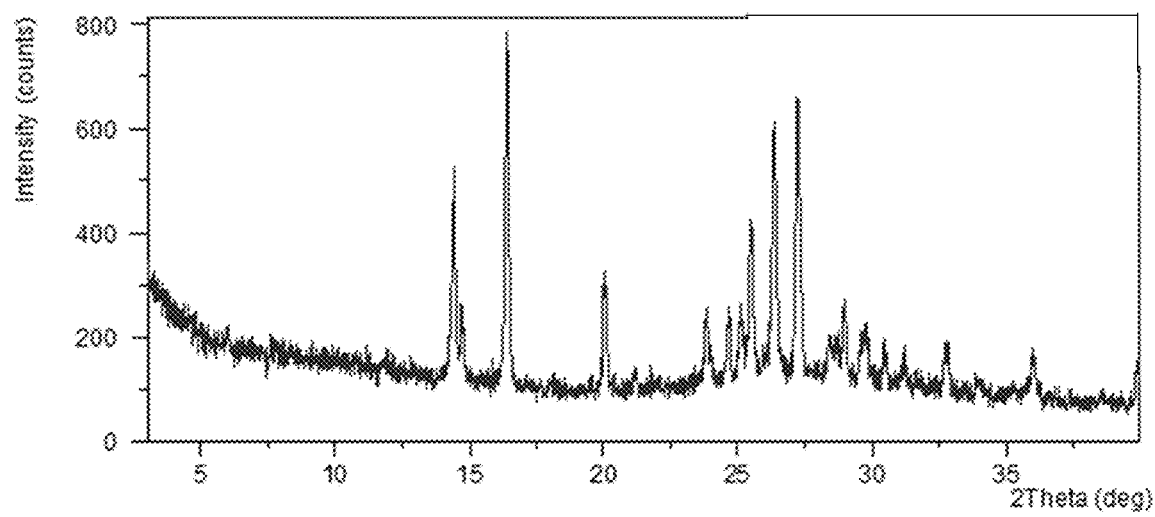
FIG. 29B XRPD of milled and formulated material.
Figure 30A:
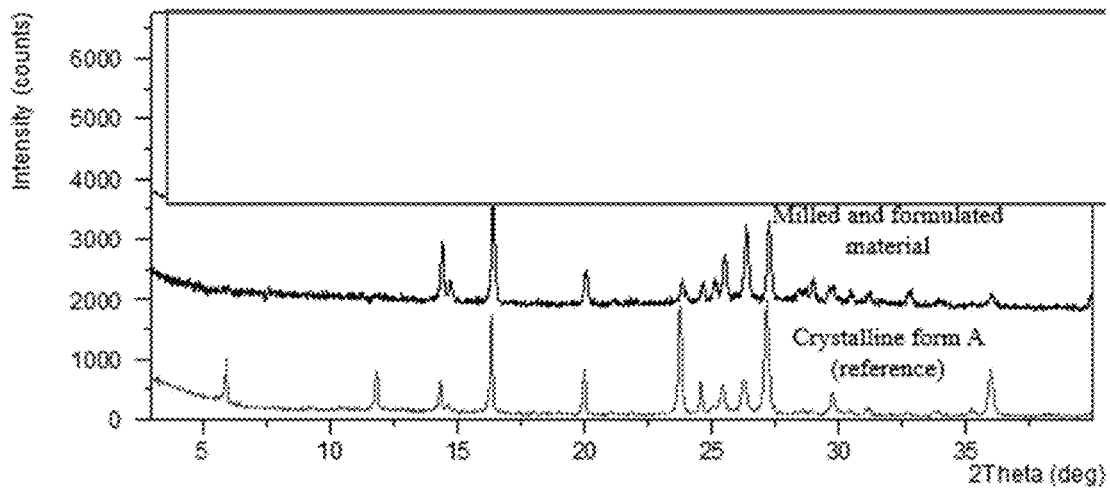
FIG. 30A shows an overlay of milled and formulated material and Crystalline Form A for reference.

The solid form of (I) was analyzed by XRPD before and after milling to determine if the solid form was sufficiently stable to remain unchanged during the milling and formulation process. The sample was prepared for XRPD analysis by centrifugation at 12000 RPM for 10 minutes. The resulting wet cake was then analyzed by XRPD. The results are shown in FIGS. 29A, 29B and 30A. The XRPD results showed that the solid form is crystalline form A before and after milling (all the samples conformed to Type A), indicating that crystalline form A is a favorable crystalline form to use for further SC development.

Example 22: Suspension Concentrate Formulation Preparation and Tank Mix Stability A suspension concentrate formulation was prepared using the following reagents and the procedure detailed in Example 17:

| Reagent | Amount |
| --- | --- |
| Water | 73.75 g |
| Glycerin | 5.0 g |
| ATLAS G-50002L (wetting agent) | 0.4 g |
| ATLOX 4913 LQ (dispersant) | 0.4 g |
| JT Baker Antifoam B Silicone Emulsion (antifoam) | 0.1 g |
| Xanthan Gum (rheology modifier) | 0.24 g |
| 1,2-Benzisothiazol-3(2H)-one | 0.0036 g |
| I (crystalline form A) | 20.1 g |

To determine the stability of the tank mix (applied formulation), 150 mg of this suspension concentrate was then added to 20 g of water and gently shaken. The applied formulation was visually monitored for stability over the course of 30 minutes, and then analyzed with a Malvern 3000E to determine particle size. The applied formulation remained a white suspension over the course of 30 minutes. When analyzed, the solution showed a $D_{50}$ of 5.89 µm and a $D_{90}$ of 26.7 µm.

Figure 30B:
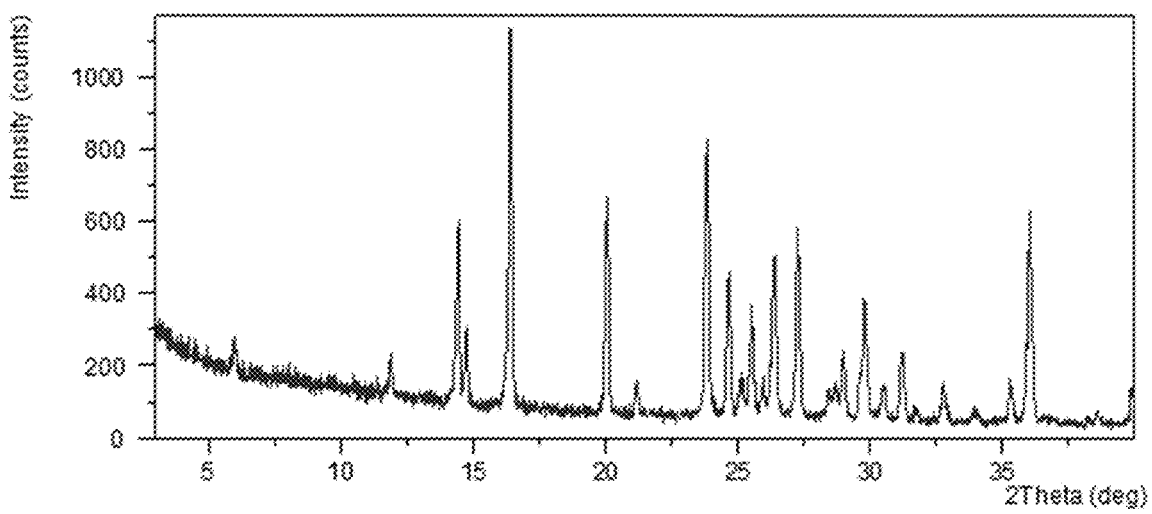
FIG. 30B shows an XRPD sample of starting material.
Figure 31A:
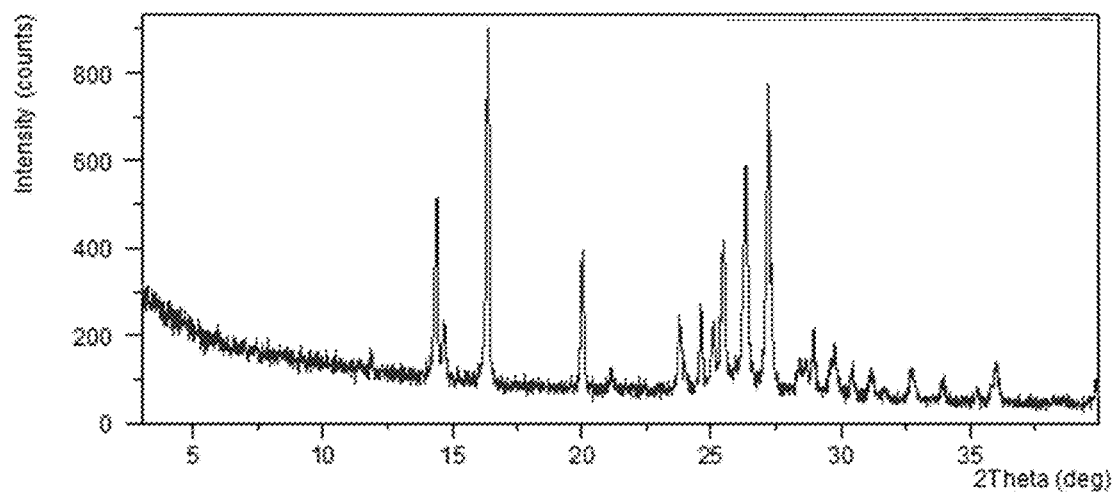
FIG. 31A shows an overlay of milled and formulated material.
Figure 31B:
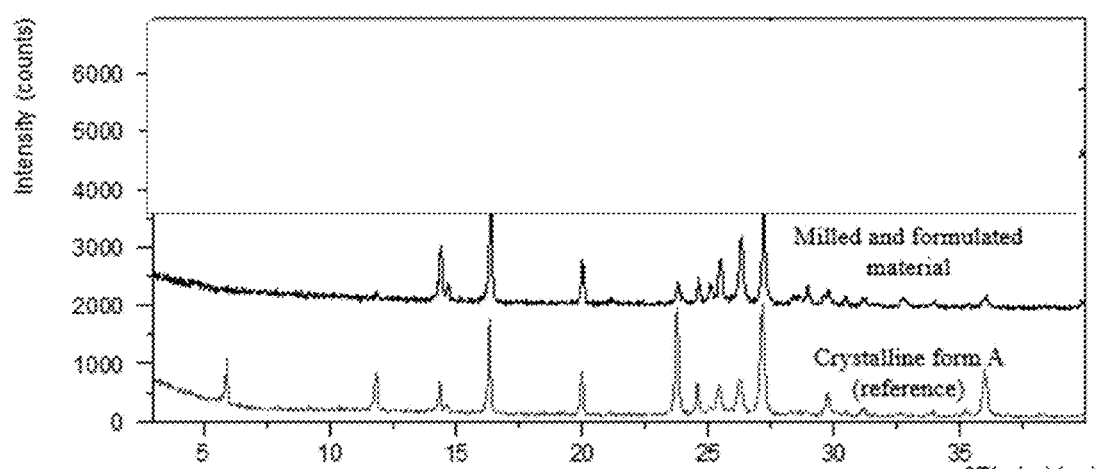
FIG. 31B shows an shows an overlay of milled and formulation material and Crystalline Form A for reference.

The solid form of (I) was analyzed by XRPD before and after milling/formulation to determine if the solid form was sufficiently stable to remain unchanged during the milling and formulation process. The suspension concentrate sample was prepared for XRPD analysis by centrifugation at 12000 RPM for 10 minutes. The resulting wet cake was then analyzed by XRPD. The results are shown in FIGS. 30B, 31A and 31B. The XRPD results showed that the solid form is crystalline form A before and after milling/formulation (all the samples conformed to Type A), indicating that crystalline form A is a favorable crystalline form to use for further SC development.

Example 23 Suspension Concentrate Formulation Preparation and Tank Mix Stability A suspension concentrate formulation was prepared using the following reagents and the procedure detailed in Example 17:

| Reagent | Amount |
| --- | --- |
| Water | 53.12 g |
| Glycerin | 5.0 g |
| ATLAS G-50002L (wetting agent) | 0.8 g |
| ATLOX 4913 LQ (dispersant) | 0.8 g |
| JT Baker Antifoam B Silicone Emulsion (antifoam) | 0.1 g |
| Xanthan Gum (rheology modifier) | 0.178 g |
| 1,2-Benzisothiazol-3(2H)-one | 0.0036 g |
| I (crystalline form A) | 40.0 g |

To determine the stability of the tank mix (applied formulation), 150 mg of this suspension concentrate was then added to 20 g of water and gently shaken. The applied formulation was visually monitored for stability over the course of 30 minutes, and then analyzed with a Malvern 3000E to determine particle size. The applied formulation remained a white suspension over the course of 30 minutes. When analyzed, the solution showed a $D_{50}$ of 4.85 μm and a $D_{90}$ of 14.9 μm.

Figure 32A:
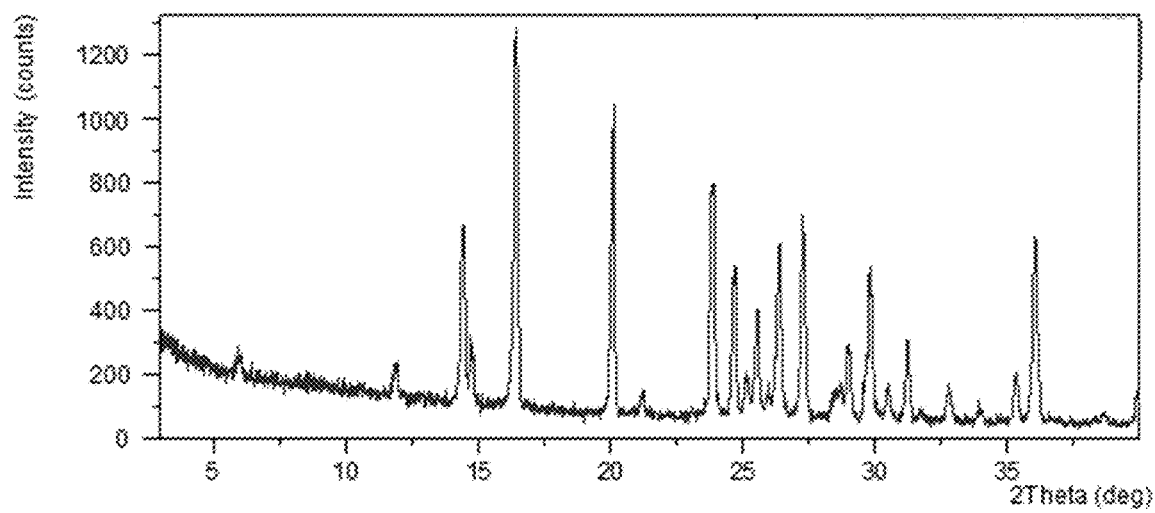
FIG. 32A shows an XRPD of starting material.
Figure 32B:
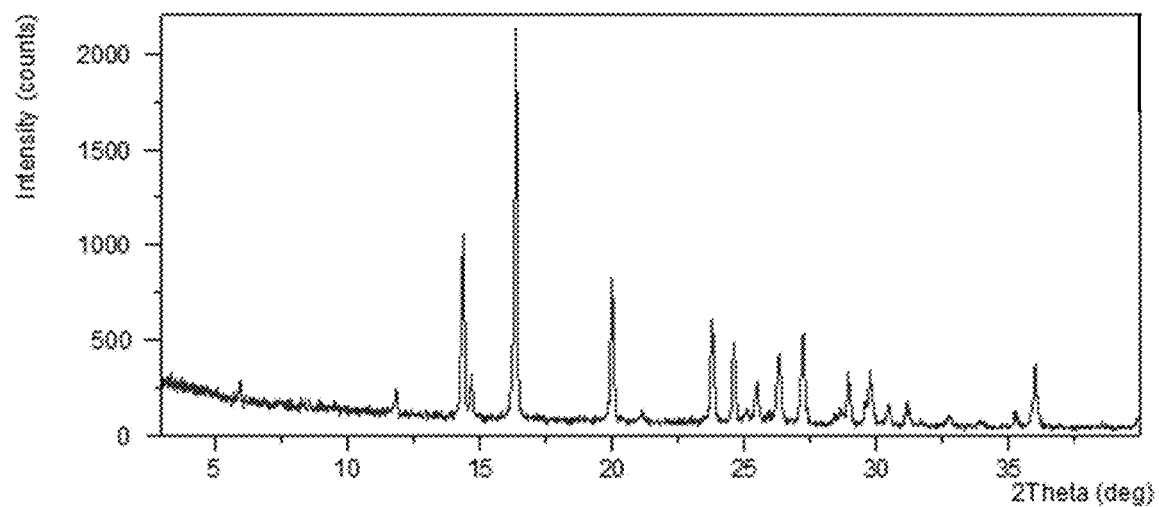
FIG. 32B shows an XRPD of milled and formulated material.
Figure 33:
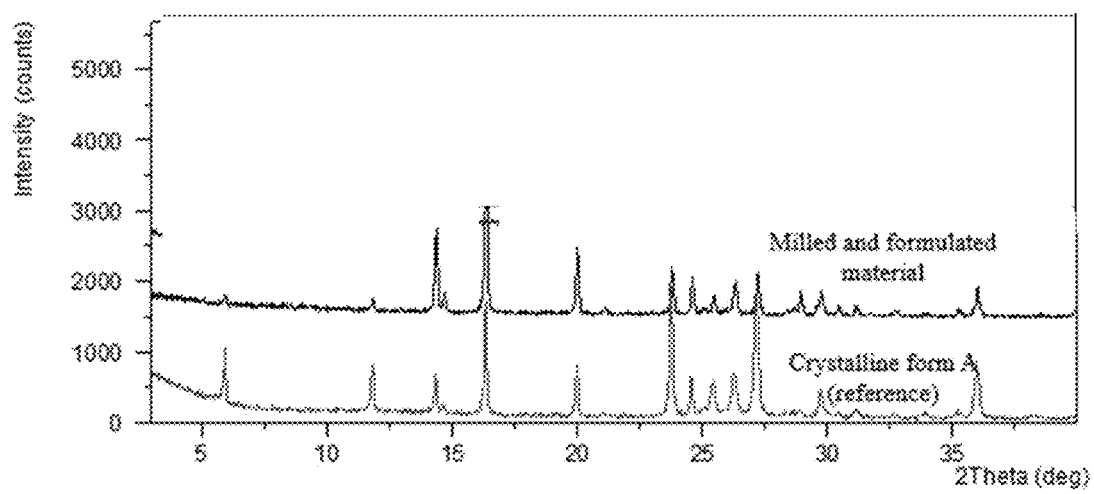
FIG. 33 shows an overlay of milled and formulation material and crystalline Form A for reference.

The solid form of (I) was analyzed by XRPD before and after milling/formulation to determine if the solid form was sufficiently stable to remain unchanged during the milling and formulation process. The suspension concentrate sample was prepared for XRPD analysis by centrifugation at 12000 RPM for 10 minutes. The resulting wet cake was then analyzed by XRPD. The results are shown in FIGS. 32A, 32B, and 33. The XRPD results showed that the solid form is crystalline form A before and after milling/formulation (all the samples conformed to Type A), indicating that crystalline form A is a favorable crystalline form to use for further SC development.

Example 24: Suspension Concentrate Formulation Adjuvant Addition and Stability A suspension concentrate formulation was prepared using the following reagents and the procedure detailed in Example 17:

| Reagent | Amount |
| --- | --- |
| Water | 64.69 g |
| Glycerin | 5.0 g |
| ATLAS G-50002L (wetting agent) | 2.5 g |
| ATLOX 4913 LQ (dispersant) | 2.5 g |
| JT Baker Antifoam B Silicone Emulsion (antifoam) | 0.1 g |
| Xanthan Gum (rheology modifier) | 0.2 g |
| 1,2-Benzisothiazol-3(2H)-one | 0.0036 g |
| BAG8 | 25 g |

Once the SC was prepared, 1.9 mL of SC was aliquoted into 5 mL vials to test compatibility and stability with various adjuvants. The SC and adjuvant samples were prepared as follows; first, 0.1 mL of adjuvant was added directly to the vial containing the SC and vortexed for 1 minute to well combine. Atplus UEP-100 needed to be heated to 50° C. before being added to the SC, which was also heated to 50° C., to compatibilize the adjuvant before vortexing. The SC formulations were visually monitored for stability when it was stored at 5° C., 20° C., or 50° C. for 10 days. The each of the formulations were then diluted in water and analyzed with a Malvern 3000E to determine particle size and with a VWR pH meter to determine pH. Visually, the sample displayed little to no change over the 10 days at 5° C., 20° C., or 50° C. Under all three storage conditions at 10 days, the change in pH was minimal.

| Adjuvant Trade Name | Adjuvant Type |
| --- | --- |
| Tween 22 | Polysorbate |
| Atplus UEP-100 | Alkoxylated polyol ester |
| Atplus PFA | Alkoylated alcohol |
| Atplus MSO-HS 500 | Methylated seed oil blend |
| Silwet Stik2 | Blend of Latex Emulsion and Trisiloxane alkoxylate |

| Adjuvant | Temperature | Day 1 $D_{10}$ | Day 1 $D_{50}$ | Day 1 $D_{90}$ | Day 1 pH | Day 10 $D_{10}$ | Day 10 $D_{50}$ | Day 10 $D_{90}$ | Day 10 pH |
| --- | --- | --- | --- | --- | --- | --- | --- | --- | --- |
| Tween 22 | 5° C. | 1.41 | 3.96 | 11.9 | 5.33 | 1.45 | 4.40 | 14.1 | 5.60 |
| Tween 22 | 20° C. | 1.41 | 3.96 | 11.9 | 5.33 | 1.31 | 4.12 | 12.1 | 5.51 |
| Tween 22 | 50° C. | 1.41 | 3.96 | 11.9 | 5.33 | 2.75 | 9.09 | 22.2 | 5.36 |
| Atplus UEP-100 | 5° C. | 1.24 | 3.60 | 9.71 | 5.46 | 1.31 | 3.95 | 11.8 | 5.55 |
| Atplus UEP-100 | 20° C. | 1.24 | 3.60 | 9.71 | 5.46 | 1.20 | 3.72 | 11.19 | 5.61 |
| Atplus UEP-100 | 50° C. | 1.24 | 3.60 | 9.71 | 5.46 | 3.18 | 12.1 | 64.3 | 5.43 |
| Atplus PFA | 5° C. | 1.74 | 3.72 | 8.50 | 5.56 | 1.04 | 3.26 | 10.9 | 5.60 |
| Atplus PFA | 20° C. | 1.74 | 3.72 | 8.50 | 5.56 | 1.13 | 3.20 | 8.02 | 5.72 |
| Atplus PFA | 50° C. | 1.74 | 3.72 | 8.50 | 5.56 | 1.90 | 7.10 | 22.7 | 5.61 |
| Silwet Stik2 | 5° C. | 1.05 | 3.24 | 8.69 | 5.88 | 1.99 | 8.42 | 74.3 | 5.96 |

-continued

| Adjuvant | Temperature | Day 1 $D_{10}$ | Day 1 $D_{50}$ | Day 1 $D_{90}$ | Day 1 pH | Day 10 $D_{10}$ | Day 10 $D_{50}$ | Day 10 $D_{90}$ | Day 10 pH |
|---|---|---|---|---|---|---|---|---|---|
| Silwet Stik2 | 20° C. | 1.05 | 3.24 | 8.69 | 5.88 | 1.17 | 3.78 | 10.7 | 6.02 |
| Silwet Stik2 | 50° C. | 1.05 | 3.24 | 8.69 | 5.88 | 3.63 | 9.99 | 32.0 | 5.90 |
| Atplus MSO-HS 500 | 5° C. | 1.34 | 5.21 | 13.0 | 5.48 | 1.38 | 5.21 | 15.9 | 5.39 |
| Atplus MSO-HS 500 | 20° C. | 1.34 | 5.21 | 13.0 | 5.48 | 1.69 | 6.78 | 15.6 | 5.44 |
| Atplus MSO-HS 500 | 50° C. | 1.34 | 5.21 | 13.0 | 5.48 | 3.54 | 11.3 | 29.2 | 5.34 |

Example 25: Suspension Concentrate Formulation Adjuvant Addition and Stability A suspension concentrate formulation was prepared using the following reagents and the procedure detailed in Example 19:

| Reagent | Amount |
|---|---|
| Water | 65.94 g |
| Glycerin | 5.0 g |
| ATLOX 4894 (wetting agent) | 1.75 g |
| ATLOX Metasperse 500L (dispersant) | 2.5 g |
| JT Baker Antifoam B Silicone Emulsion (antifoam) | 0.1 g |
| Xanthan Gum (rheology modifier) | 0.2 g |
| 1,2-Benzisothiazol-3(2H)-one | 0.0036 g |
| BAG8 | 25 g |

Once the SC was prepared, 1.9 mL of SC was aliquoted into 5 mL vials to test compatibility and stability with various adjuvants. For each test, 0.1 mL of adjuvant was added directly to the vial containing the SC and vortexed for 1 minute to well combine. Atplus UEP-100 needed to be heated to 50° C. before being added to the SC, which had also been heated to 50° C., to compatibilize the adjuvant before vortexing. The SC formulations were visually monitored for stability when it was stored at 5° C., 20° C., or 50° C. for 10 days. The formulations were then diluted in water and analyzed with a Malvern 3000E to determine particle size and a VWR pH meter to determine pH.

Visually, the sample displayed little to no change over the 10 days at; 5° C., 20° C., or 50° C. Under all three storage conditions at 10 days, the change in pH was minimal.

| Adjuvant Trade Name | Adjuvant Type |
|---|---|
| Tween 22 | Polysorbate |
| Atplus UEP-100 | Alkoxylated polyol ester |
| Atplus PFA | Alkoylated alcohol |
| Atplus MSO-HS 500 | Methylated seed oil blend |
| Silwet Stik2 | Blend of Latex Emulsion and Trisiloxane alkoxylate |

| Adjuvant | Temperature | Day 1 $D_{10}$ | Day 1 $D_{50}$ | Day 1 $D_{90}$ | Day 1 pH | Day 10 $D_{10}$ | Day 10 $D_{50}$ | Day 10 $D_{90}$ | Day 10 pH |
|---|---|---|---|---|---|---|---|---|---|
| Tween 22 | 5° C. | 1.87 | 5.53 | 16.8 | 7.01 | 2.21 | 6.68 | 19.3 | 7.03 |
| Tween 22 | 20° C. | 1.87 | 5.53 | 16.8 | 7.01 | 2.50 | 7.43 | 20.1 | 7.03 |
| Tween 22 | 50° C. | 1.87 | 5.53 | 16.8 | 7.01 | 5.04 | 15.7 | 41.3 | 7.01 |
| Atplus UEP-100 | 5° C. | 2.04 | 5.97 | 17.9 | 7.03 | 2.67 | 8.27 | 24.2 | 7.10 |
| Atplus UEP-100 | 20° C. | 2.04 | 5.97 | 17.9 | 7.03 | 3.06 | 8.56 | 21.4 | 7.11 |
| Atplus UEP-100 | 50° C. | 2.04 | 5.97 | 17.9 | 7.03 | 4.11 | 12.4 | 31.8 | 7.03 |
| Atplus PFA | 5° C. | 1.84 | 5.36 | 15.0 | 7.06 | 2.67 | 7.92 | 23.7 | 7.08 |
| Atplus PFA | 20° C. | 1.84 | 5.36 | 15.0 | 7.06 | 2.70 | 7.51 | 19.0 | 7.06 |
| Atplus PFA | 50° C. | 1.84 | 5.36 | 15.0 | 7.06 | 4.33 | 12.1 | 31.9 | 7.05 |
| Silwet Stik2 | 5° C. | 2.18 | 6.55 | 22.9 | 6.96 | 3.57 | 15.9 | 109 | 6.95 |
| Silwet Stik2 | 20° C. | 2.18 | 6.55 | 22.9 | 6.96 | 2.25 | 6.38 | 20.3 | 6.91 |
| Silwet Stik2 | 50° C. | 2.18 | 6.55 | 22.9 | 6.96 | 3.00 | 8.90 | 23.1 | 6.93 |
| Atplus MSO-HS 500 | 5° C. | 2.51 | 10.8 | 28.4 | 6.66 | 2.79 | 9.91 | 26.5 | 6.61 |
| Atplus MSO-HS 500 | 20° C. | 2.51 | 10.8 | 28.4 | 6.66 | 3.22 | 12.3 | 30.2 | 6.59 |
| Atplus MSO-HS 500 | 50° C. | 2.51 | 10.8 | 28.4 | 6.66 | 8.75 | 26.6 | 68.9 | 6.44 |

The various embodiments described above may be combined to provide further embodiments. All U.S. patents, U.S. patent application publications, U.S. patent applications, non-U.S. patents, non-U.S. patent applications, and non-patent publications referred to in this specification and/or listed in the Application Data Sheet are incorporated herein by reference, in their entirety. Aspects of the embodiments may be modified, if necessary, to employ concepts of the various patents, applications, and publications to provide yet further embodiments.

Test compounds for the experiments described herein were employed in free or salt form, as noted.

The specific responses observed may vary according to and depending on the particular active compound selected or whether there are present carriers, as well as the type of formulation and mode of administration employed, and such expected variations or differences in the results are contemplated in accordance with practice of the present invention.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

We claim:

1. An agrochemical composition comprising a crystalline form of a compound of formula I:

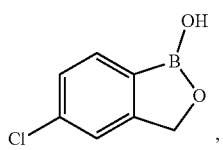

(I)

5-chlorobenzo[c][1,2]oxaborol-1(3H)-ol, or a pharmaceutically acceptable salt thereof, wherein said crystalline form is Crystalline Form A characterized by an X-ray diffraction pattern (XRPD) comprising one or more 2θ angle values selected from: about 16°±1.0, about 23°±1.0, about 25°±1.0, and about 27°±1.0.

2. The agrochemical composition of claim 1, further comprising at least one other active ingredient.

3. The agrochemical composition of claim 1, wherein the agrochemical composition is a emulsifiable concentrate, a dust, a suspension concentrate, a wettable powder, granule, or a seed treatment.

4. The agrochemical composition of claim 3, wherein the emulsifiable concentration comprises:
   a. up to about 95% compound;
   b. up to about 30% surface-active agent; and
   c. up to about 80% liquid carrier.

5. The agrochemical composition of claim 3, wherein the dust comprises:
   a. up to about 10% compound; and
   b. up to about 99.9% solid carrier.

6. The agrochemical composition of claim 3, wherein the suspension concentrate comprises:
   a. up to about 75% compound;
   b. up to about 94% water; and
   c. up to about 10% dispersing and wetting agent.

7. The agrochemical composition of claim 3, wherein the wettable powder comprises:
   a. up to about 90% compound;
   b. up to about 20% surface-active agent; and
   c. up to about 95% solid carrier.

8. The agrochemical composition of claim 3, wherein the granule comprises:
   a. up to about 30% compound; and
   b. up to about 99.9% solid carrier.

9. The agrochemical composition of claim 1, comprising an effective amount of compound for controlling microbial infections on plants or plant propagation material.

10. The agrochemical composition of claim 9 further comprising at least one additional active ingredient.

11. The agrochemical composition of claim 9, wherein the microbial infection is a fungal infection.

12. The agrochemical composition of claim 10, wherein the at least one additional active ingredient is selected from the group consisting of: a fungicide, nematicide, insecticide, antimicrobial, or any combination thereof.

* * * * *

UNITED STATES PATENT AND TRADEMARK OFFICE
CERTIFICATE OF CORRECTION

PATENT NO. : 11,560,393 B2
APPLICATION NO. : 17/150809
DATED : January 24, 2023
INVENTOR(S) : Liu et al.

Page 1 of 1

It is certified that error appears in the above-identified patent and that said Letters Patent is hereby corrected as shown below:

In the Claims

In Column 55, Line 36-37:
In Claim 1, after "or a" delete "pharmaceutically acceptable"

In Column 55, Line 37:
In Claim 1, after "salt thereof," insert -- and at least one agriculturally acceptable carrier, --

Signed and Sealed this
Eighteenth Day of July, 2023

Katherine Kelly Vidal
*Director of the United States Patent and Trademark Office*